US006374309B1

United States Patent
Morita et al.

(10) Patent No.: US 6,374,309 B1
(45) Date of Patent: Apr. 16, 2002

(54) COMMUNICATION SIGNAL SUPPRESSING APPARATUS AND COMMON LINE SIGNAL APPARATUS CAPABLE OF REDUCING WORKLOAD OF FIRMWARE

(75) Inventors: Sumie Morita, Kawasaki; Megumi Shibata, Yokohama; Hiroyoshi Yoda, Yokohama; Hitoshi Ouchi, Yokohama; Kenji Kazehaya, Yokohama, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/184,541

(22) Filed: Nov. 2, 1998

(30) Foreign Application Priority Data

Mar. 9, 1998 (JP) .............................. 10-057265

(51) Int. Cl.[7] .............................................. G06F 3/00
(52) U.S. Cl. ........................... 710/1; 370/428; 370/503; 379/39; 379/219
(58) Field of Search ................... 710/1, 106; 370/428, 370/503; 379/34, 230, 229, 219

(56) References Cited

U.S. PATENT DOCUMENTS 5,757,895 A * 5/1998 Aridas et al. ............... 379/136
5,892,812 A * 4/1999 Pester, III .................... 379/34
6,219,416 B1 * 4/2001 Benayoun et al. .......... 379/219

FOREIGN PATENT DOCUMENTS

| JP | 63-9338 | 1/1988 |
| JP | 63-229949 | 9/1988 |
| JP | 3-21153 | 1/1991 |

* cited by examiner

Primary Examiner—Robert Beausoleil
Assistant Examiner—X. Chung-Trans
(74) Attorney, Agent, or Firm—Rosenman & Colin, LLP

(57) ABSTRACT

A communication signal suppressing apparatus capable of reducing a load of a firmware using portion is provided in a communication signal apparatus such as a common line signal apparatus. A common line signal processing circuit corresponds to hardware used to execute a portion of the level-2 process operation, and this common line signal processing circuit owns such a function capable of discarding a reception frame having no meaning other than a confirmation response, and also capable of extracting a reverse-direction sequence number thereof. As a result, the common line signal processing circuit performs a remaining level-2 process operation. Thus, since a workload of a processing apparatus (CPU) using the firmware can be reduced, this firmware can be designed with sufficient capacities. Also, other process operations can be carried out by this CPU.

7 Claims, 43 Drawing Sheets

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#0 | X~X | X | X | X | X | X | X | X | X | X | X | HSSL | IFFL | OCME | IIRE | INVD | CLCR | LFCE | IFST | RXRS |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#1 | X~X | X | X | CLCT | X | X | IIDN | IIDN | IIDN | IIDN | IIDN | IIDN | FIBP | FIBE | IFSF | IDSL | NRZI | X | X | TXRS |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#2 | X~X | MIRE | | SFBD | | X | X | LFBD | LFBD | LFBD | LFBD | LFBD | LFBD | LFBD | LFBD | LFBD | LFBD | LFBD | LFBD | LFBD |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#3 | X~X | X | X | BSNT | BSNP | BSNP | BSNP | BSNP | BSNP | BSNP | BSNP | BSNP | BSNP | BSNP | BSNP | BSNP | BSNP | BSNP | BSNP | BSNP |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#4 | X~X | X | X | X | X | X | X | X | X | X | X | X | X | X | X | X | X | X | X | SSPM |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#5 | X~X | X | X | X | X | X | X | X | IBSN | IBSN | IBSN | IBSN | IBSN | IBSN | IBSN | IBSN | IBSN | IBSN | IBSN | IBSN |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#6 | X~X | X | X | X | X | X | X | X | MBSN | MBSN | MBSN | MBSN | MBSN | MBSN | MBSN | MBSN | MBSN | MBSN | MBSN | MBSN |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#7 | X~X | X | X | X | X | X | X | X | X | X | X | X | X | X | X | X | X | X | BIBX | FIBX |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| CR#8 | X~X | X | X | X | X | X | X | X | FSNX | FSNX | FSNX | FSNX | FSNX | FSNX | FSNX | FSNX | FSNX | FSNX | FSNX | FSNX |

FIG. 2

| MARKS | NAME | FUNCTION |
|---|---|---|
| RXRS (D0) | RECEIVER RESET | WHEN "1" IS SET, THE RECEPTION CIRCUIT IS INITIALIZED, AND THE RECEPTION PROCESS IS STOPPED. RQOR (D4) OF SR#0 RXOV (D5) OCMS (D12), RVCD (D10-D11), RCFC (D0-D15) OF SR#1, REFC (D0-D17) OF SR#3 ARE RESET. TO FIRMLY RESET THE RESPECTIVE VALUES, THIS BIT VALUE MUST NOT BE CHANGED TO "0" UNTIL RXRR (D1) OF SR#0 IS SET. WHEN "0" IS SET, THE RECEPTION CIRCUIT STARTS THE RECEPTION PROCESS. |
| IFST (D1) | IDENTICAL FRAME MEMORY TRANSMIT STOP | WHEN "1" HAS BEEN SET, IN SUCH A CASE THAT MORE THAN 3 FRAMES ARE NOT RECEIVED, THE FRAMES SUBSEQUENT TO THE THIRD FRAME ARE NOT TRANSFERRED TO THE MEMORY. THESE FRAMES HAVE THE SAME CONTENTS OF DATA PORTION EXCEPT FOR FLAG AND CRC, AND THE SIZES THEREOF ARE SMALLER THAN 5 OCTETS (8 OCTETS WHEN THE VALUE OF HSSL (CR #0 : D8) IS EQUAL TO "1"). |
| LFCE (D2) | LONG FRAME CHECK ENABLE | WHEN "1" IS SET, THE VALUE SET TO LFBD (CR #2 : D0-D12) BECOMES VALID. |
| CLCR (D3) | CLOCK CHECK CONTROL RX | A BIT USED TO DETECT INTERRUPT OF RECEPTION CLOCK. THIS BIT VALUE IS COPIED TO CLSR (SR #0 : D8) EVERY TIME RECEPTION CHANNEL CYCLE. SOFTWARE (CPU) REWRITES THIS BIT VALUE WITH THE CYCLE LONGER THAN THE RECEPTION CHANNEL CYCLE, AND MONITORS AS TO WHETHER OR NOT THE CLSR VALUE IS CHANGED IN RESPONSE TO THE REWRITE CYCLE TO THEREBY DETECT INTERRUPT OF RECEPTION CLOCK. |
| INVD (D4) | INVERT LINE DATA | WHEN "1" IS SET, THE BIT POLARITIES OF TRANSMIT/RECEIVE DATA ARE INVERTED. |

FIG. 3A

| MARKS | NAME | FUNCTION |
|---|---|---|
| IIRE (D5) | INDIVIDUAL INTERRUPT REQUEST ENABLE | WHEN "1" HAS BEEN SET, CORRESPONDING BITS (ROOT (D2),TXUD (D3) PQOR (D4) WITHIN SR#0 ARE SET IN SUCH A CASE THAT RQ FIFO OVERRUN (TX, RX). RX FIFO OVERRUN, TX FIFO UNDERRUN OCCUR. WHEN "0" HAS BEEN SET, EVEN WHEN THE RESPECTIVE PHENOMENA HAPPEN TO OCCUR, THE CORRESPONDING BITS ARE NOT SET. |
| OCME (D6) | OCTET COUNTING MODE ENABLE | IN THE CASE THAT "1" HAS BEEN SET, WHEN ABORT FRAME AND LONG FRAME ARE RECEIVED, THE PRESENT OPERATION MODE IS TRANSFERRED TO OCTET COUNTING MODE. |
| IFFL (D7) | IDENTICAL FRAME FLASH | A BIT WHICH BECOMES VALID WHEN "1" IS SET TO IFST (CR#0 : D1).WHEN "1" IS SET, THE VALUE OF THE SAME FRAME COUNTER IS RESET. AS A RESULT, WHEN THE SAME FRAMES ARE CONTINUOUSLY RECEIVED, THESE FRAMES ARE TRANSFERRED TO MEMORY WITHOUT DISCARDING DATA FOR TWO FRAMES. |
| HSSL (D8) | HIGH SPEED SIGNALLING LINK ENABLE | WHEN "1" IS SET, THE PRESENT CHANNEL CORRESPONDS TO HSSL, SO THAT CONTENTS OF BSNP (CR#3: D0-D15) ARE REWRITTEN INTO THOSE FOR HSSL FRAMES. |

FIG. 3B

| MARKS | NAME | FUNCTION |
|---|---|---|
| TXRS (D0) | TRANSMITTER RESET | WHEN "1" IS SET, THE TRANSMITTER CIRCUIT IS INITIALIZED, AND MARK IDLE IS SENT OUT TO LINE. ALSO, RQOT (D2) OF SR#0,TXLLD (D3), TCFC (D0-D15) OF SR#2 ARE RESET. TO FIRMLY RESET THE VARIOUS VALUES, THE VALUE OF THIS BIT MUST NOT BE CHANGED INTO "0" UNTIL TXRR (D0) OF SR#0 IS SET. WHEN "0" IS SET, THE RECEPTION PROCESS IS COMMENCED BY THE TRANSMITTER CIRCUIT. |
| NRZI (D3) | LINE CODE WITH NRZI | WHILE "1" IS SET, TRANSMIT/RECEIVE DATA IS HANDLED AS NRZI CODE. |
| IDSL (D4) | MARK OR FLAG IDLE SELECT | WHILE "1" IS SET, MARK IDLE IS TRANSMITTED WHEN IDLE IS SENT. WHILE "0" IS SET, FLAG IDLE IS TRANSMITTED WHEN IDLE IS SENT. |
| IFSL (D5) | DOUBLE OR SINGLE INTER-FRAME FLAG SELECT | WHILE "1" IS SET, WHEN THE FRAMES ARE CONTINUOUSLY TRANSMITTED, A SINGLE FLAG FUNCTIONING AS CLOSE FLAG, OPEN FLAG IS SANDWICHED BETWEEN FRAMES. WHILE "0" IS SET, OPEN FLAG AND CLOSE FLAG ARE CONTINUOUSLY ADDED BEFORE/AFTER EACH FRAME. |
| FIBE (D6) | FIB PATTER ENABLE | ONLY WHILE "1" IS SET, FIB BIT IS TRANSMITTED. WHEN FIBU (TX FIFO:D39) IS "1", THE VALUE OF FIBP (CR#1=D7) IS TRANSMITTED AS FIB BIT, WHEREAS WHEN FIBU IS "0", THE SAME VALUE OF FIB BIT IN PREVIOUS BIT IS TRANSMITTED. |
| FIBP (D7) | FIB PATTERN | WHEN FIB BIT REWRITE CONDITION IS SATISFIED, FIB PATTERN TO BE TRANSMITTED IS SET. |

FIG. 4A

| MARKS | NAME | FUNCTION | | | | | | |
|---|---|---|---|---|---|---|---|---|
| IIDN (D8-D11) | INTERFACE IDLE NUMBER | WHEN THE FRAMES ARE CONTINUOUSLY TRANSMITTED, THE NUMBER OF IDLE INSERTED BETWEEN THE FRAMES IS SET. | | | | | | |
| | | D13 | D12 | D11 | D10 | D09 | D08 | IDLE NUMBER BETWEEN FRAMES |
| | | 0 | 0 | 0 | 0 | 0 | 0 | NO IDLE IS INSERTED |
| | | 0 | 0 | 0 | 0 | 0 | 1 | IDLE FOR 8 OCTETS IS INSERTED |
| | | 0 | 0 | 0 | 0 | 1 | 0 | IDLE FOR 16 OCTETS IS INSERTED |
| | | | | | | | | |
| | | 1 | 1 | 1 | 1 | 1 | 0 | IDLE FOR 496 OCTETS IS INSERTED |
| | | 1 | 1 | 1 | 1 | 1 | 1 | IDLE FOR 504 OCTETS IS INSERTED |
| CLCT (D16) | CLOCK CHECK CONTROL TX | BIT USED TO DETECT INTERRUPT OF TRANSMISSION CLOCK. THE VALUE OF THIS BIT IS COPIED TO CLST (SR#0:D9) EVERY TRANSMISSION CHANNEL CYCLE. SOFTWARE (CPU) MONITORS SUCH A CONDITION THAT THE VALUE OF THIS BIT IN A CYCLE LONGER THAN THE TRANSMISSION CHANNEL CYCLE IS REWRITTEN, AND THE VALUE OF CLST IS CHANGED IN RESPONSE TO THE REWRITE CYCLE IN ORDER TO DETECT THE INTERRUPT OF TRANSMISSION CLOCK. | | | | | | |

FIG. 4B

| MARKS | NAME | FUNCTION | | | | |
|---|---|---|---|---|---|---|
| LFBD (D0-D12) | LONG FRAME BOUNDARY | WHEN OCTET NUMBER OF FRAME UNDER RECEPTION EXCEED THIS SET VALUE, TRANSFERRING OF SUBSEQUENT OCTET NUMBERS TO THE MEMORY IS INTERRUPTED WHEN THE TRANSFER OPERATION TO THE MEMORY IS INTERRUPTED, THE FRAME END CONDITION IS JUDGED IN SUCH A CASE THAT THE FRAME RECEPTION IS COMPLETED, AND THEN THE JUDGEMENT RESULT IS TRANSFERRED TO THE MEMORY. THE ABOVE-DESCRIBED PROCESS OPERATION IS CARRIED OUT ONLY WHEN "1" IS SET TO LFCE (CR#0 : D2). | | | | |
| SFBD (D15-D17) | SHORT FRAME BOUNDARY | WHEN THE OCTET NUMBER OF THE RECEIVED FRAME EXCEPT FOR CRC IS SMALLER THAN, OR EQUAL TO THIS SET VALUE, THIS FRAME IS DISCARDED WITHOUT TRANSFERRING THE CONTENT OF THIS FRAME TO THE MEMORY. | | | | |
| | | | D17 | D16 | D15 | FRAME TO BE DISCARDED |
| | | | 0 | 0 | 0 | FRAME WITH ONLY CRC |
| | | | 0 | 0 | 1 | FRAME SMALLER THAN, OR EQUAL TO CRC+1 OCTET |
| | | | 0 | 1 | 0 | FRAME SMALLER THAN, OR EQUAL TO CRC+2 OCTETS |
| | | | 0 | 1 | 1 | FRAME SMALLER THAN, OR EQUAL TO CRC+3 OCTETS |
| | | | 1 | 0 | 0 | FRAME SMALLER THAN, OR EQUAL TO CRC+4 OCTETS |
| | | | 1 | 0 | 1 | FRAME SMALLER THAN, OR EQUAL TO CRC+5 OCTETS |
| | | | 1 | 1 | 0 | FRAME SMALLER THAN, OR EQUAL TO CRC+6 OCTETS |
| | | | 1 | 1 | 1 | FRAME SMALLER THAN, OR EQUAL TO CRC+7 OCTETS |

FIG. 5

| MARKS | NAME | FUNCTION |
|---|---|---|
| BSNP (D0-D15) | BSN AND BIB PATTERN | WHEN "1" IS SET TO BSN (CR#3 :D13), THIS SET VALUE IS SENT. WHEN HSSL (CR# :D8) IS "1", THE CONTENT OF D0-D11 IS HANDLED AS BSN, AND THE VALUE OF D15 HANDLED AS BIB (D12-D14 BEING RESERVE). WHEN HSSL (CR#0 :D8) IS "0", THE CONTENT OF D0-D7 IS HANDLED AS BSN, AND THE VALUE OF D8 IS HANDLED AS BIB (D9-D15 BEING EMPTY). |
| BSNT (D16) | BSN AND BIB TRANSMIT | WHEN "1" IS SET, THE CONTENT OF BIT OF BSNP, CORRESPONDING TO HSSL VALUE AT THIS TIME IS TRANSMITTED (IN CASE OF HSSL=0, D0-D7, AND IN CASE OF HSSL=1, D0-D15). |

FIG. 6

| MARKS | NAME | FUNCTION |
|---|---|---|
| SSPM (D0) | SUPER SUPPRESS MODE | WHEN "1" IS SET, THE SUPER SUPPRESS MODE IS SET. IN THE CASE THAT BSN VALUE ≤ IBSN (CR#5 :D0-D11) AND ≥ MBSN (CR#6 :D0-D11), AND ALSO BIB/FIB/FSN VALUES ARE EQUAL TO THOSE OF THE PRECEDING FRAME, AND THE FRAMES ARE CONTINUOUSLY RECEIVED, THE FRAMES SUBSEQUENT TO THE THIRD FRAME ARE DISCARDED WITHOUT BEING SENT TO MEMORY. SETTING OF "1" TO THE PRESENT BIT (NAMELY, TRANSFER TO SUPER SUPPRESS MODE) IS PERFORMED BY SOFTWARE, WHEREAS SETTING OF "0" ( NAMELY, RELEASING OF SUPER SUPPRESS MODE) IS CARRIED OUT BY EITHER SOFTWARE OR THE SIGNAL PROCESSING CIRCUIT. THE SIGNAL PROCESSING CIRCUIT IS RELEASED UNDER SUCH A CONDITION: WHEN THE FRAME IS MSU, IBSN ≤ BSN ≤ MBSN IS NOT SATISFIED. OTHERWISE, BIB/FIB VALUE IS NOT MADE COINCIDENT WITH THE VALUE OF PRECEDING FRAME. IN THE CASE OF FISU, IBSN ≤ BSN ≤ MBSN IS NOT SATISFIED. OTHERWISE, BIB/FIB/FSN VALUE IS NOT MADE COINCIDENT WITH THE VALUE OF PRECEDING FRAME. |

FIG. 7

| MARKS | NAME | FUNCTION |
|---|---|---|
| IBSN (D0-D12) | MINIMUM BSN | IN THE SUPER SUPPRESS MODE, THE LOWER LIMIT VALUE OF THE BSN VALUE IS SET WHICH IS USED AS THE FRAME DISCARD CONDITION. THE PRESENT DATA IS INITIALIZED BY SOFTWARE. THE VALUE OF THIS DATA IS REWRITTEN BY THE RECEPTION SIGNAL PROCESSING CIRCUIT TO A VALUE CORRESPONDING TO THE RECEIVED FRAME. |

FIG. 8

| MARKS | NAME | FUNCTION |
|---|---|---|
| MBSN (D0-D012) | MAX BSN | IN THE SUPER SUPPRESS MODE, THE UPPER LIMIT VALUE OF THE BSN VALUE IS SET WHICH IS USED AS THE FRAME DISCARD CONDITION. THE PRESENT DATA IS SET BY SOFTWARE. |

FIG. 9

| MARKS | NAME | FUNCTION |
|---|---|---|
| FIBX (D0) | FIB EXPECTED | IN THE SUPER SUPPRESS MODE, THE FIB VALUE IS SET WHICH IS COMPARED WITH THE FIB VALUE CONTAINED IN THE FRAME. THIS DATA IS SET BY SOFTWARE. |
| FIBX (D2) | BIB EXPECTED | IN THE SUPER SUPPRESS MODE, THE BIB VALUE IS SET WHICH IS COMPARED WITH THE FIB VALUE CONTAINED IN THE FRAME. THIS DATA IS SET BY SOFTWARE. |

FIG. 10

| MARKS | NAME | FUNCTION |
|---|---|---|
| FSNX (D0-D11) | FSN EXPECTED | IN THE SUPER SUPPRESS MODE, THE FSN VALUE IS SET WHICH IS COMPARED WITH THE FSN VALUE CONTAINED IN THE FRAME. THIS DATA IS INITIALIZED BY SOFTWARE. THIS DATA IS UPDATED AS SUCH A VALUE OBTAINED BY ADDING 1 TO THE FSN VALUE CONTAINED IN THE FRAME BY THE RECEPTION SIGNAL PROCESSING CIRCUIT EVERY TIME THE FRAME IS RECEIVED. |

FIG. 11

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| SR#0 | X~X | X | X | X | LFRI | X | X | OCMS | RVCD | CLST | CLSR | X | FLSR | RXOV | RQOR | TXUD | RQOT | RXRR | TXRR |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| SR#1 | X~X | X | X | X | RCFC | | | | | | | | | | | | | | |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| SR#2 | X~X | X | X | X | TCFC | | | | | | | | | | | | | | |

| | 31~19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|
| SR#3 | X~X | X | REFC | | | | | | | | | | | | | | | | |

FIG. 12

| MARKS | NAME | FUNCTION |
|---|---|---|
| TXRS (D0) | TRANSMITTER RESET RECEPTION | INDICATE THAT THE TRANSMITTER CIRCUIT ACCEPTS THE INSTRUCTION OF TXRS (CR#1 :D0) |
| RXRR (D1) | RECEIVER RESET RECEPTION | INDICATE THAT THE RECEIVER CIRCUIT ACCEPTS THE INSTRUCTION OF RXRSC (CR#D : D0) |
| RQOT (D2) | RECEIVER OVERRUN ON TRANSMITTER SIDE | THE PRESENT BIT IS SET UNDER CONDITION THAT WHEN THE TRANSMITTER CIRCUIT TRIES TO WRITE THE TRANSMIT DATA REQUEST INTO RQ FIFO, THE TRANSMITTER CIRCUIT IS BROUGHT INTO OVERRUN. THE BIT SETTING OPERATION IS CARRIED OUT IRRESPECTIVE OF THE VALUE OF IIRE (CR#0 : D5). ONCE THIS BIT IS SET, THIS BIT IS NOT RESET UNTIL THE TRANSMITTER CIRCUIT IS INITIALIZED BY TXRS (CR#0 :D0) |
| TXUD (D3) | RECEIVER OVERRUN ON TRANSMITTER SIDE | THE PRESENT BIT IS SET UNDER CONDITION THAT THE TRANSMITTER CIRCUIT TRIES TO READ THE TRANSMIT DATA FROM TX FIFO, THE TRANSMITTER CIRCUIT IS BROUGHT INTO OVERRUN. THIS BIT SETTING OPERATION IS CARRIED OUT IRRESPECTIVE OF THE VALUE OF IIRE (CR#0 : D5). ONCE THIS BIT IS SET, THIS BIT IS NOT RESET UNTIL THE TRANSMITTER CIRCUIT IS INITIALIZED BY TXRS (CR#1 :D0) |
| RQOR (D4) | RECEIVER OVERRUN ON RECEIVER SIDE | THE PRESENT BIT IS SET UNDER CONDITION THAT WHEN THE (RECEIVER) CIRCUIT TIES THE WRITE THE (RECEIVE) DATA REQUEST INTO RQ FIFO, THE RECEIVER CIRCUIT IS BROUGHT INTO OVERRUN. THE BIT SETTING OPERATION IS CARRIED OUT IRRESPECTIVE OF THE VALUE OF IIRE (CR#0 : D5). ONCE THIS BIT IS SET, THIS BIT IS NOT RESET UNTIL THE RECEIVER CIRCUIT IS INITIALIZED BY RXRS (CR#0 :D0) |
| RXOV (D5) | RECEIVER OVERRUN | THE PRESENT BIT IS SET UNDER CONDITION THAT THE RECEIVER CIRCUIT TRIES TO WRITE THE RECEIVE DATA FROM RX FIFO, THE RECEIVER CIRCUIT IS BROUGHT INTO OVERRUN. THIS BIT SETTING OPERATION IS CARRIED OUT IRRESPECTIVE OF THE VALUE OF IIRE (CR#0 :D5)/ ONCE THIS BIT IS SET, THIS BIT IS NOT RESET UNTIL THE RECEIVER CIRCUIT IS INITIALIZED BY RXRS (CR#0 : D0) |

FIG. 13A

| MARKS | NAME | FUNCTION |
|---|---|---|
| FLSR (D6) | IDENTICAL FRAME FLASH RECEPTION | INDICATE THAT THE RECEIVER CIRCUIT ACCEPTS THE INSTRUCTION OF IFFL (CR#0 :D7) |
| CLSR (D8) | CLOCK CHECK STATUS RX | A BIT USED TO DETECT INTERRUPT OF RECEPTION CLOCK CORRESPONDING TO CLCR (CR#0 :D3). A CONTENT OF THIS BIT IS READ BY SOFTWARE. |
| CLST (D9) | CLOCK CHECK STATUS TX | A BIT USED TO DETECT INTERRUPT OF RECEPTION CLOCK CORRESPONDING TO CLCT (CR#1 :D12). A CONTENT OF THIS BIT IS READ BY SOFTWARE. |
| RVCD (D10-D11) | RECEIVER CONDITION | DATA INDICATIVE OF A RECEPTION CONDITION IS HELD WHEN THE RECEPTION CIRCUIT IS INITIALIZED BY RXRS (CR#0 :D0), DATA ("00") INDICATIVE OF FLAG SEARCH STATE IS SET. |

| D11 | D10 | STATE |
|---|---|---|
| 0 | 0 | FLAG SEARCH |
| 0 | 1 | FLAG DETECT |
| 1 | 0 | IN FRAME |
| 1 | 1 | IDLE |

| MARKS | NAME | FUNCTION |
|---|---|---|
| OCMS (D12) | OCTET COUNTING MODE STATE | THE PRESENT BIT INDICATES AS TO WHETHER OR NOT THE PRESENT MODE IS UNDER OCTET COUNTING MODE, AND IS RESET BY THE FOLLOWING CONDITION. 1) SET RXRS (CR0:D0) (INITIALIZATION OF THE RECEIVER CIRCUIT). 2) SET "0" TO OCME (CR#0 :D6) 3) RECEPTION OF NORMAL FRAME. |
| LFRI (D15) | LONG FRAME RECEIVE INDICATON | THE PRESENT BIT IS SET WHEN LONG FRAME IS DETECTED, AND RESET WHEN LONG FRAME IS ENDED, SINCE THIS BIT VALUE IS MONITORED, IT IS POSSIBLE TO DETECT ----------? |

FIG. 13B

| MARKS | NAME | FUNCTION |
|---|---|---|
| RCFC (D0-D15) | RECEIVED CORRECT FRAME COUNT | A COUNT VALUE ( UP TO $2^{15}-1$) OF RECEIVED NORMAL FRAMES IS STORED. WHEN THE RECEPTION CIRCUIT IS INITIALIZED BY RXRS (CR#0 : D0), AND ALSO THE RECEPTION CIRCUIT IS UNDER OVER FLOW STATE, THIS COUNT VALUE IS RESET, AND IS INCREMENTED BY "1" EVERY TIME THE NORMAL FRAME IS RECEIVED. |

FIG. 14

| MARKS | NAME | FUNCTION |
|---|---|---|
| TCFC (D0-D15) | TRANSMIT CORRECT FRAME COUNT | A COUNT VALUE ( UP TO $2^{15}-1$) OF RECEIVED NORMAL FRAMES IS STORED. WHEN THE TRANSMISSION CIRCUIT IS INITIALIZED BY TXRS (CR#1 : D0), AND ALSO THE TRANSMISSION CIRCUIT IS UNDER OVER FLOW STATE, THIS COUNT VALUE IS INCREMENTED BY "1" EVERY TIME THE NORMAL FRAME IS RECEIVED. |

FIG. 15

| MARKS | NAME | FUNCTION |
|---|---|---|
| REFC (D0-D17) | RECEIVED ERROR FRAME COUNT | A COUNT VALUE ( UP TO $2^{19}-1$) OF RECEIVED ABNORMAL FRAMES IS STORED. WHEN THE RECEPTION CIRCUIT IS INITIALIZED BY RXRS (CR#0 : D0), AND ALSO THE RECEPTION CIRCUIT IS UNDER OVER FLOW STATE, THIS COUNT VALUE IS RESET, AND IS INCREMENTED BY "1" EVERY TIME THE ABNORMAL FRAME IS RECEIVED. |

FIG. 16

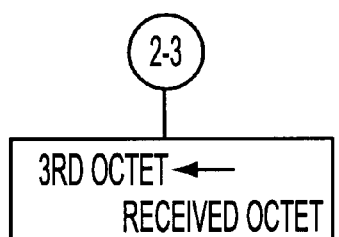
FIG. 26A
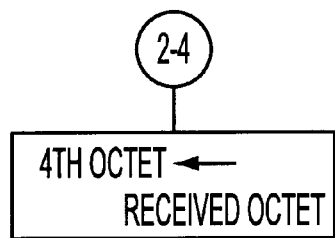
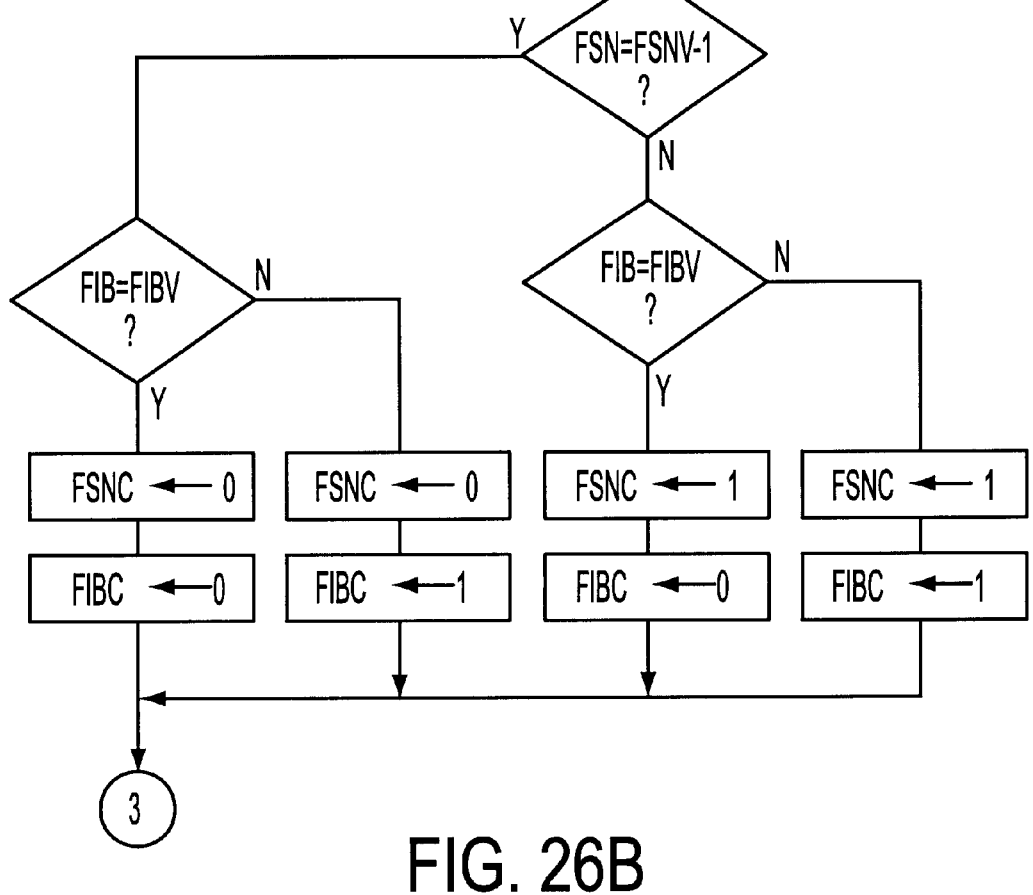
FIG. 26B

COMMUNICATION SIGNAL SUPPRESSING APPARATUS AND COMMON LINE SIGNAL APPARATUS CAPABLE OF REDUCING WORKLOAD OF FIRMWARE

BACKGROUND OF THE INVENTION

1. Field of the Invention

The present invention generally relates to a communication signal suppressing apparatus and a common line signal apparatus employed in, for instance, the No. 7 common line signal system. More specifically, the present invention is directed to such a communication signal suppressing apparatus and a common line signal apparatus capable of reducing workloads given to firmware.

2. Description of the Related Art

Common line signal apparatuses used in the No. 7 common line signal system are realized by utilizing not only hardware, but also firmware (software), as well known in this field. Concretely speaking, an apparatus portion of such a common line signal apparatus in which a simple (regular) process operation, e.g., "0" insertion/deletion and CRC check is performed is realized by hardware (LSI), whereas another apparatus portion thereof in which an abnormal condition of a received number and so on can be solved is realized by using firmware.

In general, it is preferable to reduce workloads given to firmware sides (CPU sides) of appliances operable with firmware. This load reducing technique is similarly applied to common line signal apparatuses in order to reduce workloads given to firmware sides thereof. For example, in the case of the No. 7 common line signal system, there are possibilities that frames having the same contents (FISU: Fill in Signal Unit) which own merely meaning of a confirmation response are received many times, due to protocol characteristics. To avoid that such useless frames are transferred to the firmware sides, in the case that FISUs having the same contents are continuously received in the presently available common line signal apparatus, the following suppressing hardware is employed. That is, this suppressing hardware can suppress the FISUs having the same contents subsequent to the second (or third) FISU, namely the hardware can discard the same FISUs without transferring these same FISUs to the firmware side.

However, when the common line signal apparatus is arranged in order to reduce product cost thereof, by which a plurality of channels can be accepted, the random occurrence possibilities of FISUs are increased. As a result, there is such a problem that the workload given to the firmware side cannot be reduced by the above-explained suppressing function.

Therefore, the present invention has been made to solve the above-described problem, and has an object to provide a communication signal suppressing apparatus capable of reducing a workload given to a firmware-operated portion of this communication signal suppressing apparatus while a communication signal apparatus typically known as a common line signal apparatus is constituted.

Another object of the present invention is to provide a common line signal apparatus capable of reducing a workload given to a firmware-operated portion thereof.

SUMMARY OF THE INVENTION

In accordance with an aspect of the present invention, a communication signal suppressing apparatus operatively connected to a processing apparatus whose operation sequence is determined based upon firmware so as to constitute a communication signal apparatus is comprised of: storage means for storing therein both a minimum value of an expected value of a reverse-direction sequence number and a maximum value thereof, the processing apparatus being capable of accessing the storage means; rewriting means for rewriting the minimum value stored in the storage means based upon a reverse-direction sequence number of a received frame in such a case that the reverse-direction sequence number of the received frame is present within a range defined by the minimum value and the maximum value stored in the storage means, and furthermore, a reverse-direction state indication bit of the received frame, a forward-direction state indication bit thereof, and a forward-direction sequence number thereof are made coincident with a reverse-direction state indication bit of a previously received frame, a forward-direction state indication bit thereof, and a forward-direction sequence number thereof, respectively; and frame output means for discarding the frame which has been used to rewrite the minimum value stored in the storage means by the rewriting means, and for outputting a content of a frame which has not been used to rewrite the minimum value to the processing apparatus.

In other words, the communication signal suppressing apparatus of the present invention does not discard the frames having the same contents, but owns the following function. That is, a frame having only meaning of a confirmation response is discarded, and the latest value of the reverse-direction sequence number of the discarded frame is stored in the storage means. Accordingly, in such a case that a communication signal apparatus such as a common line signal apparatus is constituted by using the communication signal suppressing apparatus of the present invention, the processing apparatus operatively connected to this circuit can acquire the reverse-direction sequence numbers at arbitrary timing in a batch mode without checking the contents thereof every time the confirmation response is received. The reverse-direction sequence numbers correspond to such information required to confirm that the transmitted frame is actually delivered to the communication party. This processing apparatus is constructed of a CPU, a ROM for storing thereinto firmware used to define an operation sequence thereof, a RAM for temporarily saving data given by the frame, and so on. As a consequence, when this communication signal suppressing apparatus is employed, the workload given to the processing apparatus with employment of the firmware can be reduced, and also such a communication signal apparatus capable of storing a plurality of channels can be simply realized.

It should be understood that when this communication signal suppressing apparatus is arranged by holding only the reverse-direction sequence numbers of the discarded frames, the processing apparatus cannot recognize the number of frames discarded by this circuit. As a consequence, when a communication signal suppressing apparatus is arranged in accordance with the present invention, it is preferable to additionally provide such a counting means for counting a total number of received frames, depending on sorts of these received frames.

Alternatively, a communication signal suppressing apparatus according to the present invention may be arranged in such a manner that this communication signal suppressing apparatus can be operatively connected to the existing communication signal apparatus. In other words, the communication signal suppressing apparatus according to the present invention may be arranged as an externally equipped circuit of a communication signal apparatus. This communication signal suppressing apparatus may suppress such a frame having only meaning of a confirmation response, among the entered frames.

In accordance with the present invention, since the amount of data to be processed by the firmware can be reduced, for instance, a common line signal apparatus for accepting multiple channels can be simply realized at a low cost.

BRIEF DESCRIPTION OF THE DRAWINGS

For a better understanding of the present invention, reference is made of a detailed description to be read in conjunction with the accompanying drawings, in which:

FIG. 2 is an explanatory diagram for explaining bit structures of control registers CR#0 to CR#8 provided in the common line signal apparatus of the embodiment shown in FIG. 1.

FIGS. 3A and 3B are an explanatory diagram for explaining functions of the respective data used in the control register CR#0 provided in the common line signal apparatus of the present embodiment;

FIGS. 4A and 4B are an explanatory diagram for explaining functions of the respective data used in the control register CR#2 provided in the common line signal apparatus of the present embodiment;

FIG. 5 is an explanatory diagram for explaining functions of the respective data used in the control register CR#2 provided in the common line signal apparatus of the present embodiment;

FIG. 6 is an explanatory diagram for explaining functions of the respective data used in the control register CR#3 provided in the common line signal apparatus of the present embodiment;

FIG. 7 is an explanatory diagram for explaining functions of the respective data used in the control register CR#4 provided in the common line signal apparatus of the present embodiment;

FIG. 8 is an explanatory diagram for explaining functions of the respective data used in the control register CR#5 provided in the common line signal apparatus of the present embodiment;

FIG. 9 is an explanatory diagram for explaining functions of the respective data used in the control register CR#6 provided in the common line signal apparatus of the present embodiment;

FIG. 10 is an explanatory diagram for explaining functions of the respective data used in the control register CR#7 provided in the common line signal apparatus of the present embodiment;

FIG. 11 is an explanatory diagram for explaining functions of the respective data used in the control register CR#8 provided in the common line signal apparatus of the present embodiment;

FIG. 12 is an explanatory diagram for explaining bit structures of state registers SR#0 to SR#3 employed in the common line signal apparatus of the present embodiment;

FIGS. 13A and 13B are an explanatory diagram for explaining functions of the respective data used in the state register SR#0 provided in the common line signal apparatus of the present embodiment;

FIG. 14 is an explanatory diagram for explaining functions of the respective data used in the state register SR#1 provided in the common line signal apparatus of the present embodiment;

FIG. 15 is an explanatory diagram for explaining functions of the respective data used in the state register SR#2 provided in the common line signal apparatus of the present embodiment;

FIG. 16 is an explanatory diagram for explaining functions of the respective data used in the state register SR#3 provided in the common line signal apparatus of the present embodiment;

FIG. 26 is a flow chart for further describing a sequential operation of an RX-C employed in the reception signal processing circuit shown in FIG. 17;

DETAILED DESCRIPTION OF THE PREFERRED EMBODIMENTS

Referring now to drawings, various preferred embodiments according to the present invention will be described in detail.

Figure 1:
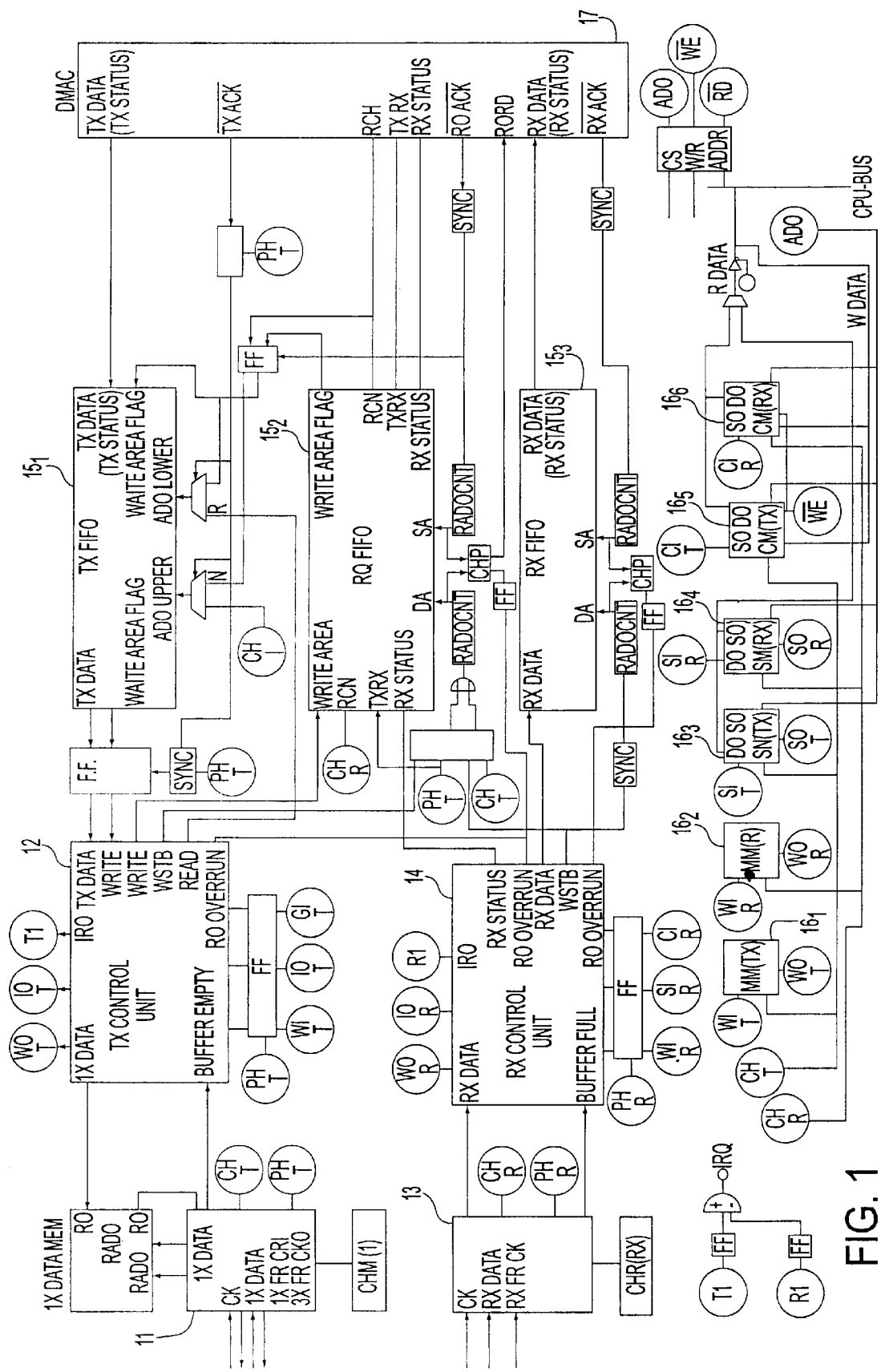
FIG. 1 schematically shows a circuit arrangement of a major portion of a common line signal apparatus according to one preferred embodiment of the present invention.

FIG. 1 is a circuit diagram indicating a major circuit arrangement of a common line signal apparatus according to a preferred embodiment of the present invention. As illustrated in this drawing, the common line signal apparatus of this embodiment is arranged by a transmission interface circuit 11; a transmission signal processing circuit 12; a reception interface circuit 13; a reception signal processing circuit 14; 3 sets of FIFO memories 151 to 153 (TX FIFO, RQ FIFO, RX FIFO); 6 sets of memories 161 to 166; a DMAC (Direct Memory Access Controller) 17; and a CPU bus 18. Although not shown in this drawing, a CPU is connected to this CPU bus 18 which may also constitute the constructive elements of the common line signal apparatus according to this embodiment.

The reception interface circuit 13 is a circuit for converting a signal received from a signal line into such a signal having a format which can be handled by the reception signal processing circuit 14. The reception signal processing circuit 14 corresponds to a so-called "LSI". The reception signal processing circuit 14 performs a "0" elimination, a CRC check, and the like with respect to data received from the reception interface circuit 13, and supplies to the RX FIFO only such data that is required to be applied to the CPU by using the memory 16. Conversely, the transmission signal processing circuit 13 executes a "0" insertion and a CRC addition with respect to data transferred from the CPU. The transmission interface circuit 11 converts data given from the transmission signal processing circuit 12 into data having such a format that can be sent to the signal line. The DMAC 17 is connected to the CPU bus 18 (not shown in detail). This DMAC 17 accesses to the respective FIFOs in conjunction with the CPU in order to transfer data between the respective FIFOs and a memory (not shown).

Among the memories 161 to 166 provided in this common line signal apparatus, the memory 161 which is designated by a symbol "WM(TX)" will constitute a work memory (WM) used as a work register group by the transmission-sided circuit. Also, the memory 162 which is designated by a symbol "WM(RX)" will constitute a work memory utilized as a work register group by the reception-sided circuit.

Then, among the four remaining memories 163 to 166, the memories 163 and 164 which are designated by symbols "SM" will constitute memories which are used as a register group (will be referred to as a "state register" hereinafter) for storing thereinto respective data of states of a line by the transmission-sided circuit and the reception-sided circuit. Also, the memories 165 and 166 which are designated by symbol "CM" will constitute memories which are used as a register group (will be referred to as a "control register" hereinafter) for storing thereinto control data given from the CPU by the transmission-sided circuit and the reception-sided circuit, respectively. As a consequence, as shown in this drawing, the memories 165 and 166 are connected to the CPU bus 18 and the like. Further, the memories 163 and 164 are connected to the CPU bus 18 and the like in order that the line state (namely, operation state of circuit) can be recognized by the CPU.

In FIG. 2, there is shown a bit structure of a control register CR provided within this apparatus. FIG. 3A through FIG. 11 represent functions of data used within the respective control registers shown in FIG. 2. FIG. 12 represents a bit structure of a typical state register. FIG. 13A to FIG. 16 show functions of data used in the respective state registers illustrated in FIG. 12. It should be noted that although not shown in the drawings, state registers for counting a total transmission number and/or a total reception number of LSSU and FISU are provided in addition to the above-described state registers shown in FIG. 12.

First, functions (operations) of the above-explained common line signal apparatus according to this embodiment will now be summarized with reference to these drawings.

<TRANSMISSION FUNCTION>

The common line signal apparatus according to this embodiment owns the below-mentioned transmission function similar to that of the conventional common line signal apparatus.

(1) Commencement of Transmission

As illustrated in FIG. 4A, when "1" is set to a TXRS (Transmitter Reset; CR#1: D0), the transmission-sided circuit and the respective SRs are initialized to thereby stop the transmission. It should also be noted that "1" is continuously transmitted to the line at this time.

When "0" is set to the TXRS, the transmission is commenced. Either an idle pattern or a frame is transmitted.

(2) Transmission Idle Pattern

The idle pattern to be transmitted will constitute an idle pattern (Mark Idle, or Flag Idle) corresponding to a set value of an IDSL (Mark or Flag Idle Select; CR#1: D4).

(3) Common Use of Open/Close Flag

In such a case that frames are continuously transmitted Flags, the quantity of which is equal to a set value of IFSL (Double or Single Inter-frame Flag Select; CR#1: D5), are interposed between the frames. Concretely speaking, when "1" is set to the IFSL, if the frames are continuously transmitted, then a single flag functioning as both a close flag and an open flag is interposed between the frames. On the other hand, in the case that "0" is set to the IFSL, two flags are interposed between the frames, each of which may function as both a close flag and an open flag.

(4) Transmission of Abort Frame

An abort frame does not positively own a transmission function. It should be understood that when "1" is set to the TXRS (CR#1: D0), as previously explained, since "1" is continuously transmitted to the line, if the frames are under transmission at this time, then the abort frame is transmitted.

(5) Detection of Clock Interrupt on Transmission

The transmission signal processing circuit copies the content of CLCT (CR#1: D15) to CLST (SR#0: D9; see FIG. 13) every time a transmission channel is once processed, the CPU sets either "0" or "1" to CLCT, and checks whether or not the content of CLCT is reflected to CLST after a time period of a transmission channel has passed. Then, when the content is not copied, the CPU judges that the clock interrupt occurs.

In other words, when the clock on the transmission line is interrupted, the content of CLCT is not copied to CLST. The CPU utilizes this operation so as to detect the clock interrupt.

(6) Insertion of Idle Pattern into Frames

The idle patterns for 0 to 504 octets (in every 8 octets) can be inserted into the continuously transmitted frames by setting "00000" to "11111" to IIDN (CR#1: D8–D13). At this time, the idle patterns to be inserted may correspond to the set values of IDSL (CR#1: D4).

(7) Automatic Transmission of BSN

As illustrated in FIG. 6, when "1" is set to BSNT (CR#3: D16), the content of BSNP (BSN & BIB Pattern: D0–D15) is set to the transmission frame.

It should be noted that when HSSL (CR#0: D8) is equal to "1", the value of D0–D11 is handled as BSN (sequence number in reverse direction). Then, the value of D15 is handled as BIB (reverse direction state indication bit), and these values are set to the first octet and the second octet of the transmission frame. On the other hand, when HSSL (CR#0: D8) is equal to "0", the value of D0–D7 is handled as BSN and the value of D8 is handled as BIB. These values are set to the first octet of the transmission frame.

Since this function is realized in this common line signal apparatus, even when a plurality of transmission frames are tuned, this common line signal apparatus can quickly send out the reception confirmation (acknowledgment).

(8) Automatic Transmission of FIB

As illustrated in FIG. 13A, the transmission signal processing circuit transmits the frame in such a case that the value of FIBE (CR#1: D6) is equal to "1" and the value of FIBU (TX FIFO: D39) is equal to "1", after the value of FIB (forward direction state indication bit) is rewritten into the value of FIBP (CR#1: D7). When the value of FIBE is equal to "1" and the value of FIBU is equal to "0", the transmission signal processing circuit transmits FIB identical to the previously sent FIB. Then, when the value of FIBE is equal to "0", the transmission signal processing circuit does not perform any process operation (namely, FBI is not rewritten/transmitted).

(9) Automatic Transmission of Empty Transmission Frame

When there is no frame to be transmitted, such a frame (namely, FISU: Fill in Signal Unit) is produced to transmitted in response to a designation made by the DMAC (in actual case, designated by descriptor of memory). That is, this frame owns BSN and BIB having the same contents of BSNP; FSN (forward direction sequence number) and FIB of the preceding frame, and FSN and FIB having the same contents of FIB, in such a manner that "0" is set to LI.

(10) Statistical Function

The value of TCFC (SR#3: D0–D15) is incremented by 1 every time the frame is sent. In other words, the number of transmitted frames is counted up to 216–1. The value of TCFC is cleared when TXRS (CR#1: D0) is set and TCFC is under over flow.

Also, the common line signal apparatus owns a function for incrementing the counter for FISU/LSSU by 1 every time FISU/LSSU is transmitted.

<RECEPTION FUNCTION>

The common line signal apparatus according to this embodiment owns a suppression function called as a "super suppress mode" in addition to the reception function similar to that of the conventional common line signal, as will be described later.

(1) Commence/Stop of Reception

As illustrated in FIG. 3A, when "1" is set to RXRS (Receiver Reset; CR#0: D0), a bit value of each of SRs related to the reception is initialized, and then the reception operation is stopped. When "0" is set to RXRS, the reception operation is commenced, so that the reception signal processing circuit is brought into a "flag search state" (will be discussed in detail).

(2) Reception Condition

As states of the reception line, there are a "flag search state", a "flag detect state", an "in-frame state", and an "idle state". A present reception state is displayed on RVCD (SR#0: D10–D11) (see FIGS. 13A and 13B).

Among these reception line states, the flag detect state is such a state that either a idle flag or an open/close flag is being received. The in-frame state is such a state that either data or a CRC code contained in a frame is being received. The idle state is such a state that when 15 sets of "1" are continuously received, the present condition is moved to this idle state. Thereafter, this idle state is maintained while "1" is continuously received. The flag search state corresponds to any state other than the flag detect state, the in-frame state, and the idle state.

(3) Completion of Frame Reception

The frame reception is completed in case of "normal end" or "abnormal end". The completion state is reflected via the DMAC to the descriptor of the memory except for a short frame.

The reception signal processing circuit recognizes the completion state as "abnormal end" in such a case that any one of the below-mentioned conditions is satisfied:

(a) A CRC check result becomes "NG".

(b) A bit number of received data is not equal to a multiple of 8.

(c) An "abort" is received.

(d) An octet number except for CRC of a received frame is smaller than the octet numbers (0to 6) designated by SFBD (CR#2: D15 to D17).

(e) An octet number except for CRC of an received frame exceeds the octet number designated by LFBD (CR#2: D0–D12).

It should be understood that since a frame (short frame) for satisfying the condition (d) is deleted in the reception signal processing circuit without transferring the content of the frame to the memory, the completion condition thereof is not reflected to the descriptor of the memory. Also, as to a frame (long frame) for satisfying the condition (e), if this long frame also satisfies other conditions, the conditions thereof are also displayed on the descriptor.

Then, when none of the above-described conditions can be satisfied, the reception signal processing circuit recognizes the completion condition of the frame reception as "normal end".

(4) Transfer of Reception Data to Memory (Processing of Short/Long Frames)

The data contained in the received frame, which are defined by the data subsequent to the open flag and by the data immediately before the CRC code, are transferred to the memory. In the case of "abort completion", 2 octets immediately before the abort sequence (namely, continuous reception of 7 sets of "1") are regarded as "CRC", and the data preceding the 2 octets are transferred to the memory.

When the received frame corresponds to the short frame (namely when octet number except for CRC is smaller than or equal to set value of SFBD), this short frame is not transferred to the memory, but is deleted (discarded) in the reception signal processing circuit.

When the received frame corresponds to the long frame (namely when octet number except for CRC is larger than or equal to the set value of LFBD), the data of 4 to 1 octet are transferred to the memory in combination with the completion condition. The data of 4 to 1 octet are such data immediately before the octet designated by the values (1 to 8191) of LFBD.

(5) Detection of Clock Interrupt on Reception Line

The reception signal processing circuit copies the content of CLCR (CR#0: D13) to CLSR (SR#0: D8) every time a reception channel is once processed. The CPU sets either "0" or "1" to CLCR, and checks whether or not the content of CLCR is reflected to CLSR after a time period of a transmission channel has passed. Then, when the content is not copied, the CPU judges that the clock interrupt occurs in the reception line.

In other words, when the clock on the reception line is interrupted, the content of CLCR is not copied to CLSR. The CPU utilizes this operation so as to detect the clock interrupt.

(6) Deletion of Same Reception Frame

When "1" is set to IFST value (Identical Frame Memory Transmit Stop; CR#0: D1), the reception signal processing circuit deletes (discards) a frame capable of satisfying all of the below-mentioned conditions:

(a) A frame size except for CRC is smaller than 5 octets (when HSSL frame is received, size thereof is smaller than 8 octets).

(b) A completion condition is brought into "normal end".

(c) A frame owns the same content as that of a first preceding frame, and also a second preceding frame.

While the frame capable of satisfying all of the above-described conditions is being received, when "1" is set to IFFL (Identical Frame Flash; CR#0: D7), the data for two frames are transferred to the memory. It should be understood that when an instruction of IFFL is accepted, since "1" is set to FLSR (SR#6: D6), IFFL is reset after this setting operation is confirmed.

(7) Statistical Function of Reception Frame

The common line signal apparatus owns a function capable of counting a total number of reception frames except for an abort frame while separating these reception frames into a normal reception frame and an abnormal reception frame. The counting operation may be applied to such a frame deleted in the reception signal processing circuit. A total number of the normal reception frame and a total number of the abnormal reception frame are stored (indicated) into RCFC (Received Correct Count; SR#3: D0–D17) and REFC (Received Error Frame Count; SR#1: D0–D15) (see FIG. 14 and FIG. 16).

It should also be noted that a frame whose completion condition is brought into "normal end" as defined in the above-described item "COMPLETION OF FRAME RECEPTION" is handled as "normal reception frame".

Furthermore, both such a frame capable of satisfying any one of the following 3 conditions, and clocks for 16 octets received in an octet number count mode (will be explained later) are handled as "abnormal reception frame":

(a) A CRC check result is not good.

(b) A bit number is not equal to integer multiplication by 8.

(c) A reception frame is a short frame.

Furthermore, the common line signal apparatus owns another function capable of counting the received FISU/LSSU number irrespective of the normal reception frame number.

(8) Processing Function for Octet Number Counting Mode

When either an abort-ended frame or a long frame is received under such a condition that "1" is set to OCME (CR#0: D6), "1" is set to OCMS (SR#0: D12) and the present operation mode (normal mode) is advanced to an octet counting mode (Octet Counting Mode).

In the octet counting mode, the reception clock is counted, and "1" is added to REFC (SR#3: DO0–D17)every time the clocks for 16 octets are counted (in this embodiment, clocks for 16 octets are handled as a "single abnormal reception frame").

It should be noted that the octet counting mode is transferred to the normal mode when the normal frame is received or "0" is set to OCME.

(9) Super Suppress Mode

When "1" is set to an SSPM (CR#4: D0), the present operation mode is transferred to the super suppress mode. The setting of "1" to SSPM can be performed only by the CPU (namely, reception signal processing circuit is not independently brought into super suppress mode).

In the super suppress mode, when either MSU frames or FISU frames are continuously received which can satisfy all of the below-mentioned conditions, the frames subsequent to the third frame thereof are erased within the reception signal processing circuit (since LSSU is employed as SIB signal, this SIB signal is processed in normal suppress mode):

(a) As to the values of BSN of the reception frame, the below-mentioned inequalities may be satisfied=IBSN (CR#5: D0–D11) BSN MBSN (CR#6: D0–D11)

(b) The value of BIB of the reception frame is identical to the value of BIB within the preceding frame.

(c) The value of FIB of the reception frame is identical to the value of FIB within the preceding frame.

(d) The value of FSN of the reception frame is identical to the value of FSN within the preceding frame.

It should be understood that both IBSN and MBSN are initialized by the CPU prior to the mode transfer to the super suppress mode (namely, "1" is set to SSPM) (see FIG. 8 and FIG. 9).

Concretely speaking, the CPU sets values used to define an upper limit value and a lower limit value of the range for values of BSNs which will be received in future. Thereafter, the CPU causes the operation mode of the reception signal processing circuit to transfer to the super suppress mode. It should be understood that this instruction is issued under such a normal condition that the abnormal condition of the received number or the like is released.

In the case that a frame is deleted in the super suppress mode, the reception signal processing circuit copies a BSN value of this frame to IBSN. That is to say, in this super suppress mode, such a frame having no meaning except for a confirmation response does not constitute a frame which should be directly processed by the CPU, but is discarded. Then, the BSN value within the discarded latest frame is stored into IBSN. As a result, data is stored into IBSN, by which the frame groups with the confirmation responses can be wholly recognized. In the super suppress mode, the CPU provided in this common line signal apparatus recognizes the transmission frame which has correctly reached on the side of frame reception by using this data.

It should also be understood that the reception signal processing circuit releases the super suppress mode and then transfers this suppress mode to the normal operation mode in such cases that "0" is set by the CPU to SSPM, any one of the above-defined conditions (a), (b), and (c) can be no longer satisfied when the MSU is received; and any one of the above-defined conditions (a), (b), (c), and (d) can be no longer satisfied when the FISU is received.

Now, the above-described operations of the common line signal apparatus according to this embodiment will now be described more in detail. As apparent from the above-explained operations, since the common line signal apparatus of this embodiment is featured by the reception operation, namely reception operation in the super suppress mode, the common line signal apparatus of the present invention will be described and the circuit arrangement and operation of the reception signal processing circuit will now be mainly explained.

Figure 17:
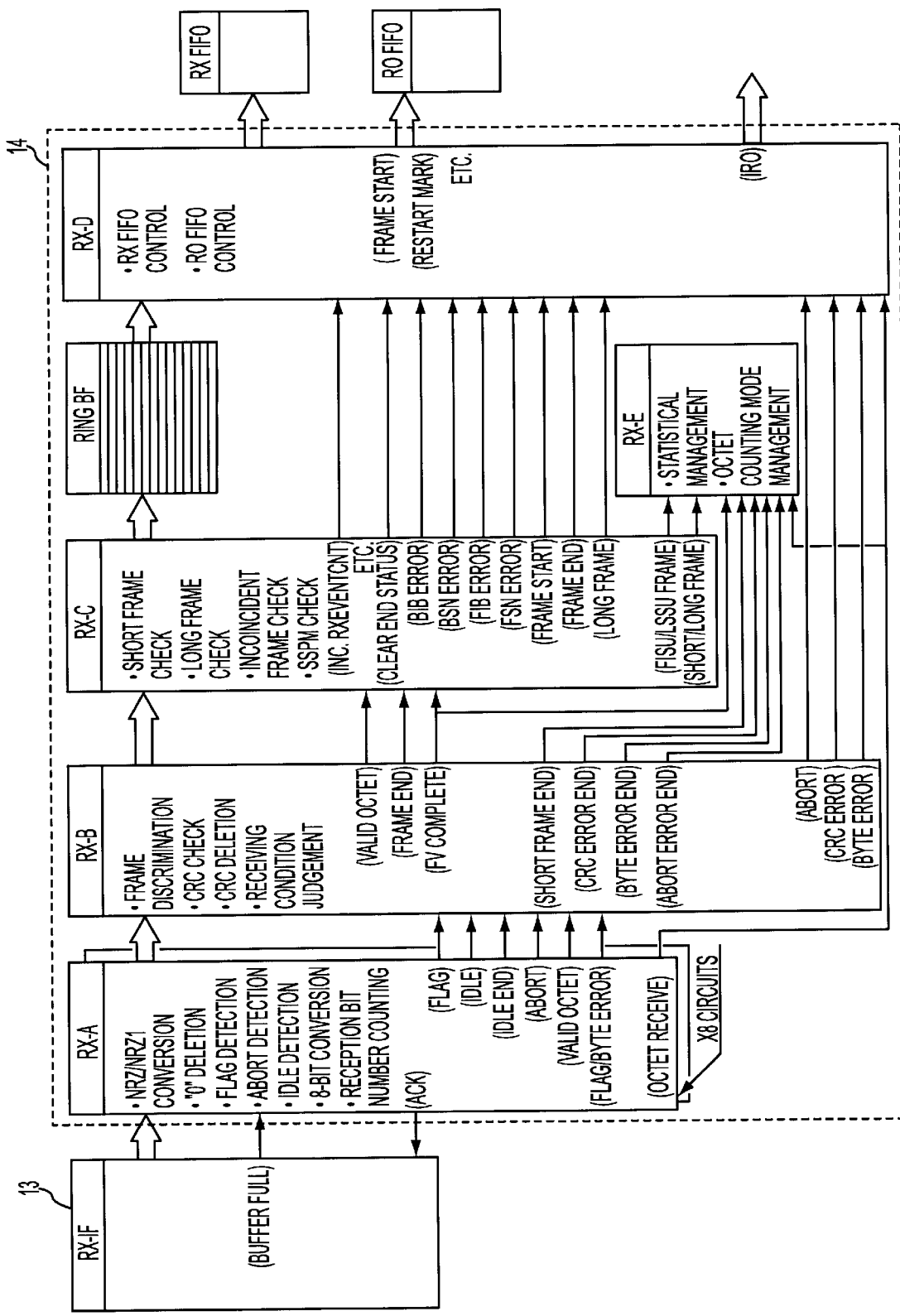
FIG. 17 is a functional block diagram of a reception signal processing circuit employed in the common line signal apparatus of the present embodiment.

FIG. 17 is a functional block diagram of the reception signal processing circuit. As previously explained, the reception signal processing circuit 14 is connected to various sorts of memories (registers) as shown in FIG. 1. However, in this drawing, these connecting relationships are omitted, and only the connecting relationship among the reception interface circuit 13, TX FIFO, and RX FIFO is shown.

As represented in FIG. 17, the reception signal processing circuit 14 is arranged by 8 sets of circuits named as "RX-A" and circuits named as "RX-B" to "RX-E", respectively, and also a ring buffer. When 1-byte data is prepared, the reception interface circuit 13 (will be referred to as an "RX-IF" hereinafter) outputs a signal "Buffer FULL" to the circuit RX-A. It should be noted that 8 sets of circuits RX-A are connected to the circuit RX-IF in such a manner that these circuits RX-A are capable of receiving a specific bit of 1-byte data prepared by the circuit RX-IF.

The circuit RX-A is operated as follows: The received bit number is counted; the received bit is NRZ/NRZI-converted; "0" is deleted from the bit sequence; the flag/abort/idle are detected; and the received bit is rearranged to produce 8 bits, etc. When the flag/abort/idle are detected and the 8-bit rearrangement is completed (namely, data for 8 bits can be acquired), this circuit RX-A notifies the circuit RX-B of this detection/completion ("Flag", "Abort", "Idle", "Valid OCTET". When 8 bits are received, the circuit RX-A notifies the RX-D and RX-E of this result, i.e., "OCTET RECEIVE".

The circuit RX-B executes the frame identification, the CRC check, the CRC deletion, and the judgment of the reception condition (frame ending condition). The circuit RX-B outputs a signal for indicating a frame end condition ("Frame END", "Short Frame END" etc.), and another signal ("Valid OCTET") for denoting that data of 1 octet are prepared to the circuits RX-C, RX-D, and RX-E.

Next, a description is made of a sequential operation of the circuit RX-C with reference to flow charts illustrated in FIG. 18 to FIG. 43 and this functional block diagram of FIG. 17. It should be noted that a symbol "(CR)" represents a bit within a control register, and a symbol "(SR)" denotes a bit within a state register in the respective flow charts explained in the below-mentioned description. Also, a symbol to which neither "(SR)", nor "(CR)" is added represents either a bit within a work register, or data transmitted/received in the respective circuit portions.

Figure 18:
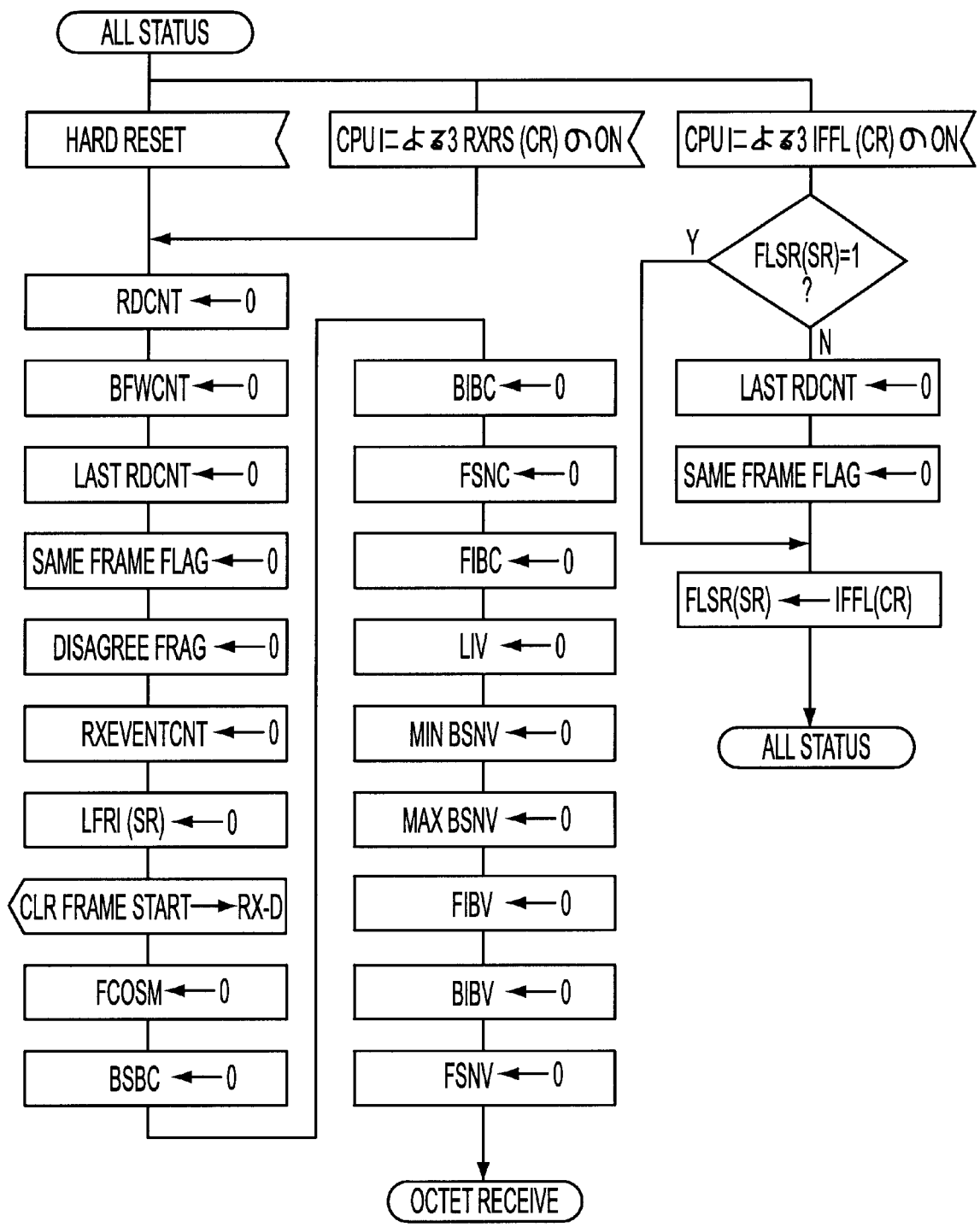
FIG. 18 is a flow chart for describing a sequential operation of an RX-C employed in the reception signal processing circuit shown in FIG. 17.

As illustrated in FIG. 18, even under any conditions, the circuit RX-C clears the various sorts of data (will be explained in detail) stored in the work register, and LFRI stored in the control register when a resetting operation is performed by the hardware or RXRS stored in the control register is turned ON (namely, "1" is set to this RXRS) by the CPU. Also, this circuit RX-C executes such a process operation that "CLR Frame Start" is outputted to the circuit RX-D so as to stop the operation of this circuit RX-D. Then, the circuit RX-C commences an "OCTET RECEIVE" process operation.

Also, when IFFL (Identical Frame Flash: see FIGS. 3A and 3B) of the control register is turned ON by the CPU, the circuit RX-C judges whether or not an FLSR (bit for indicating whether or not IFFL is received) within the state register is equal to "1". Then, in such a case that this FLSR is equal to "1", this circuit RX-C clears LAST RDCNT value and SAME FLAME FLAG value stored in the work register. Thereafter, the circuit RX-C copies the value of IFFL to FLSR (namely, reception of Identical Frame Flash instruction is displayed on FLSR), and then continues the process operations which have been carried out.

On the other hand, when the value of FLSR is not equal to "1", the circuit RX-C copies the value of IFFL to FLSR without clearing LAST RDCNT value and SAME FLAME FLAG value, and continues to execute the process operations which have been carried out. In this case, the value of FLSR is not changed by this copying operation. It should be understood that the functions (usage) of LAST RDCNT value and SAME FLAME FLAG value, and the influences given to the operation of the RX-C by 0-clear operation will be explained later.

Next, operation of the circuit RX-C when "OCTET RECEIVE" is processed will now be described.

Figure 19:
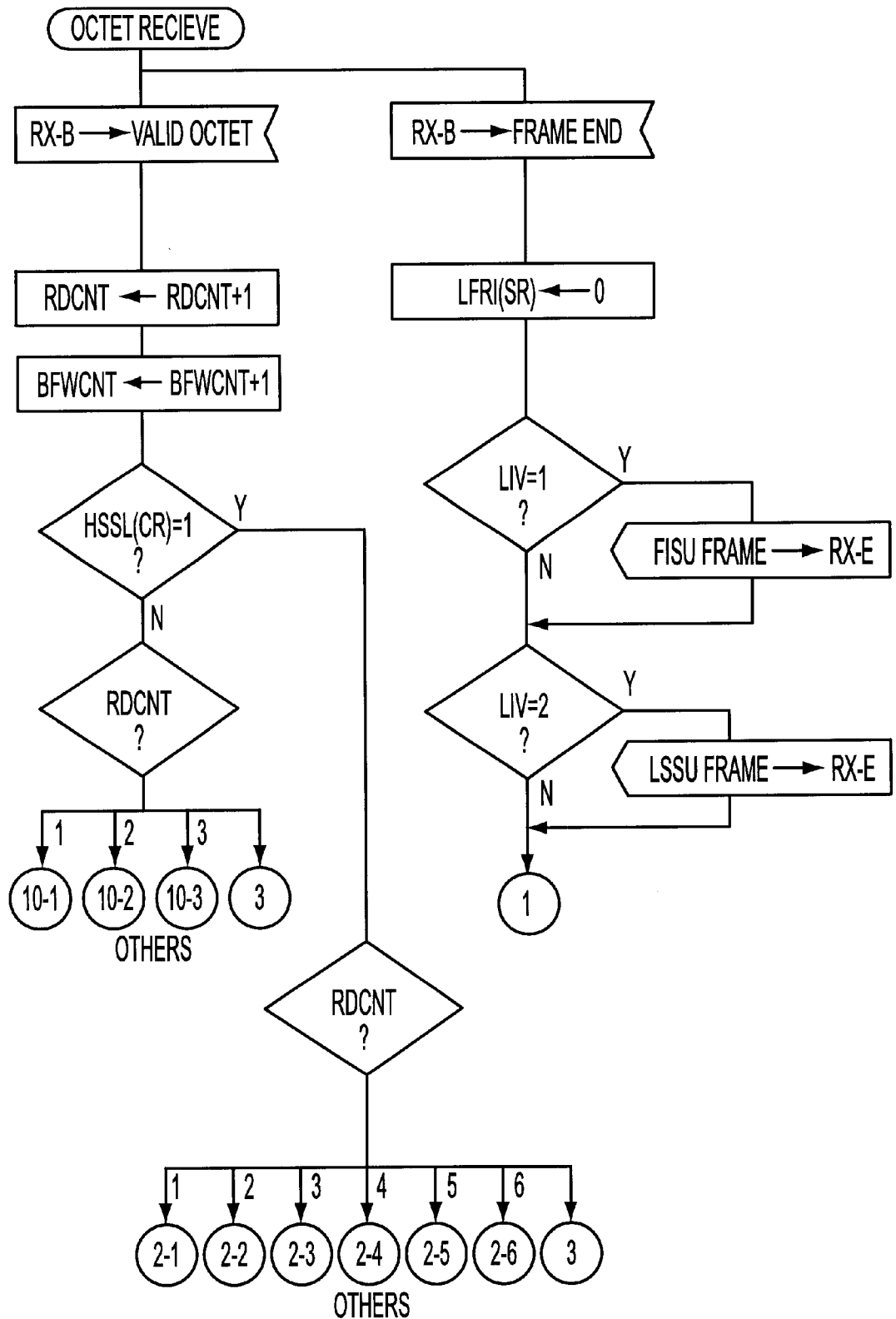
FIG. 19 is a flow chart for further describing a sequential operation of an RX-C employed in the reception signal processing circuit shown in FIG. 17.

As illustrated in FIG. 19, when the process operation of "OCTET RECEIVE" is commenced, the circuit RX-C waits for an input of "Valid OCTET" or "Frame End" from the circuit RX-B.

Figure 20:
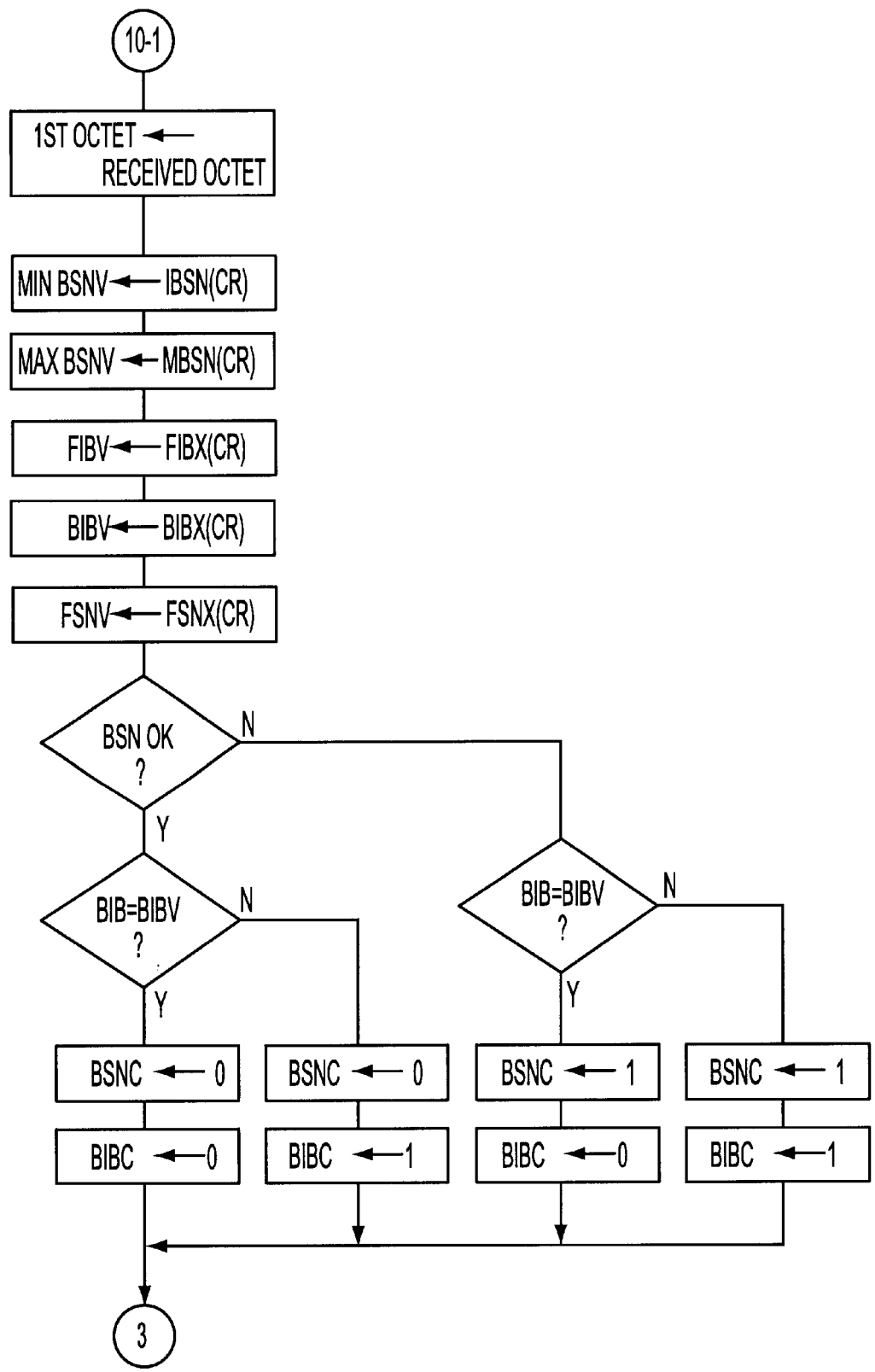
FIG. 20 is a flow chart for further describing a sequential operation of an RX-C employed in the reception signal processing circuit shown in FIG. 17.

In the case that "Valid OCTET" is inputted, the circuit RX-C increments the value of RDCNT corresponding to the counter for the inputted "Valid OCTET" number, and the value of BFWCNT corresponding to the counter for controlling the ring buffer by "1", respectively. Thereafter, the circuit RX-C commences the process operations corresponding to the value of HSSL within the control register and the value of RDCNT within the work register. For instance, in such a case that the value of HSSL is "0" and the value of RDCNT is "1" ("Valid OCTET" related to HSSL corresponding frame is entered under such a condition that the value of RDCNT is "0"), the circuit RX-C receives 1-octet data from the circuit RX-B, as illustrated in FIG. 20. Then, this circuit RX-C stores the received data (Received OCTET) as "1ST OCTET" into the work register. Subsequently, the circuit RX-C stores the values of IBSN, MBSN, FIBX, BIBX and FSNX (see FIG. 8 to FIG. 11) saved within the control register as MIN BSNV, MAX BSNV, FIBV, BIBV and FSNV, respectively, into the work register.

Thereafter, the circuit RX-C checks the value of BSN in 1ST OCTET (Received OCTET). Concretely speaking, the circuit RX-C checks whether or not an inequality defined by MIN BSNV BSN MAX BSNV can be satisfied. When this inequality can be satisfied, the circuit RX-C judges that the value of BSN is OK. Furthermore, the circuit RX-C judges whether or not the value of BIB saved in 1ST OCTET is made coincident with the value of BIBV. Then, the circuit RX-C stores the check result of the BSN value and the check result of BIB value (OK 0, NG 1) into BSNC and BIBC, respectively.

Figure 21:
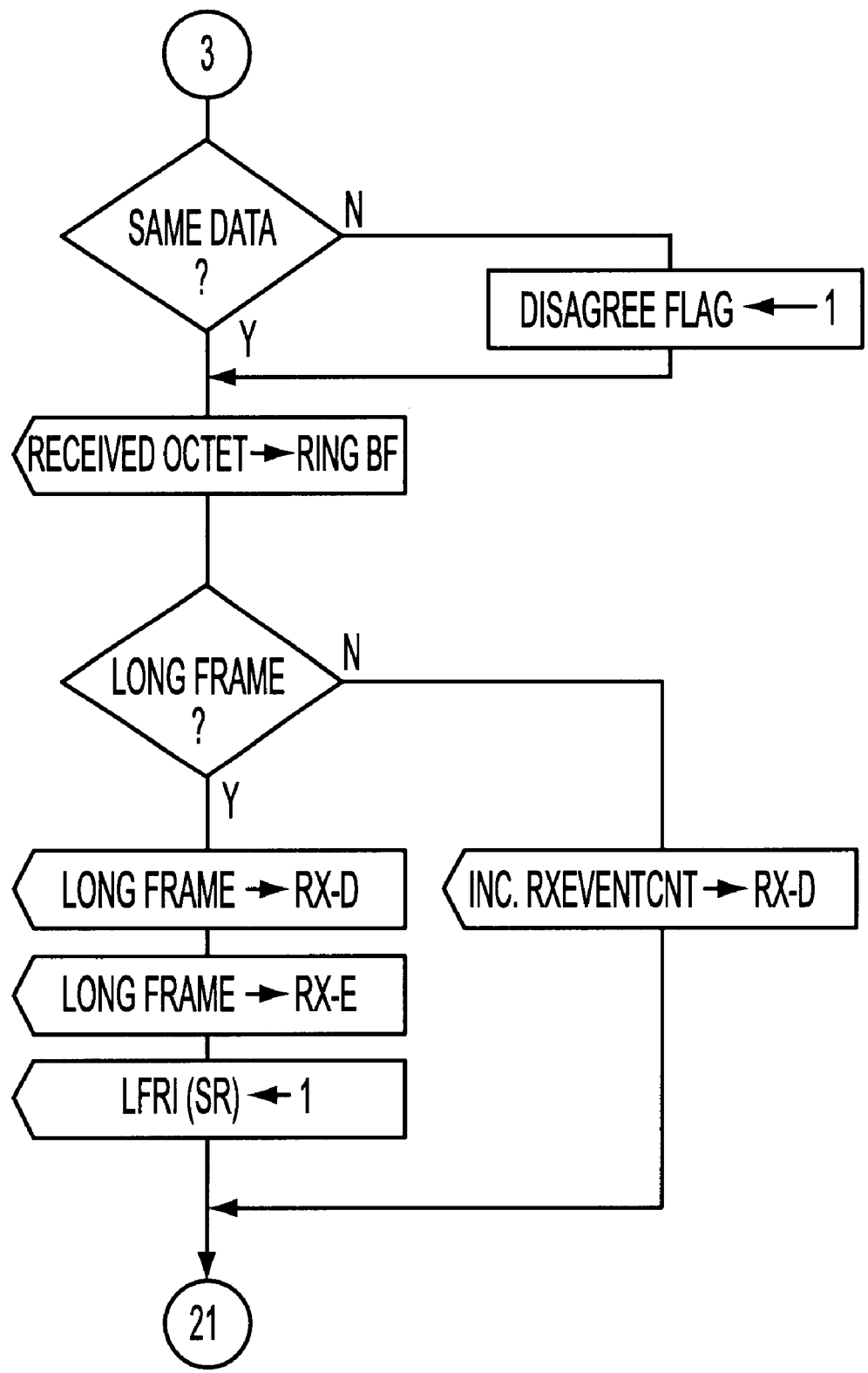
FIG. 21 is a flow chart for further describing a sequential operation of an RX-C employed in the reception signal processing circuit shown in FIG. 17.

Next, as illustrated in FIG. 21, the circuit RX-C judges whether or not the present "Received OCTET" is made coincident with the octet data related to the previous frame. When the present "Received OCTET" is not made coincident with the corresponding OCTET data, "1" is set to DISAGREE FLAG value. Then, while the circuit RX-C uses the value of BFWCNT as an address, the Received OCTET is stored into the ring buffer (Ring BF).

Next, in such a case that a subject frame (namely, frame under reception) is a long frame, the circuit RX-C outputs a signal "Long Frame" to the circuit RX-D and the circuit RX-E, and also sets "1" to LFRI. On the other hand, in such a case that this frame is not equal to such a long frame, the circuit RX-C outputs a signal "INC. RXEVENTCNT" to the circuit RX-D. This signal instructs that RXEVENTCNT is incremented by 1 (this implies that data is additionally stored in ring buffer). It should also be noted that although not shown in this drawing, the above-described judgement about the long frame is executed by comparing the value of RDCNT with the value of LFBD (CR#2: D0–D12; see FIG. 5) only when "1" is set to LFCE (CR#0: D2; see FIGS. 3A and 3B). Then, when "1" is not set to LFCE, the circuit RX-C continuously outputs the signal "INC.RX-EVENTCNT".

Figure 22:
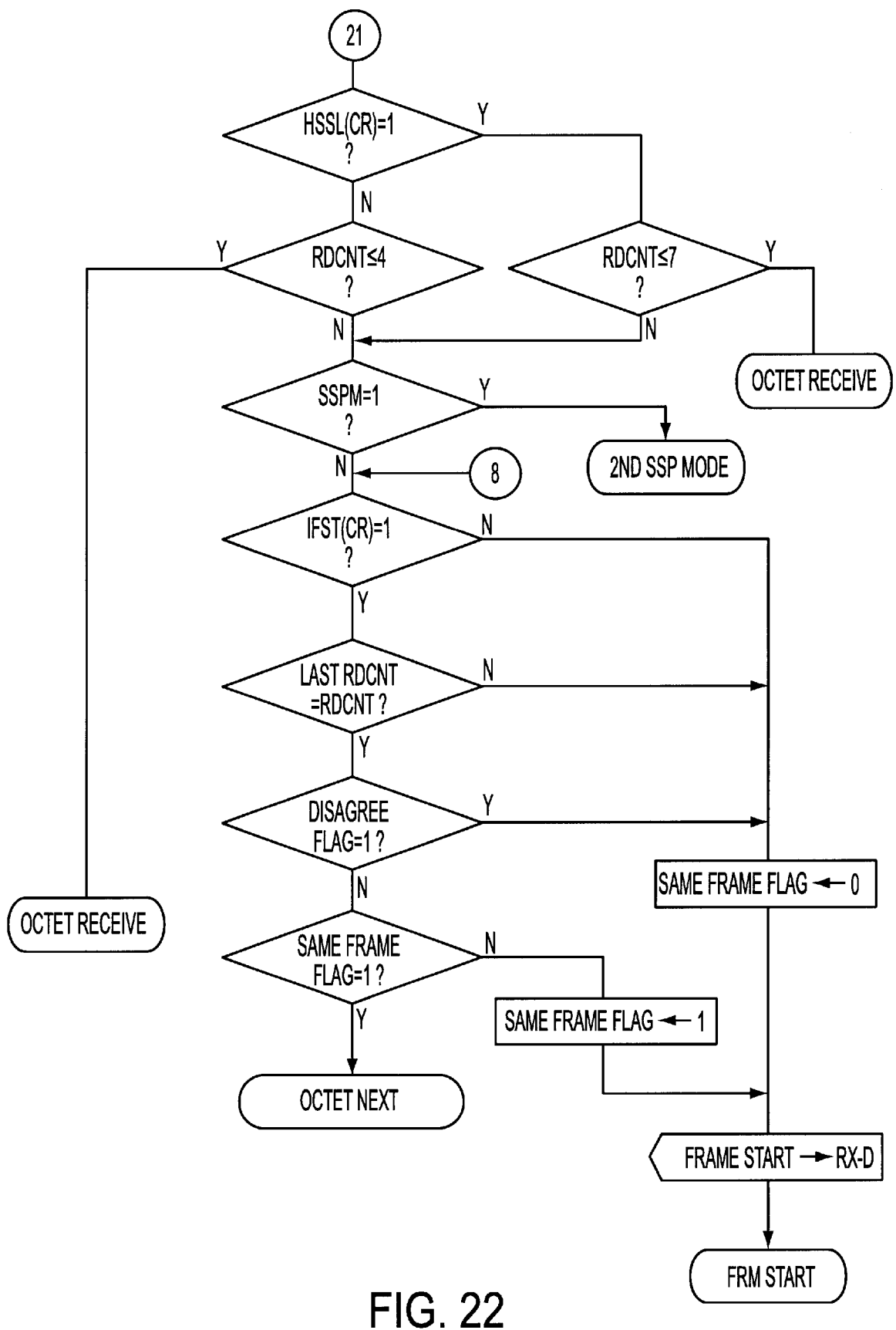
FIG. 22 is a flow chart for further describing a sequential operation of an RX-C employed in the reception signal processing circuit shown in FIG. 17.
Figure 23:
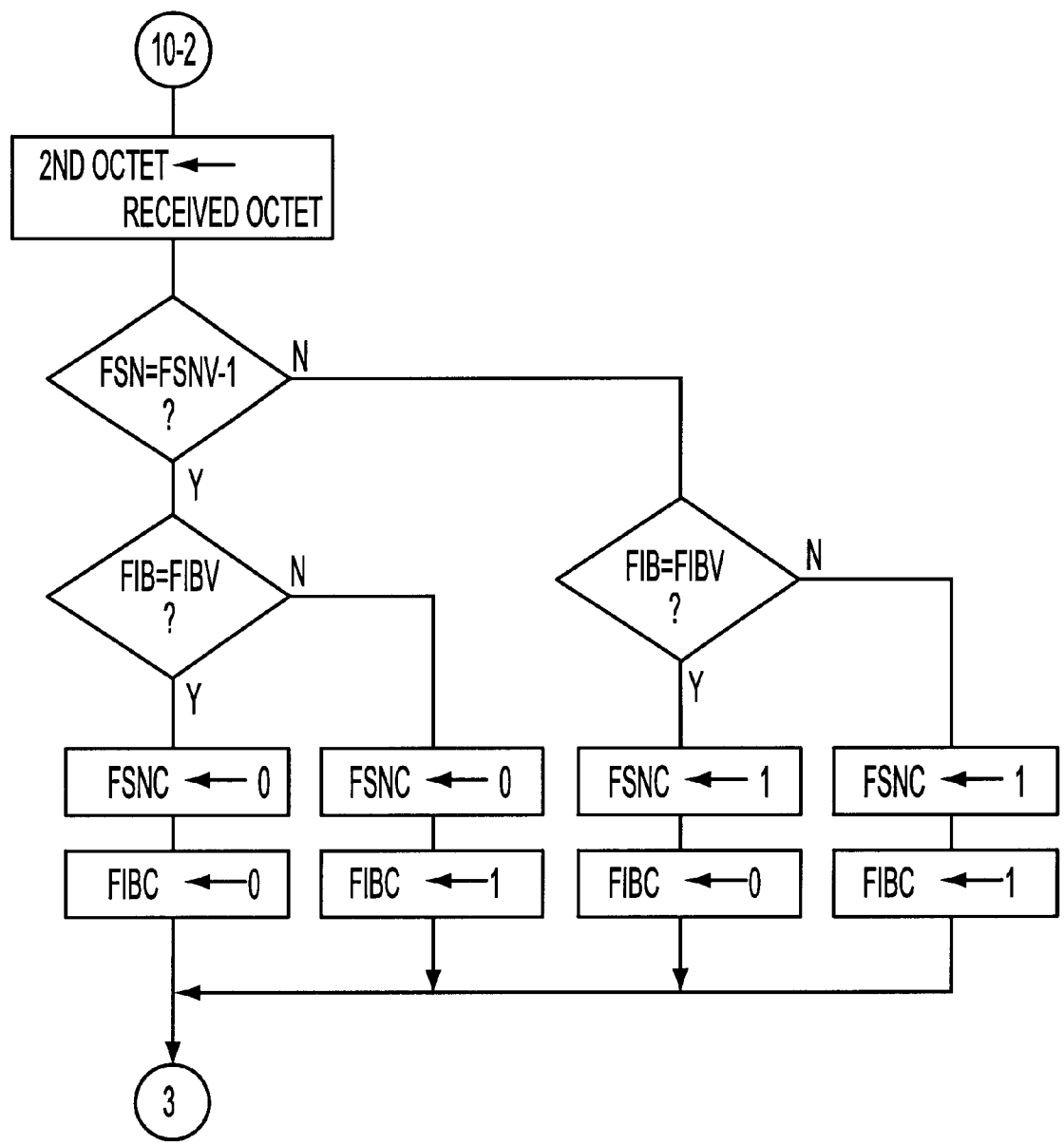
FIG. 23 is a flow chart for further describing a sequential operation of an RX-C employed in the reception signal processing circuit shown in FIG. 17.

Thereafter, as shown in FIG. 22, the circuit RX-C judges whether or not the HSSL value is equal to "1". Then, if this HSSL value is equal to "1", then the circuit RX-C judges whether or not the RDCNT value is smaller than or equal to "4". When the HSSL value is equal to "0", the circuit RX-C checks whether or not the RDCNT value is smaller than or equal to "7". Subsequently, the circuit RX-C again commences the "OCTET RECEIVE" process in the case that the HSSL value is equal to "0" and also the RDCNT value is smaller than or equal to "4", and further in such a case that the HSSL value is equal to "1" and the RDCNT value is smaller than or equal to In other words, in the case that the process operation shown in the flow chart of FIG. 20 is executed, since the HSSL value is equal to "0" and the RDCNT value is equal to "1", the "OCTET RECEIVE" process is again commenced. Thereafter, normally, since "Valid OCTET" is entered from the circuit RX-B, the condition such that the HSSL value is equal to "0" and the RDCNT value is equal to "2" is achieved (see FIG. 19). As a result, a process operation defined in a flow chart of FIG. 23 is commenced.

That is, when the second "Valid OCTET" related to the HSSL-not-corresponding-frame is received, the circuit RX-C stores the octet (namely, Received OCTET) received from the circuit RX-B as a second OCTET. Then, the circuit RX-C checks whether or not the FIB value within 2ND OCTET (Received OCTET) is made coincident with such a value (FSNV–1) obtained by subtracting 1 from the FSNV value, and checks as whether or not the FSN value within 2ND OCTET is made coincident with the FIBV value. Then, the circuit RX-C stores the check result of the FSN value and the check result of the FIB value (OK is 0, NG is 1) into FSNC and FIBC, respectively. As previously explained with reference to FIG. 21 and FIG. 22, the circuit RX-C stores Received OCTET into the ring buffer (BFWCNT value is incremented when "Valid OCTET" is inputted) and also outputs "INC.RXEVENTCNT" to the circuit RX-D. Then, returning back to the process operation shown in FIG. 19, the circuit RX-C waits for the next "Valid OCTET".

Figure 24:
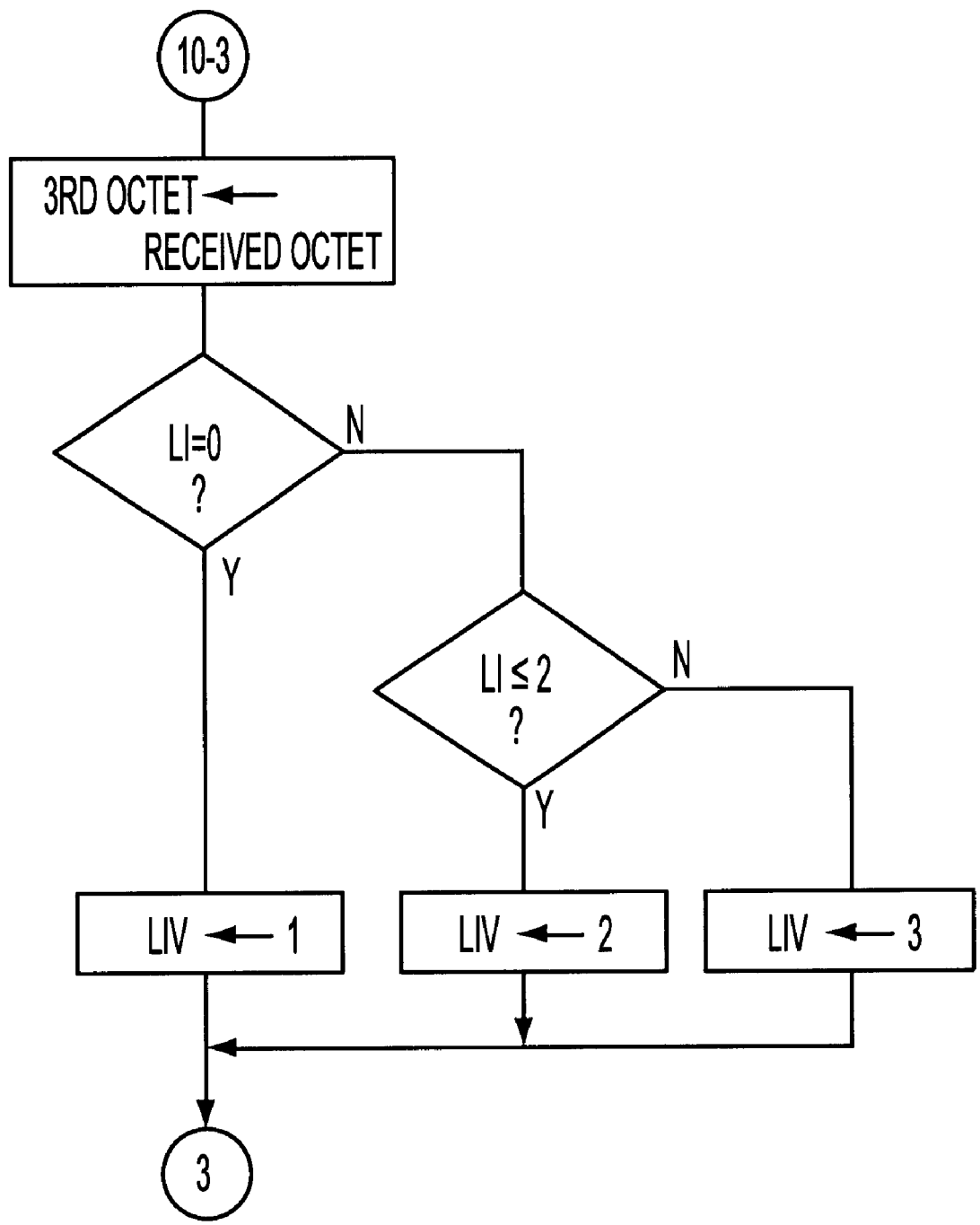
FIG. 24 is a flow chart for further describing a sequential operation of an RX-C employed in the reception signal processing circuit shown in FIG. 17.

When "Valid OCTET" (FSSL=10) related to the HSSL-not-corresponding-frame is received under such a condition that the RDCNT value is equal to "2", as illustrated in FIG. 24, the circuit RX-C stores the octet (Received OCTET) sent from the circuit RX-B as a 3RD OCTET. Next, the circuit RX-C stores a value corresponding to an LI (Length Indicator) value within 3RD OCTET into LIV. Concretely speaking, when the LI value is equal to "0", namely when the frame under reception is equal to FISU (Fill In Signal Unit), "1" is stored into LIV. When the LI value is equal to either "1" or "2", namely when the frame under reception is equal to LSSU (Link Status Signal Unit), "2" is stored into LIV. Then, when the LI value is larger than or equal 3, namely when the frame under reception is equal to MSU (Message Signal Unit), "3" is stored into LIV. Thereafter, the circuit RX-C stores Received OCTET into the ring buffer in accordance with the previously explained sequential operation, and outputs "INC.RXEVENTCNT" to the circuit RX-D. Then, this circuit RX-C waits for an input of a next "Valid OCTET" or a next "Frame End" (namely, "OCTET RECEIVE" process is again commenced).

When "Valid OCTET" (HSSL=0) related to the HSSL-not-corresponding-frame is received under such a condition that the RDCNT value is larger than or equal to "3", the circuit RX-C immediately commences a process operation shown in FIG. 21. Only when the RDCNT value is smaller than or equal to "4" in case of "HSSL=0", the "OCTET RECEIVE" process operation is again commenced without clearing the RDCNT value after the process operation shown in FIG. 21 has been accomplished. In other words, in case of HSSL=0, only the fourth "Valid OCTET" and the fifth "Valid OCTET" are processed in accordance with this process sequence.

Similarly, operations of the circuit RX-C when "Valid OCTET" related to the HSSL-not-corresponding-frame is entered are the same as those when "Valid OCTET" related to the HSSL-not-corresponding-frame is inputted except that the respective checking operations are carried out every 2 octets.

Figure 25A:
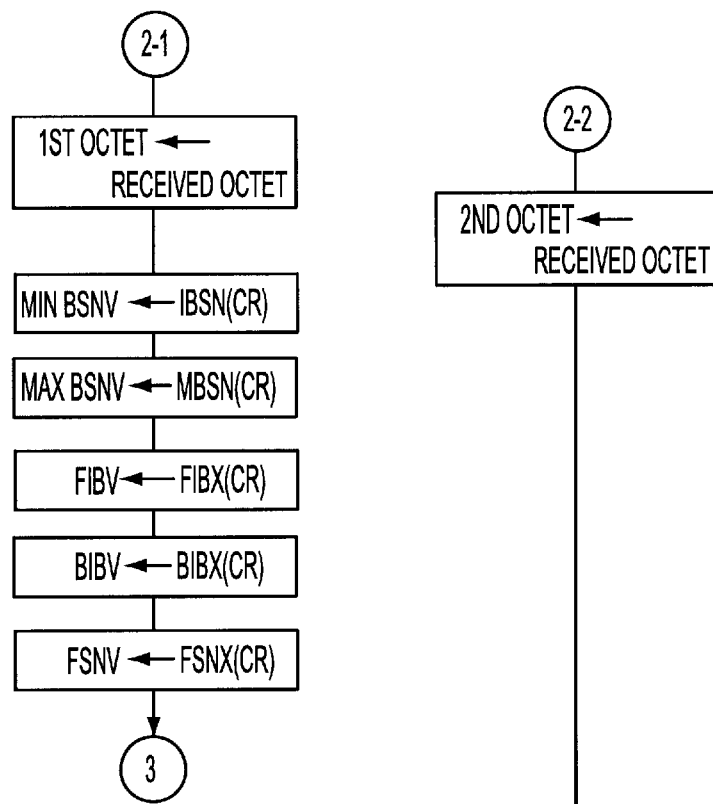
FIG. 25 is a flow chart for further describing a sequential operation of an RX-C employed in the reception signal processing circuit shown in FIG. 17.

For example, in such a case that the HSSL value is equal to "1" and the incremented RDCNT value is equal to "1", namely "Valid OCTET" related to the HSSL-corresponding-frame is entered under such a condition that the RDCNT value is equal to "0" (see FIG. 19), as illustrated in FIG. 25A, the circuit RX-C stores the octet (Received OCTET) supplied from the circuit RX-B as a 1ST OCTET. Next, values of IBSN, MBSN, FIBX, BIBX, and FSNX saved within the control register are stored as MIN BSNV, MAX BSNV, FIBV, BIBV, and FSNV, respectively, into the work register. Then, the circuit RX-C stores Received OCTET into the ring buffer, outputs "INC.RXEVENTCNT" to the circuit RX-D (FIG. 21), and then waits for a next "Valid OCTET", returning back to the flow chart of FIG. 19.

Figure 25B:
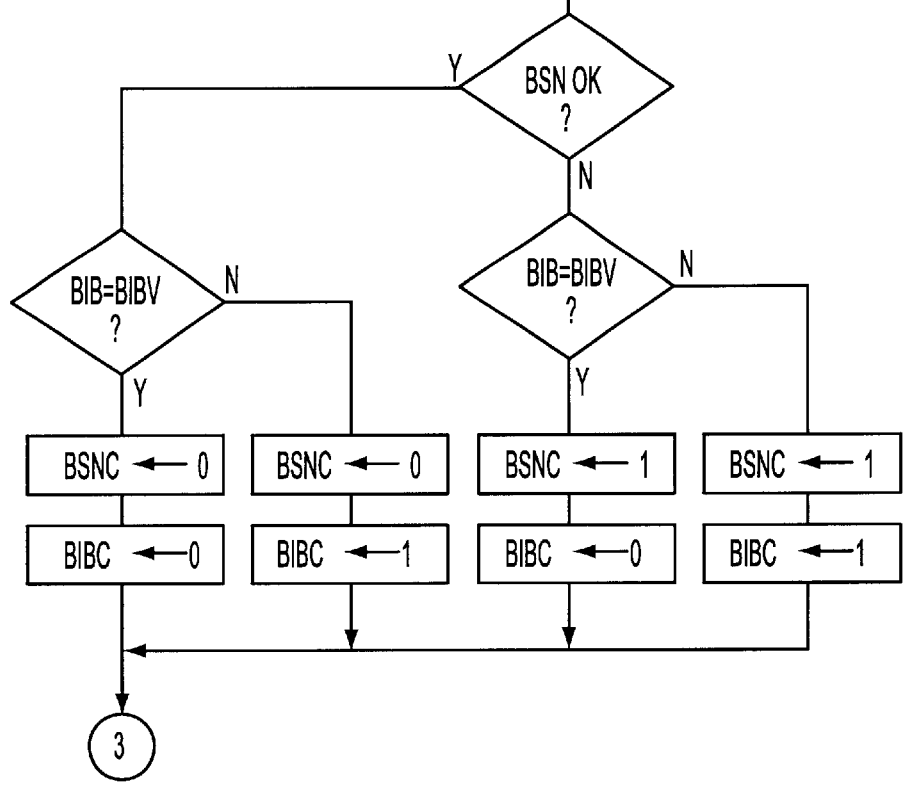

When the HSSL value is equal to "1" and the incremented RDCNT value is equal to "2", the circuit RX-C stores an octet (Received OCTET) supplied from the circuit RX-B as a 2ND OCTET, as illustrated in FIG. 25B. Next, the circuit RX-C checks whether or not the BSN values contained in 1ST OCTET and 2ND OCTET can satisfy the inequality of MIN BSNV BSN MAX BSNV. When, the BSN values can satisfy this inequality, the circuit RX-C judges that the BSN values are OK. Furthermore, the circuit RX-C judges whether or not the BIB value contained in 2ND OCTET is made coincident with the BIBV value, and then stores the check result of the BSN value and the check result of the BIB value (OK is 0, NG is 1) into BSNC and BIBC, respectively. Then, the process operation defined in FIG. 21 is commenced.

When the HSSL value is equal to "1" and the incremented RDCNT value is equal to "3", the circuit RX-C stores an Octet (Received OCTET) supplied from the circuit RX-B as a 3RD OCTET, as illustrated in FIG. 26A. Next, the circuit RX-C stores Received OCTET into the ring buffer, outputs "INC.RXEVENTCNT" to the circuit RX-D, and then waits for an input of a next "Valid OCTET".

When the HSSL value is equal to "1" and the incremented RDCNT value is equal to "4", the circuit RX-C stores an Octet (Received OCTET) supplied from the circuit RX-B as a 4TH OCTET, as illustrated in FIG. 26B. Next, the circuit RX-C checks whether or not the FSN values contained in the 3RD OCTET and 4TH OCTET are made coincident with such a value (FSNV−1) obtained by subtracting "1" from the FSNV value, and also checks whether or not the FIB value contained in the 4TH OCTET is made coincident with the FIBV value. Then, the circuit RX-C stores the check result of the FSN value and the check result of the FIB value (OK is 0, and NG is 1) into FSNC and FIBC, respectively. Then, the circuit RX-C stores Received OCTET into the ring buffer, outputs "INC.RXEVENTCNT" to the circuit RX-D, and also waits for an input of a next "Valid OCTET".

Figure 27A:
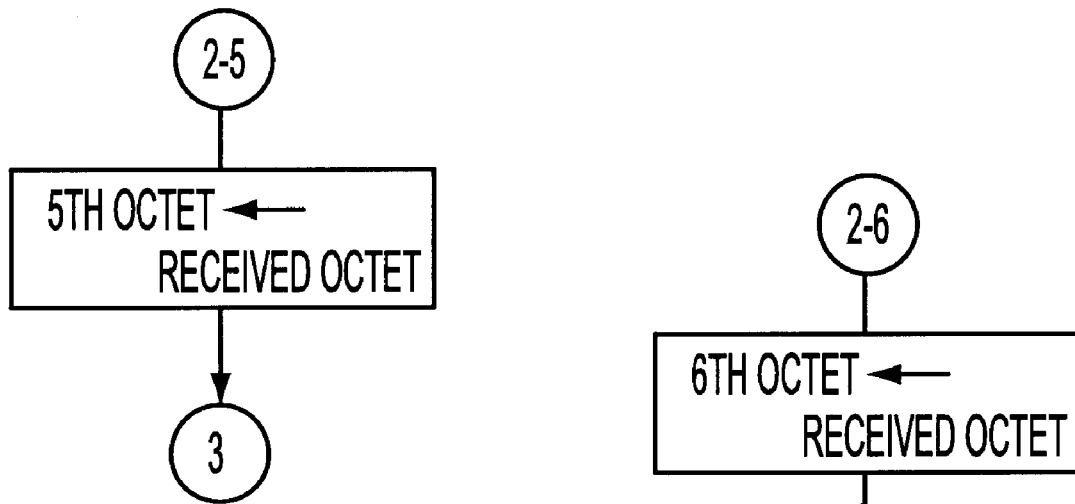
FIG. 27 is a flow chart for further describing a sequential operation of an RX-C employed in the reception signal processing circuit shown in FIG. 17.

When the HSSL value is equal to "1" and the incremented RDCNT value is equal to "5", the circuit RX-C stores an Octet (Received OCTET) supplied from the circuit RX-B as a 5TH OCTET, as illustrated in FIG. 27A.

Figure 27B:
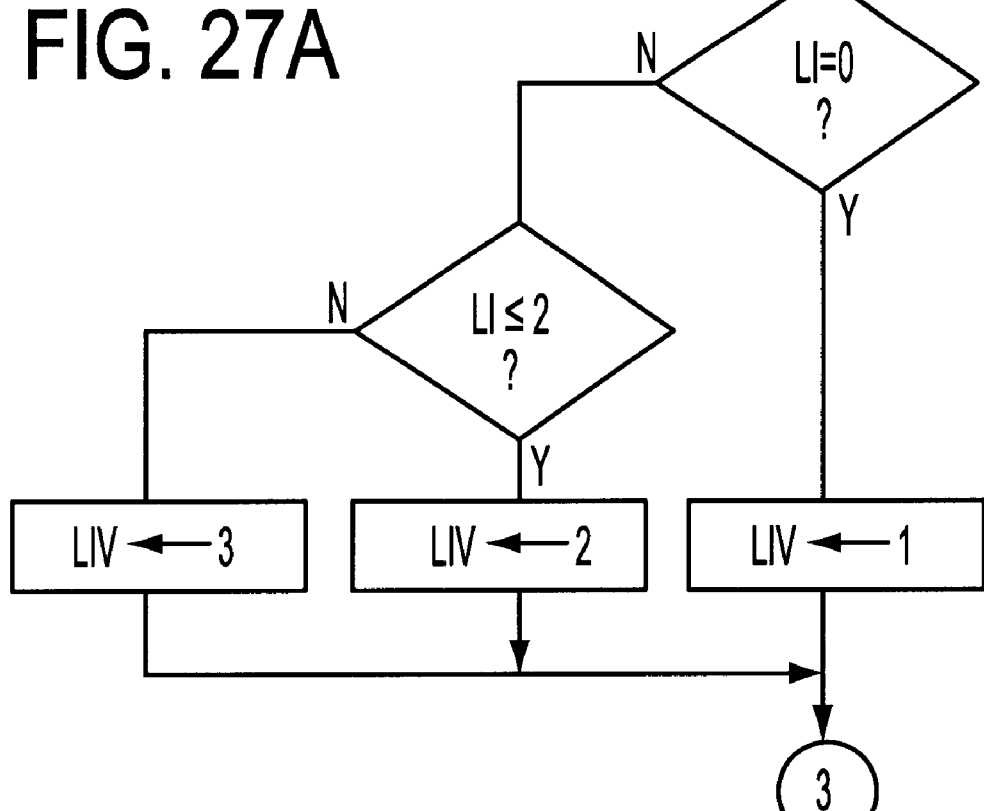

When the HSSL value is equal to "1" and the incremented RDCNT value is equal to "6", the circuit RX-C stores an Octet (Received OCTET) supplied from the circuit RX-B as a 6TH OCTET, as illustrated in FIG. 27B, stores values corresponding to LI values contained in the 5TH OCTET and 6TH OCTET into LIV.

When "Valid OCTET" (FSSL=0) related to the HSSL-corresponding-frame is received under such a condition that the RDCNT value is larger than or equal to "6", the circuit RX-C immediately commences a process operation shown in FIG. 21, since the incremented RDCNT value becomes larger than or equal to "7", as illustrated in FIG. 19. Only when the RDCNT value is smaller than or equal to "7" in case of "HSSL=1", the "OCTET RECEIVE" process operation is again commenced without clearing the RDCNT value after the process operation shown in FIG. 21 has been accomplished. As a result, in case of HSSL=1, only the seventh "Valid OCTET" and the eighth "Valid OCTET" are processed in accordance with this process sequence.

Also, in such a case that "Frame End" is entered after the "OCTET RECEIVE" process operation is commenced, as illustrated in a right side portion of the flow chart shown in FIG. 19, the circuit RX-C sets "0" to LFRI, and outputs "FISU Frame" to the circuit RX-E when the LIV value is equal to "1", and also outputs "LSSU Frame" to the circuit RX-E when the LIV value is equal to "2".

Figure 28:
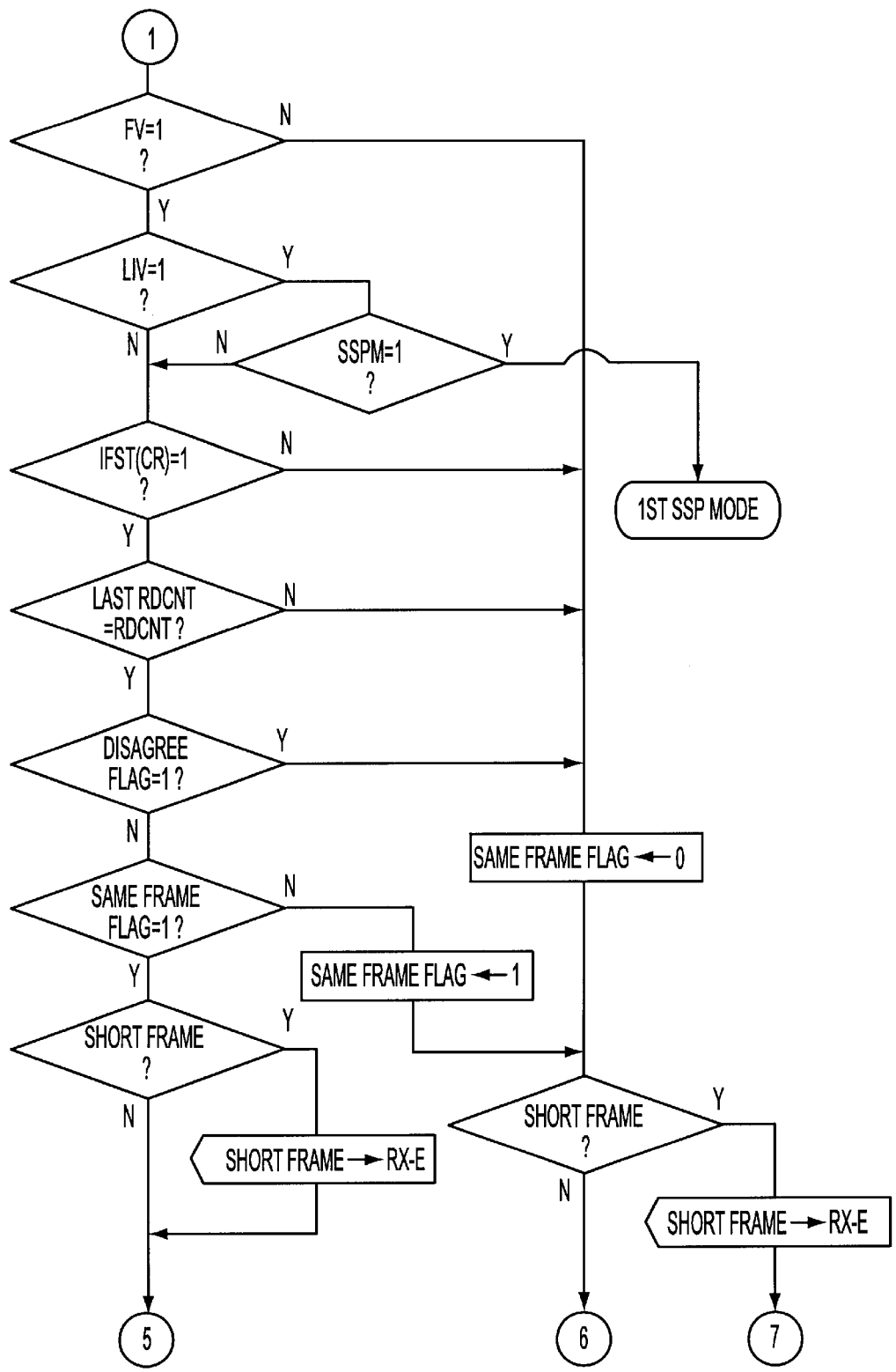
FIG. 28 is a flow chart for further describing a sequential operation of an RX-C employed in the reception signal processing circuit shown in FIG. 17.

Thereafter, the circuit RX-C executes process operations illustrated in FIG. 28 and FIG. 29 (will be referred to as a "first same frame discarding process operation" hereinafter, for the sake of simple explanation). As illustrated in FIG. 28, when the first same frame discarding process operation is carried out, the circuit RX-C firstly checks whether or not "FV Complete" is entered from the circuit RX-B (expressed as "FV=1?" in FIG. 28). The circuit RX-B is arranged in such a manner that both "Frame End" and "FV Complete" are outputted to the circuit RX-C in such a case that the received frame corresponds to the normal frame. On the other hand, when the received frame corresponds to the abnormal frame, this circuit RX-C outputs "Frame End", but does not output "FV Complete". As a consequence, the circuit RX-C can judge whether or not the subject frame corresponds to the normal frame by confirming whether or not the signal "FV Complete" is entered.

In the case that the subject frame is not the normal frame (will be indicated as "in the case that it is not equal to FV=1" hereinafter), the circuit RX-C sets "0" to SAME FLAME FLAG value. Then, when the subject frame is a short frame (in the case that the RDCNT value is smaller than or equal to the SFBD value saved in the control register), the circuit RX-C outputs "Short Frame" to the circuit RX-E. Subsequently, as illustrated in FIG. 28, the circuit RX-C outputs "CLR RXEVENTCNT" and "CLR END STATUS" to the circuit RX-D. It should be understood that the circuit RX-D which has received "CLR RXEVENTCNT" clears the RXEVENTCNT value. Also, the circuit RX-D which has received "CLR END STATUS" assumes that no signal is inputted in such a case that any one of signals indicative of the end condition has been entered. In other words, the circuit RX-D which has received these end condition signals is operated, assuming now that data to be derived is not present in the ring buffer. As a result, the received frame is discarded within the reception signal processing circuit.

Figure 29:
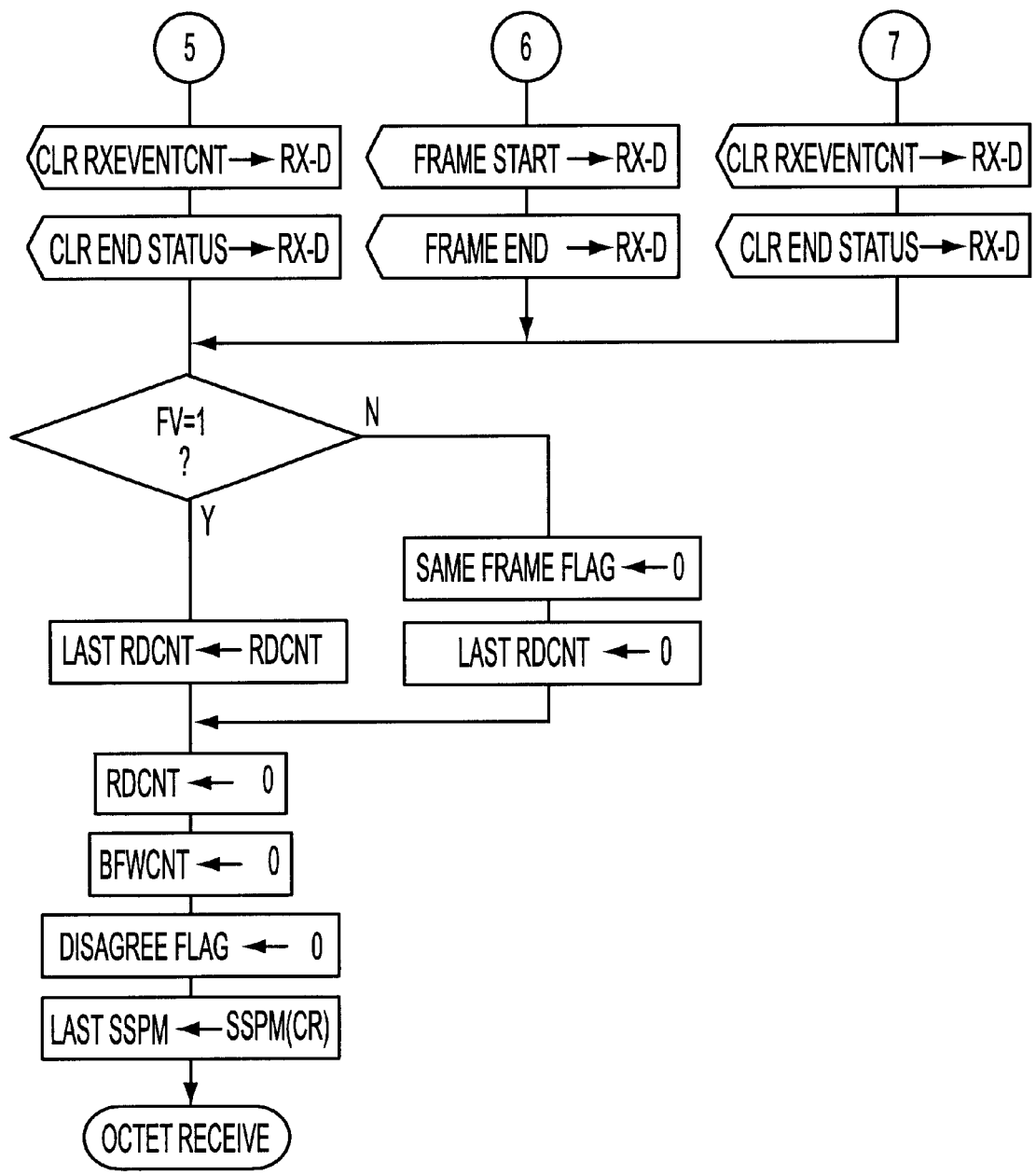
FIG. 29 is a flow chart for further describing a sequential operation of an RX-C employed in the reception signal processing circuit shown in FIG. 17.

On the other hand, in such a case that the subject frame is not equal to the normal frame, but also not equal to the short frame (FIG. 28), the circuit RX-C outputs both "Frame Start" and "Frame End" to the circuit RX-D (FIG. 29). It should also be noted that "Frame Start" corresponds to such a signal for indicating an instruction to derive the data saved in the ring buffer, whereas "Frame End" corresponds to such a signal used to notify to the circuit RX-D, such a fact that the supply of the 1-frame data to the ring buffer is accomplished. In other words, the circuit RX-D which has received these signals derives the data, from the ring buffer to FIFO, and a total number of these data corresponds to the count value of the counter RXEVENTCNT incremented every time "INC.RXEVENTCNT" is entered and supplies the data to FIFO.

In such a case that the subject frame is the normal frame (when it is equal to FV=1), the circuit RX-C checks whether or not the LIV value is equal to 1. When the LIV value is equal to "1", the circuit RX-C judges whether or not the SSPM value is equal to "1". When the LIV value is not equal to "1", and when the LIV value is equal to "1" and further the SSPM value is not equal to "1" (namely, in the case that the subject frame is equal to the frame other than FISU, or both the subject frame is equal to FISU and the operation mode is not equal to the super suppress mode), the circuit RX-C sequentially performs the following judgments. That is, the circuit RX-C checks whether or not "1" is set to IFST value (namely, whether or not it is specified that the same data transfer operation to the memory is suppressed). Also, the circuit RX-C checks whether or not the value of LAST RDCNT value is made coincident with the value of RDCNT. Further, the circuit RX-C judges whether or not DISAGREE FLAG value is equal to "1". The circuit RX-C executes the process operation identical the process operation when the subject frame is not equal to FV=1 when "1" is not set to IFST value, when the value of LAST RDCNT value is not made coincident with the value of RDCNT, and when DISAGREE FLAG value is equal to When "1" is set to IFST value, when the value of LAST RDCNT is made coincident with the value of RDCNT, and when DISAGREE FLAG value is equal to "1", then the circuit RX-C judges whether or not SAME FLAME FLAG value is equal to "1". Then, in such a case that SAME FLAME FLAG value is not equal to 1, the circuit RX-C sets "1" to SAME FLAME FLAG value, and thereafter executes the same process operation as that performed after SAME FLAME FLAG value is cleared when the subject frame is not equal to FV=1. In other words, the circuit RX-C instructs the circuit RX-D to transfer the date in the ring buffer. On the other hand, in such a case that SAME FLAME FLAG value is equal to "1", the circuit RX-C outputs "Short Frame" to the circuit RX-E when the subject frame is equal to the short frame. Next, the circuit RX-C outputs "CLR RXEVENTCNT" to the circuit RX-D. Thereafter, as shown in FIG. 29, the circuit RX-C outputs "CLR END STATUS" to the circuit RX-D. That is, the circuit RX-C instructs the circuit RX-D such that the data saved in the ring buffer is discarded without being transferred.

As previously described, after the circuit RX-C has outputted a certain sort of signal to the circuit RX-D and the circuit RX-E, depending upon the condition, this circuit RX-C again checks whether or not the subject frame is equal to FV=1. If the subject frame is equal to FV=1, then the circuit RX-C rewrites the value of LAST RDCNT by the value of RDCNT at this stage. On the other hand, when the subject frame is not equal to FV=1, this circuit RX-C clears the SAME FLAME FLAG value and the LAST RDCNT value, and then clears the RDCNT value, the BFWCNT value, and DISCHARGE FLAG. Then, the circuit RX-C copies the SSPM value to LAST SSPM, and starts the "OCTET RECEIVE" process operation in order to accept a next frame.

A more concrete description will now be made of such a fact that this first same frame discarding process operation corresponds to the following process operation. That is, while the frame size except for the CRC portion is smaller than 5 octets (smaller than 8 octets when HSSL frame is present), the transfer operation of such a frame having the same content as that of the first preceding frame and also of the second preceding frame to the memory can be suppressed.

Now, the following one concrete example will be considered. Under such a condition that "0" is set to SSPM value while "1" is set to IFST value, the HSSL-not-corresponding-frames having the same contents are continuously received, and the octet numbers thereof except for CRC are smaller than or equal to "4". It should be understood that the reason why the octet number of the frame smaller than or equal to "4" is assumed is given as follows: A frame whose octet number except for CRC is equal to "5" is not processed by this first same frame discarding process operation, but is processed in a second same frame discarding process operation.

In the case that the above-described frames are continuously received, when a first frame is received, since LAST RDCNT value is not equal to RDCNT value or DISAGREE FLAG value =1, "0" is set to SAME FLAME FLAG value (FIG. 28). Also, since both "FRM START" and "Frame End" are outputted to the circuit RX-D, the data stored in the ring buffer is transferred by the circuit RX-D to RX FIFO. Then, after the octet number of the subject frame except for CRC is set to LAST RDCNT value, a process operation for a next frame is commenced (FIG. 29).

When, a second frame is received, since LAST RDCNT value=RDCNT value and further DISAGREE FLAG value= 0, a judgement is made as to whether or not the value of SAME FLAME FLAG value is equal to "1" (FIG. 28). Then, since the value of SAME FLAME FLAG value is equal to "0", after "1" has been set to SAME FLAME FLAG value, both "FRM START" and "Frame End" are outputted. That is, the second frame is also transferred to RX FIFO without being discarded.

When, a third frame is received, since LAST RDCNT value=RDCNT value and further DISAGREE FLAG value= 0, a judgement is made as to whether or not the SAME FLAME FLAG value is equal to "1". In this case, since the SAME FLAME FLAG value is equal to "1", both "CLR RXEVENTCNT" and "CLR END STATUS" are outputted to the circuit RX-D. In other words, the data of the third frame is discarded without being transferred to RX FIFO. Also, since the process operation for the third frame is completed under such a condition that SAME FLAME FLAG value=1, when a frame having the same content is thereafter received, the last-mentioned frame is discarded in the reception signal processing circuit in a similar manner for the third frame. Then, when a frame having a different content is received, since either LAST RDCNT value is not equal to RDCNT or DISAGREE FLAG value is equal to 1, the value of SAME FLAME FLAG value which is equal to "1" is rewritten by "0". As a result, the condition of the circuit RX-C is returned to such a condition that even when such a frame having the same content as that of this frame is subsequently received, the frames up to the second frame are not discarded. As previously explained with reference to FIG. 34, when the FLSR value is equal to "0", if "1" is set to IFFL, then the circuit RX-C sets "0" to both LAST RDCNT value and SAME FLAME FLAG value. While the frames having the same contents are continuously discarded, when this 0-setting operation is carried out, as apparent from the above explanation, a frame which is received after this setting operation has performed may be handled as a first frame. As a consequence, two frames are transferred to RX FIFO without being discarded.

Next, a description will now be made of operations of the circuit RX-C when the process operations defined in the flow chart shown in FIG. 21 are carried out with respect to a fifth "Valid OCTET" related to the HSSL-not-corresponding-frame, or an eighth "Valid OCTET" related to the HSSL-corresponding-frame. In other words, the following description is made of such operations of the circuit RX-C in such a case that the process operations described in the flow chart of FIG. 22 are commenced under conditions of HSSL=0 and RDCNT=5, or HSSL=1 and RDCNT=8.

In this case, the circuit RX-C judges whether or not the SSPM value is equal to "1" without returning to the "OCTET RECEIVE" process operation.

When the SSPM value is equal to "0" (namely, the operation mode is not the super suppress mode), the circuit RX-C commences the second same frame discarding process operation. It should be understood that such a process operation involving an "OCTET NEXT" process operation, and an "FRM START" process operation, which is defined after the branch process by the IFST value in the flow chart of FIG. 22, will be referred to as this second same frame discarding process operation.

Similar to the above-described process operations when the first same frame discarding process operation is carried out, while the second same frame discarding process operation is performed, the circuit RX-C sequentially executes the following judgments. That is, a check is made as to whether or not the LAST RDCNT value saved in the work register is made coincident with the RDCNT value. Another check is done as to whether or not DISAGREE FLAG value is equal to "1". Then, the circuit RX-C sets "0" to the SAME FRAME FLAG value in the following cases. That is, "1" is not set to IFST value; the LAST RDCNT value is not made coincident with the RDCNT value; and DISAGREE FLAG value is equal to "1". Next, the circuit RX-C outputs "Frame Start" to the circuit RX-D so as to start an "FRM START" process operation. Even when any one of the above-described 3 conditions cannot be satisfied, if SAME FRAME FLAG value is not equal to "1", the circuit RX-C sets "1" to SAME FRAME FLAG value, and also outputs "Frame Start" to the circuit RX-D. Thereafter, the process operation is advanced to the "FRM START" process operation.

On the other hand, in such a case that any one of the above-described 3 conditions cannot be satisfied, and SAME FRAME FLAG value is equal to "1", the circuit RX-C commences a "OCTET NEXT" process operation.

Figure 30:
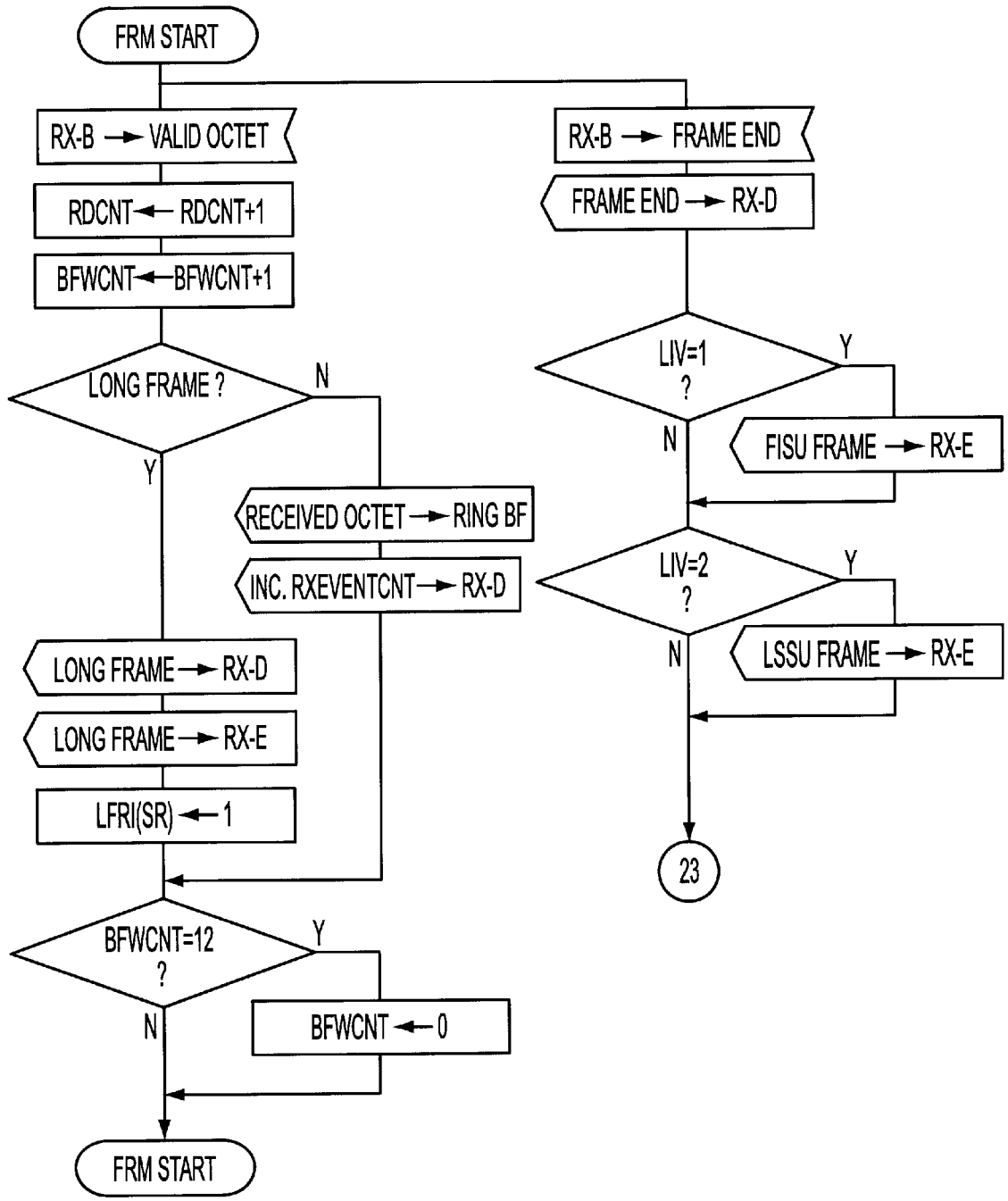
FIG. 30 is a flow chart for further describing a sequential operation of an RX-C employed in the reception signal processing circuit shown in FIG. 17.
Figure 31:
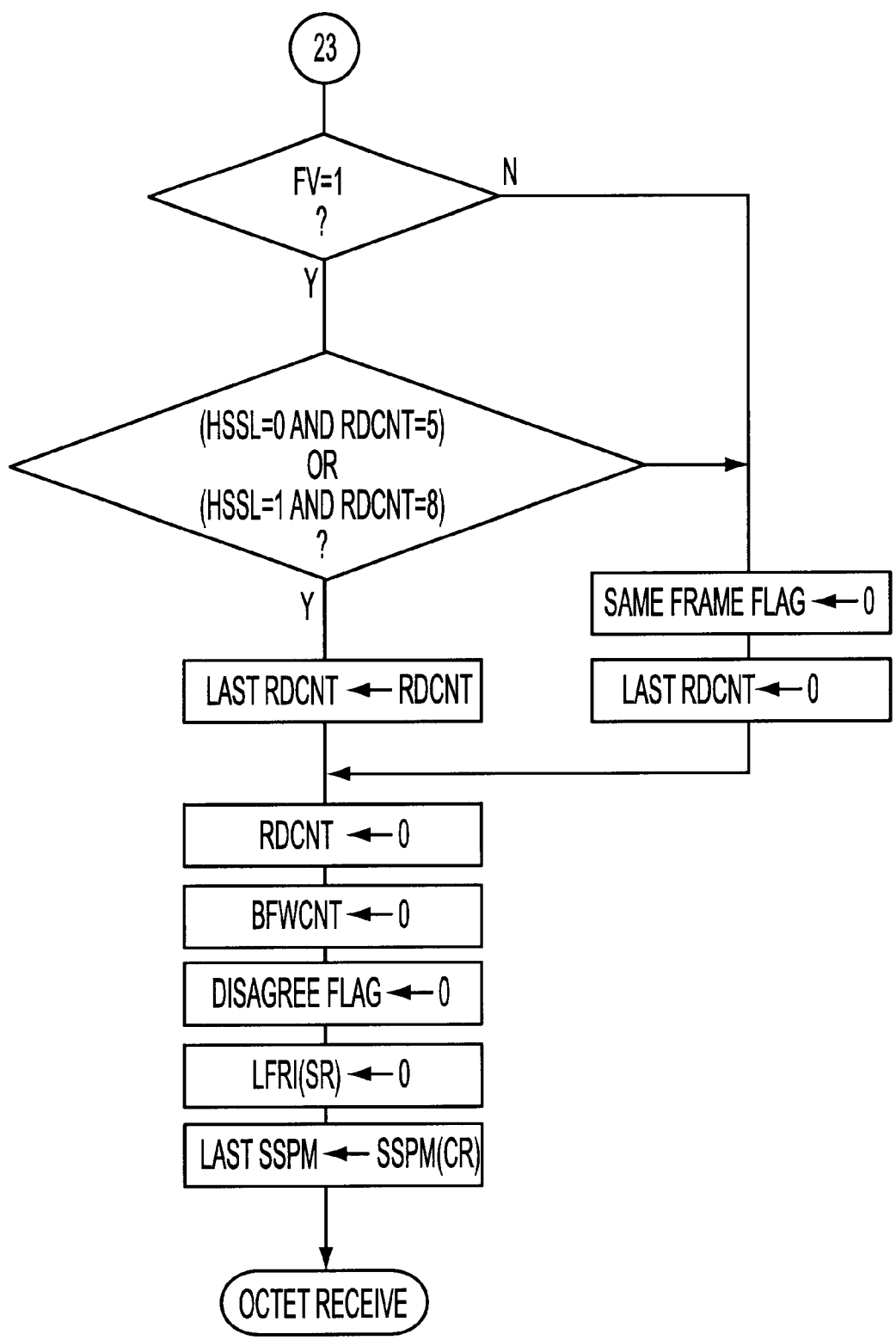
FIG. 31 is a flow chart for further describing a sequential operation of an RX-C employed in the reception signal processing circuit shown in FIG. 17.

Subsequently, both the "FRM START" process operation and "OCTET NEXT" process operation will now be explained. Referring first to FIG. 30 and FIG. 31, sequential operations of the circuit RX-C when the "FRM START" process operation is carried out will now be described.

As illustrated in FIG. 30, when the "FRM START" process operation is commenced, the circuit RX-C is brought into such a waiting condition that "Valid OCTET" and "Frame End" are entered thereinto from the circuit RX-B.

When "Valid OCTET" is inputted from the circuit RX-B, the circuit RX-C increments the RDCNT value and the BFWCNT value by "1", respectively. Then, in the case that the subject frame is a long frame, the circuit RX-C outputs "Long Frame" to the circuits RX-D and RX-E, and sets "1" to LFRI value. To the contrary, when the subject frame is not such a long frame, the circuit RX-C stores Received OCTET into the ring buffer, and also outputs "INC.RXEVENTCNT" to the circuit RX-D. It should be noted that the judgement as to whether or not the subject frame is equal to the long frame in this "FRM START" process operation is similarly carried out only when the LFCF value is equal to "1". Thereafter, the circuit RX-C rewrites the BFWCNT value by "0" when the BFWCNT value becomes "12" (namely, maximum address value of the ring buffer), and thereafter again commences the "FRM START" process operation.

On the other hand, when "Frame End" is entered into the circuit RX-C, this circuit RX-C first outputs "Frame End" to the circuit RX-D. Subsequently, the circuit RX-C outputs a signal corresponding to the LIV value to the circuit RX-E. In other words, when the LIV value is equal to "1", the circuit RX-C outputs this signal to "FISU Frame", whereas when LIV value is equal to "2", the circuit RX-C outputs this signal to "LSSU Frame".

Next, as illustrated in FIG. 31, the circuit RX-C judges whether or not FV=1. If FV=1, then the circuit RX-C judges whether or not HSSL=0 and further RDCNT=5, or otherwise HSSL=1 and further RDCNT=8.

Both in such a case that FV is not equal to 1, and in such a case that neither HSSL=0 and also RDCNT=5, nor HSSL=1 and also RDCNT=8, the circuit RX-C sets "0" to SAME FRAME FLAG value and LAST RDCNT value. Furthermore, in the case that HSSL=0 and also RDCNT=5, or HSSL=1 and RDCNT=8 (namely, when subject frame is equal to LSSU), the circuit RX-C copies RDCNT value to LAST RDCNT value.

After either "0" or RDCNT value has been set to LAST RDCNT value, the circuit RX-C clears RDCNT value, BFWCNT value, DISAGREE FLAG value, and LFRI value saved in the control register. Then, the circuit RX-C copies the SSPM value saved in the control register to LAST SSPM. Then, the circuit RX-C commences the "OCTET RECEIVE" process operation used to process the next frame. It should be understood that since a series of process operations where RDCNT value is cleared at the starting step correspond to the process operation which is always carried out when the process operation for other frame is commenced, this series of process operations will be referred to as a "post process operation" in the following description.

Referring now to flow charts shown in FIG. 32 and FIG. 33, a description will be made of operations of the circuit RX-C when the "OCTET NEXT" process operation is carried out.

Figure 32:
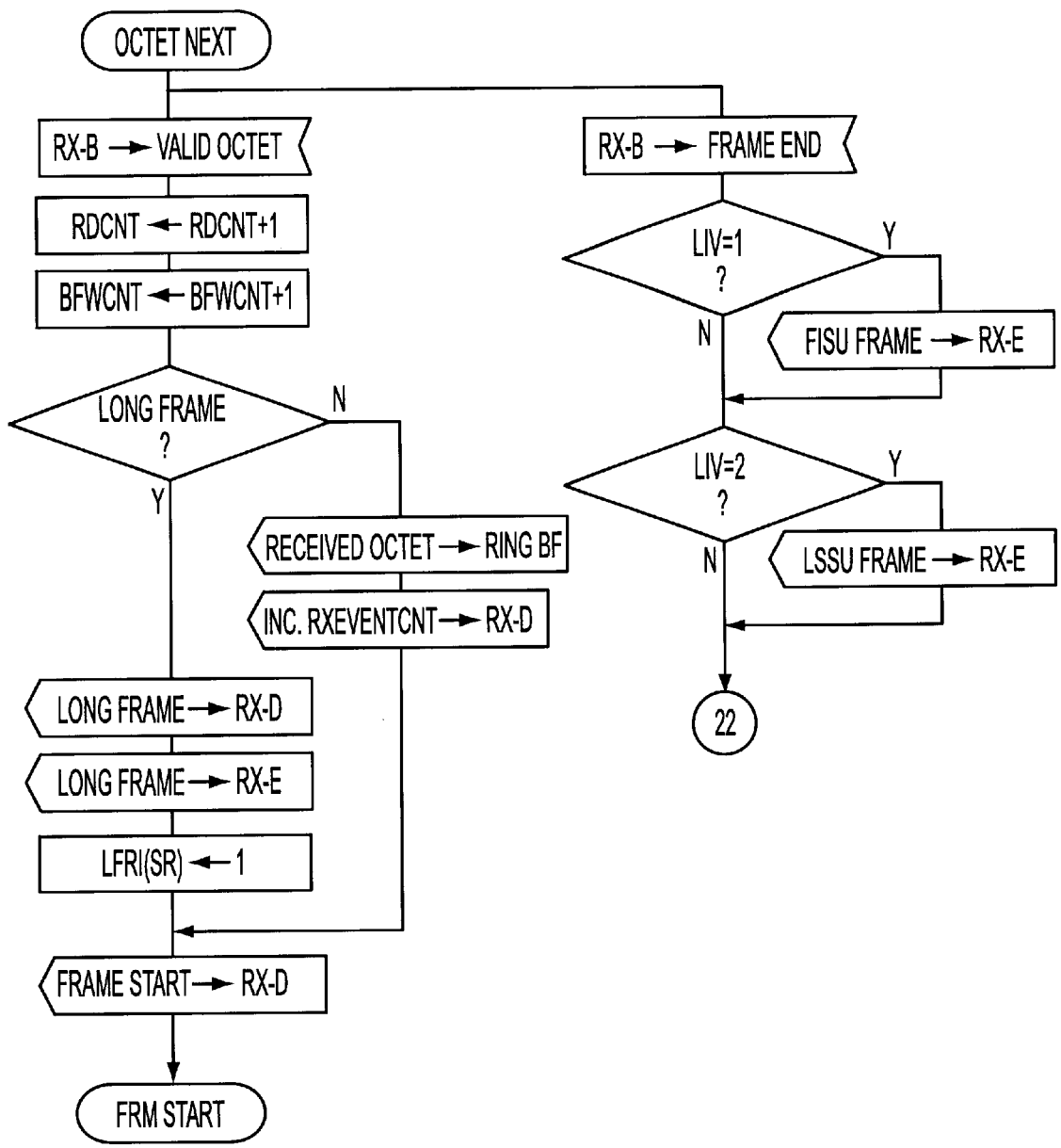
FIG. 32 is a flow chart for further describing a sequential operation of an RX-C employed in the reception signal processing circuit shown in FIG. 17.
Figure 33:
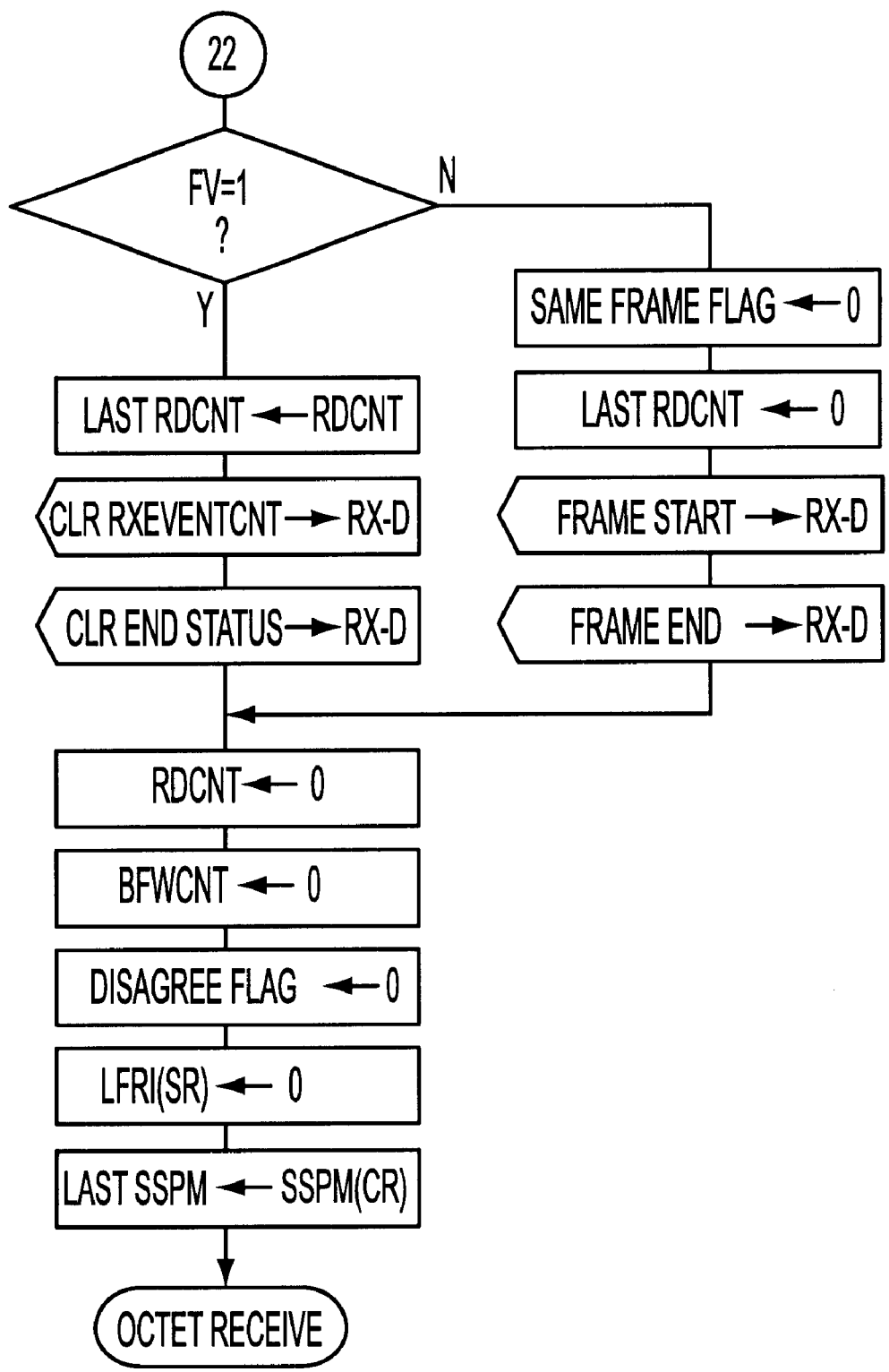
FIG. 33 is a flow chart for further describing a sequential operation of an RX-C employed in the reception signal processing circuit shown in FIG. 17.

As illustrated in FIG. 32, when the "OCTET NEXT" process operation is commenced, the circuit RX-C waits for the inputs of "Valid OCTET" and "Frame End" from the circuit RX-B.

When "Valid OCTET" is entered from the circuit RX-B, the circuit RX-C is operated in a manner substantially equal to that in the case that "Valid OCTET" is inputted when "FRM START" process operation is carried out. That is to say, when the input of "Valid OCTET" is detected, the circuit RX-C increments the RDCNT value and the BFWCNT value by "1", respectively. Then, in the case that the subject frame is a long frame, the circuit RX-C outputs "Long Frame" to the circuits RX-D and RX-E, and sets "1" to LFRI (SR#0: D15) value. To the contrary, when the subject frame is not such a long frame, the circuit RX-C stores Received OCTET into the ring buffer, and also outputs "INC.RXEVENTCNT" to the circuit RX-D. Thereafter, the circuit RX-C outputs "FRM START" to the circuit RX-D, and then the process operation is advanced to an "FRM START" process operation.

As previously described, in the case that "Valid OCTET" is inputted when the "OCTET NEXT" process operation is commenced, the circuit RX-C is operated in the completely same manner to that of such a case that "Valid OCTET" is inputted when the "FRM START" process operation is commenced except that the circuit RX-C does not check the BFWCNT value and outputs "Frame Start". The reason why the BFWCNT value is not checked is given as follows. While the "OCTET NEX" process operation is carried out, there is no case that the BFWCNT value does not become 12.

On the other hand, in the case that "Frame End" is inputted when the "OCTET NEXT" process operation is carried out, the circuit RX-C outputs a signal corresponding to the LIV value to the circuit RX-E without outputting "Frame End" to the circuit RX-D. Subsequently, as shown in FIG. 33, the circuit RX-C judges whether or not FV=1 (namely, whether or not subject frame is the normal frame).

In the case of FV=1, the circuit RX-C copies the RDCNT value to LAST RDCNT value. Then, the circuit RX-C outputs both "CLR RXEVENTCNT" and "CLR END STATUS" to the circuit RX-D. To the contrary, in the case that FV is not equal to 1, the circuit RX-C clears SAME FRAME FLAG value and LAST RDCNT value, and outputs both "Frame Start" and "Frame End" to the circuit RX-D.

Thereafter, the circuit RX-C executes the post process operation to commence the "OCTET RECEIVE" process operation.

In this case, the reason why the above-described second same frame discarding process operation corresponds to the below-mentioned process operation will now be explained with reference to a concrete example. That is, in this process operation, the frame whose size (except for CRC) is smaller than or equal to 5 octets (smaller than or equal to 8 octets when HSSL frame is used) is used, the transfer operation of the frames having the same contents as those of the first preceding frame and the second preceding frame into the memory can be suppressed.

As apparent from the above-explained operations, in such a case that either the "FRM START" process operation or the "OCTET NEXT" process operation is once started, the "OCTET RECEIVE" process operation is not restarted without clearing the RDCNT value. In other words, the process operation shown in FIG. 22, which constitutes the second same frame discarding process operation is performed only one time with respect to 1 frame. Concretely speaking, this process operation is carried out only when the RDCNT value is equal to "5" in the case that the HSSL value is equal to "0", and also only when the RDCNT value is equal to "8" in the case that the HSSL value is equal to "1".

In this case, "0" and "1" have been set to the SSPM value and the IFST value related to the respective frames. Under such a condition, the following case will now be considered. That is, the frames having the same contents, whose octet numbers except for CRC are equal to 5, are continuously inputted from the HSSL-not-corresponding-frame.

In this case, with respect to each of the frames, the circuit RX-C will accept the "OCTET RECEIVE" inputs 5 times and the "Frame End" input 1 time. As a consequence, as apparent from the previous description, the process operation for the "OCTET RECEIVE" inputs 5 times (namely, storing of "Received OCTET" into the ring buffer) is carried out with respect to each of the frames irrespective of either the "OCTET NEXT" process or the "FRM START" process. Then, when the process operation for the 5th "OCTET RECEIVE" is completed, since the RDCNT value becomes "5", the second same frame discarding process operation is commenced.

In a coincident judging process operation for a first frame, the following detections are made. That is, the value of LAST RDCNT is not made coincident with the value of RDCNT value ("5"). Otherwise, the value of DISAGREE FLAG is made coincident with "1". As a consequence, after "0" is set to SAME FRAME FLAG value and "Frame Start" is outputted to the circuit RX-D, the "FRM START" process operation is executed.

When the "FRM START" process operation is commenced, either "OCTET RECEIVE" or "Frame End" is entered into the circuit RX-C, which may be determined based upon an octet number of a subject frame except for CRC. In this case, "Frame End" is inputted. As a result, both "Frame End" and "LSSU Frame" are outputted to the circuit RX-D (see FIG. 30). Then, since HSSL=0 and RDCNT=5, after RDCNT value is set to LAST RDCNT value, the post process operation (see FIG. 31) is performed to commence the process operation for the next frame.

When the second same frame discarding process operation for a second frame, since the value of LAST RDCNT is updated by "5" due to process operation for the first frame, the value of LAST RDCNT is made coincident with the value of RDCNT. Also, since the content of the first frame is the same as the content of the second frame, the value of DISAGREE FLAG becomes "0". As a consequence, a check is made as to whether or not SAME FRAME FLAG value is equal to "1".

Then, since SAME FRAME FLAG=0, "1" is set to SAME FRAME FLAG value, and "FRM START" is outputted to the circuit RX-D. Then, since "Frame End" is inputted, both "Frame End" and "LSSU Frame" are outputted to the circuit RX-D during the "FRM START" process operation. Next, since HSSL=0 and RDCNT=5, after RDCNT value is set to LAST RDCNT value, the post process operation is executed to commence the process operation for the subsequent frame.

Also, when a coincidence judgement process operation for a third frame is carried out, the value of LAST RDCNT is made coincident with the value of RDCNT, and also the value of DISAGREE FLAG becomes "0". As a consequence, a check is made as to whether or not SAME FRAME FLAG value is equal to "1". Since the value of SAME FRAME FLAG is rewritten by "1" while the process operation for the second frame is executed, such a detection is made that the value of SAME FRAME FLAG is equal to "1". As a result, "Frame End" which will be subsequently inputted may be processed not in the "FRM START" process operation, but in the "OCTET NEXT" process operation.

Then, since "Frame End" is inputted when the "OCTET NEXT" process operation is commenced, both "CLR RXEVENTCNT" and "CLR EVENT STATUS" are outputted to the circuit RX-D. As a result, the third frame is discarded. Also, since the value of SAME FRAME FLAG is rewritten, when the same frame is thereafter received, this frame is similarly discarded.

Next, a description will now be made of operations in such a case that the octet number K except for CRC is larger than or equal to 6.

Even when K 6, the process operation with respect to first 5 sets of "OCTET RECEIVE" is carried out irrespective of the "FRM START" process operation and the "OCTET NEXT" process operation. Then, when RDCNT=5, the second same frame discarding process operation is carried out.

While the second same frame discarding process operation for the first frame is carried out, such a detection is made. That is, the value of LAST RDCNT is not made coincident with the value ("5") of RDCNT. Otherwise, the value of DISAGREE FLAG is made coincident with "1". As a result, after "0" is set to SAME FRAME FLAG value and "Frame Start" is outputted to the circuit RX-D, the "FRM START" process operation is executed.

In the case of K 6, after "OCTET RECEIVE" has been inputted "K-5" times to the circuit RX-C, "Frame End" is entered one time to this circuit RX-C. As a result, after a process operation defined in a left-sided flow chart portion of FIG. 29 has been executed "K-5" times, another process operation defined in a right-sided flow chart portion of FIG. 29 is performed. In other words, after "Received OCTET" has been added to the ring buffer "K-5" times and "INC.RX-EVENTCNT" has been outputted to the circuit RX-D, "Frame End" is outputted to the circuit RX-D. In other words, since the value of RDCNT is not equal to "5", "0" is set to both SAME FRAME FLAG value and LAST RDCNT value. Thereafter, the post process operation is carried out, and then the process operation for the next frame is commenced.

While the coincidence judgment process operation for the second frame is carried out, since the value of LAST RDCNT is updated by "0" by the process operation for the first frame, the value of LAST RDCNT is not made coincident with the value of RDCNT. As a consequence, the completely same process operation as that for the first frame is carried out for the second frame. As to the third frame, the same process operation as that for the first frame and the second frame is performed. That is, with respect to the frame of K 6, no "OCTET NEXT" process operation is carried out, and the content of this frame is always supplied via the ring buffer and the circuit RX-D to RX FIFO, even when this content is made coincident with the content of the first preceding frame and with the content of the second preceding frame.

Now, operations of the circuit RX-C in the super suppress mode (SSPM=1) will be described.

First, a description is made of operations in the super suppress mode in such a case that "Frame End" is processed within the "OCTET RECEIVE" process operation.

As previously explained, both MSU and FISU are to be suppressed in the super suppress mode. On the other hand, a frame where "Frame End" is processed within the "OCTET RECEIVE" process operation corresponds to such a frame whose octet number except for CRC is smaller than or equal to "4" (smaller than or equal to "7" in case of HSSL=0 and HSSL=1), namely FISU and LSSU (and abnormal frame). Accordingly, in the above-described case, as shown in FIG. 27, a judgment is made as to whether or not the LIV value is equal to "1". In other words, a check is done as to whether or not the subject frame is equal to FISU. Only when the LIV value is equal to "1", a process operation for the super suppress mode (will be indicated as a "1ST SSP MODE" process operation; see FIG. 34 to FIG. 38) is carried out.

Figure 34:
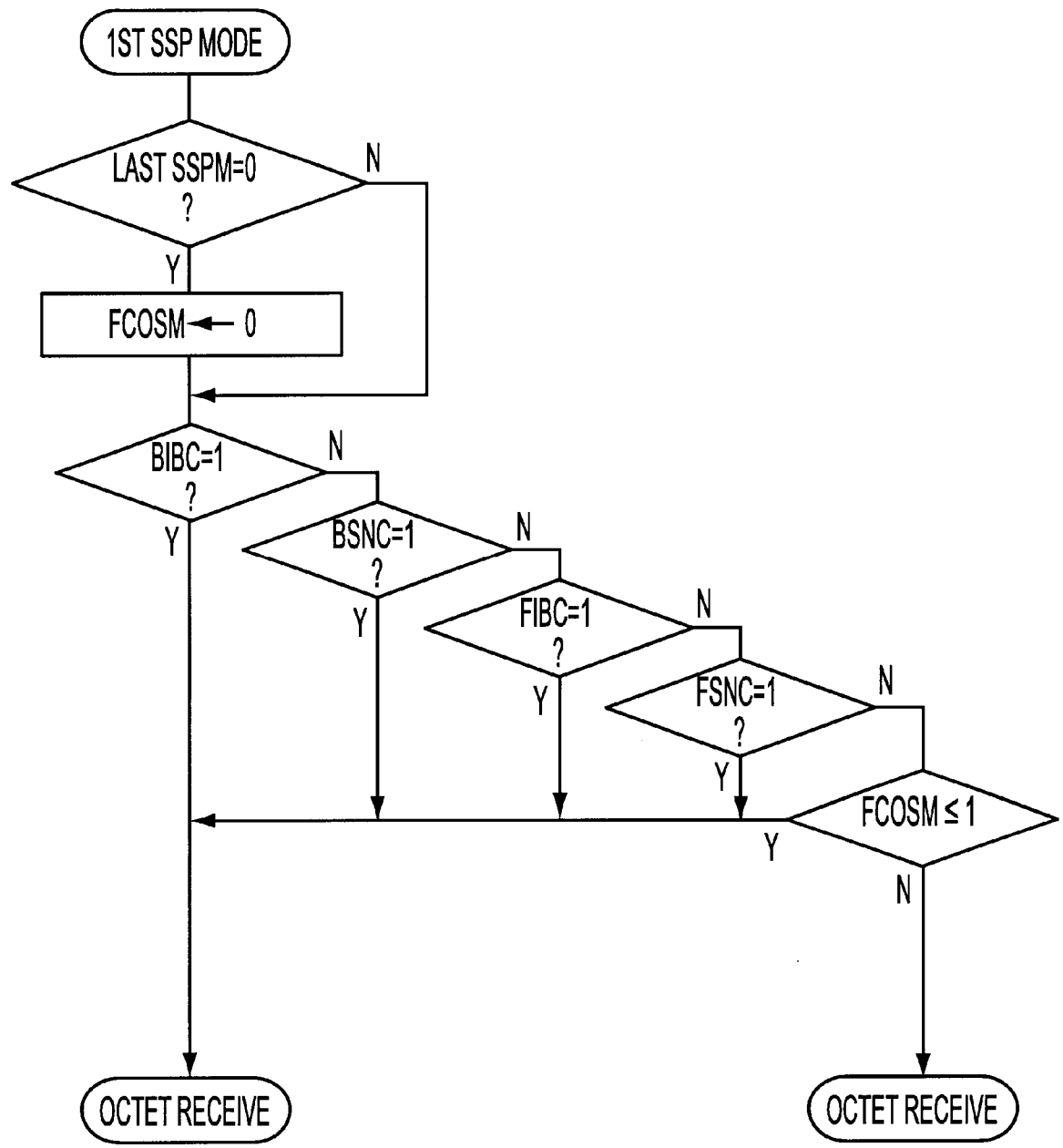
FIG. 34 is a flow chart for further describing a sequential operation of an RX-C employed in the reception signal processing circuit shown in FIG. 17.

As shown in FIG. 34, when the "1ST SSP MODE" process operation is commenced, the circuit RX-C judges whether or not the LAST SSPM value is equal to "0". As previously explained, when the process operation related to a certain frame is accomplished, the value of SSPM is copied to LAST SSPM value. As a result, in such a case that the LAST SSPM value is equal to "0" and the SSPM value is equal to "1", a subject frame corresponds to a newly processed frame after the operation mode is changed into the super suppress mode in the subject frame.

As a consequence, the circuit RX-C clears FCOSM only when LAST SSPM value is equal to "0". This FCOSM is a counter of continued number of frames which can satisfy the judgment basis in the super suppress mode. Thereafter, the circuit RX-C sequentially compares the values of BIBC, BSNC, FIBC, and FSNC (see FIG. 20, FIG. 23, FIG. 25, and FIG. 26) with "1". Then, in the case that any one of these values of BIBC, BSNC, FIBC, and FSNC is equal to "1", the circuit RX-C commences the "1ST SSP START" process operation. In the case that all of these values of BIBC, BSNC, FIBC, and FSNC are equal to "0", the circuit RX-C judges whether or not the value of FCOSM is smaller than or equal to "1". Then, in such a case that the value of FCOSM is smaller than or equal to "1", the "1ST SSP START" process operation is commenced in a similar manner when any one of the values of BIBC, BSNC, FIBC, FSNC is equal to 1. On the other hand, in such a case that the value of FCOSM is not equal to, or smaller than "1", the circuit RX-C starts the "1ST" SSP OCTET" process operation.

In summary, the circuit RX-C commences the "1ST SSP OCTET" process operation only when all of these values of BIBC, BSNC, FIBC, FSNC are equal to "0" and the value of FCOSM is larger than or equal to "2", whereas this circuit RX-C commences the "1ST SSP START" process operation in any case other than the above-described cases.

Figure 35:
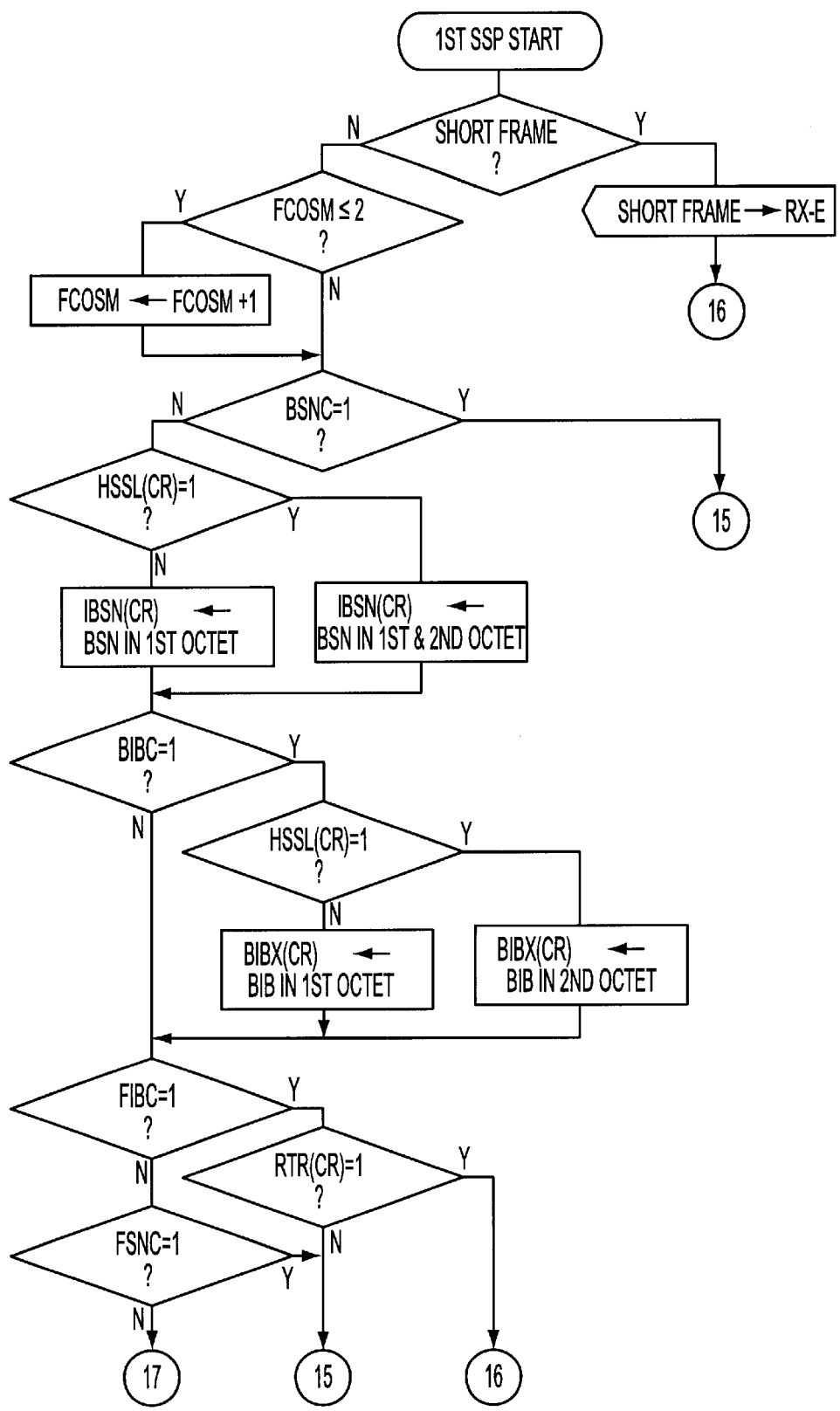
FIG. 35 is a flow chart for further describing a sequential operation of an RX-C employed in the reception signal processing circuit shown in FIG. 17.
Figure 36:
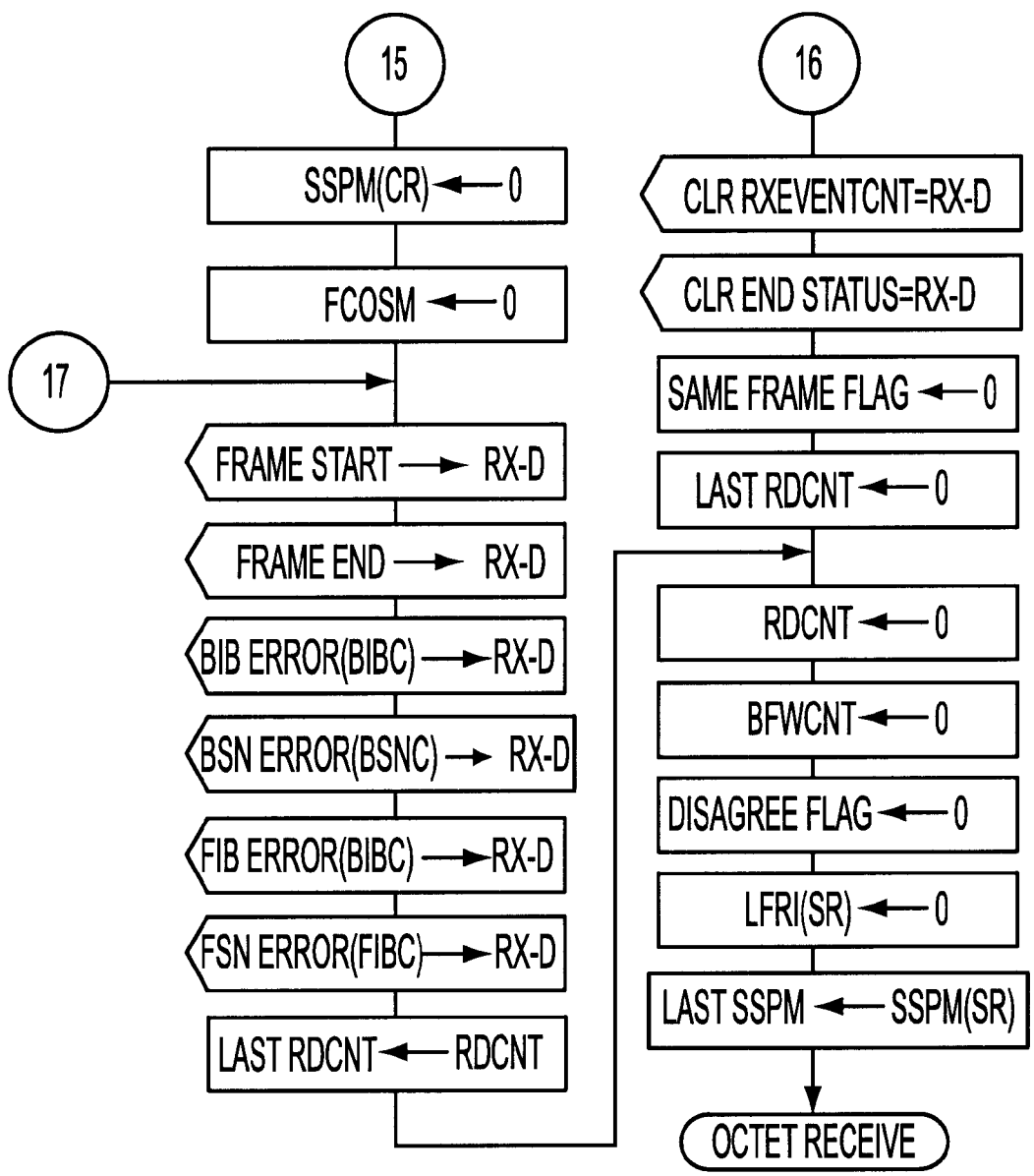
FIG. 36 is a flow chart for further describing a sequential operation of an RX-C employed in the reception signal processing circuit shown in FIG. 17.

As illustrated in FIG. 35, when the "1ST SSP START" process operation is carried out, the circuit RX-C first checks whether or not a subject frame is equal to a short frame. Then, in such a case that the subject frame is the short frame, the circuit RX-C outputs "Short Frame" to the circuit RX-D. Next, as shown in FIG. 36, the circuit RX-C outputs "CLR RXEVENTCNT" and "CLR END STATUS" to the circuit RX-D, and clears both the values of SAME FRAME FLAG and LAST RDCNT. Subsequently, the circuit RX-C executes the post process operation, and commences the "OCTET RECEIVE" process operation in order to process the next frame.

On the other hand, in the case that the subject frame is not equal to the short frame, the circuit RX-C judges whether or not the value of FCOSM is smaller than or equal to "2", this circuit RX-C increments the value of FCOSM by "1". Subsequently, the circuit RX-C judges whether or not the value of BSNC is equal to "1".

In the case that the value of BSNC is equal to "1", as represented in FIG. 36, the circuit RX-C clears both SSPM and FCOSM in order to release the super suppress mode. Next, since the circuit RX-C outputs "Frame Start" and "Frame End", the circuit RX-D is caused to transfer the data saved in the ring buffer to FIFO. Thereafter, in such a case that there is a value having "1" among BIBC, BSNC, FIBC, and FSNC, an error signal ("BIB/BSN/FIB/FSN ERROR") corresponding thereto is outputted to the circuit RX-D. After RDCNT value is set to LAST RDCNT value, the post process operation is carried out. Subsequently, returning back to the "OCTET RECEIVE" process operation, the process operation for the next frame is commenced.

On the other hand, in the case that the value of BSNC is not equal to "1" (see FIG. 35), the circuit RX-C sets BSN value within the subject frame to IBSN value. In other words, in such a case that HSSL value is equal to "0", BSN value contained in 1ST OCTET is set to IBSN, whereas when HSSL value is equal to "1", the values of BSN contained in 1ST OCTET and 2ND OCTET are set to IBSN.

Next, the circuit RX-C judges whether or not BIBC value is equal to "1". Then, if BIBC value is equal to "1", then this circuit RX-C sets BIB value of the subject frame to BIBX within the control register. In other words, when HSSL value is equal to "0", BIB value contained in 1ST OCTET is set to BIBX, whereas when HSSL value is equal to "1", BIB value contained in 2ND OCTET is set to BIBX.

Thereafter, the circuit RX-C judges whether or not FIBC value is equal to "1". When FIBC value is equal to "1", the circuit RX-C judges whether or not RTR value is equal to "1". Then when RTR value is equal to "1", the circuit RX-C executes the previously explained process operation for discarding the data saved in the ring buffer. Also, when RTR value is not equal to "1", the circuit RX-C executes a similar process operation to that performed when BSNC value is equal to "1" in order that the super suppress mode is released, and the data saved in the ring buffer is entered into the circuit RX-D.

In the case that FIBC value is not equal to "1", the circuit RX-C judges whether or not FSNC value is equal to "1". In the case that FSNC value is equal to "1", the circuit RX-C executes a similar process operation to that executed when BSNC value is equal to "1" in order to release the super suppress mode and acquire the data saved in the ring buffer into the circuit RX-D. On the other hand, in such a case that FSNC value is equal to "0" (namely, all of the values of BIBC, BSNC, FIBC, and FSNC are equal to "0"), as illustrated in FIG. 36, the circuit RX-C causes the circuit RX-D to perform a process operation for transferring the data saved in the ring buffer to FIFO without updating the values of SSPM and FCOSM (namely, without releasing super suppress mode).

Figure 37:
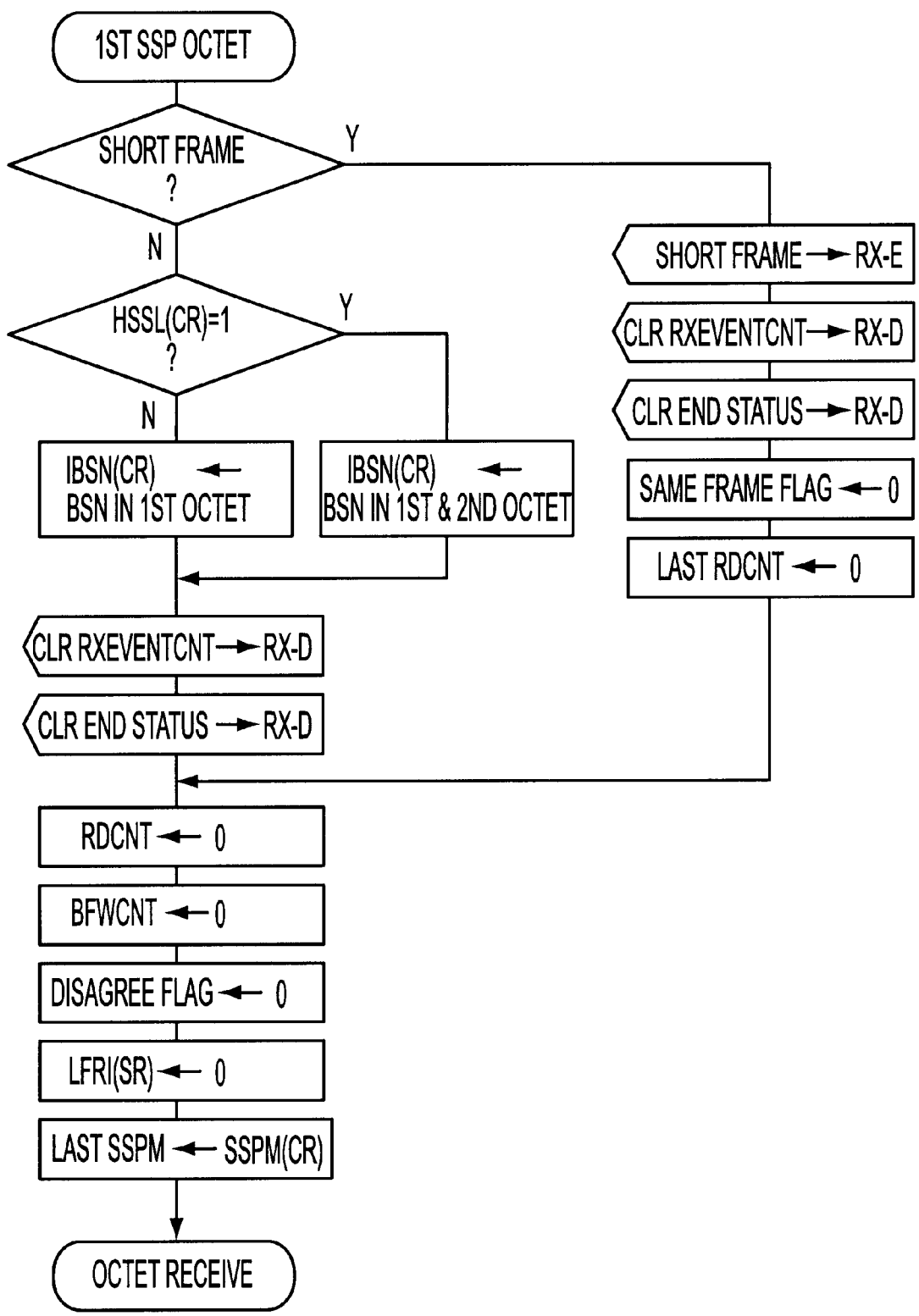
FIG. 37 is a flow chart for further describing a sequential operation of an RX-C employed in the reception signal processing circuit shown in FIG. 17.

On the other hand, while the "1ST SSP OCTET" process operation is carried out, as illustrated in FIG. 37, the circuit RX-C first checks whether or not a subject frame corresponds to a short frame. Then, when the subject frame is this short frame, the circuit RX-C outputs "Short Frame" to the circuit RX-E, and also both "CLR RXEVENTCNT" and "CLR END STATUS" to the circuit RX-D. In other words, the circuit RX-C notifies such a message that the short frame is received to the circuit RX-E, and instructs the circuit RX-D to discard the data saved in the ring buffer. Next, the circuit RX-C clears SAME FRAME FLAG value and LAST RDCNT value. Then, this circuit RX-C executes the post process operation, and returns to the "OCTET RECEIVE" process operation in which the process operation for the next frame is commenced.

In the case that the subject frame is not the short frame, the circuit RX-C sets BSN value contained in the subject frame to IBSN. In other words, when HSSL value is equal to "0", BSN value contained in 1ST OCTET is set to IBSN, whereas when HSSL value is equal to "1", BSN values contained in 1ST OCTET and 2ND OCTET are set to IBSN. Next, in order to discard the data contained in the ring buffer, the circuit RX-C outputs "CLR RXEVENTCNT" and "CLR END STATUS" to the circuit RX-D. Then, after RDCNT value is set to LAST RDCNT value, the circuit RX-C executes the post process operation to start the process operation for the next frame.

Next, a "2ND SSP MODE" process operation will now be explained, which corresponds to a process operation executed in the super suppress mode with respect to the frame which is not processed during the "1ST SSP MODE" process operation.

As apparent from the above-described explanations, the "1ST SSP MODE" process operation is not carried out with respect to an HSSL-corresponding-frame whose octet number except for CRC is larger than or equal to "5", and another HSSL-corresponding-frame whose octet number except for CRC is larger than or equal to "8". However, as shown in FIG. 22, when the process operation for a fifth (eighth) "Valid OCTET" is completed, the "2ND SSP MODE" process operation corresponding to the process operation for the super suppress mode is commenced. In other words, the "1ST SSP MODE" process operation corresponds to such a process operation which is not commenced unless "Frame End" is inputted, whereas the "2ND SSP MODE" process operation corresponds to a process operation which is commenced if other conditions can be satisfied, even when "Frame End" is not entered.

Figure 38:
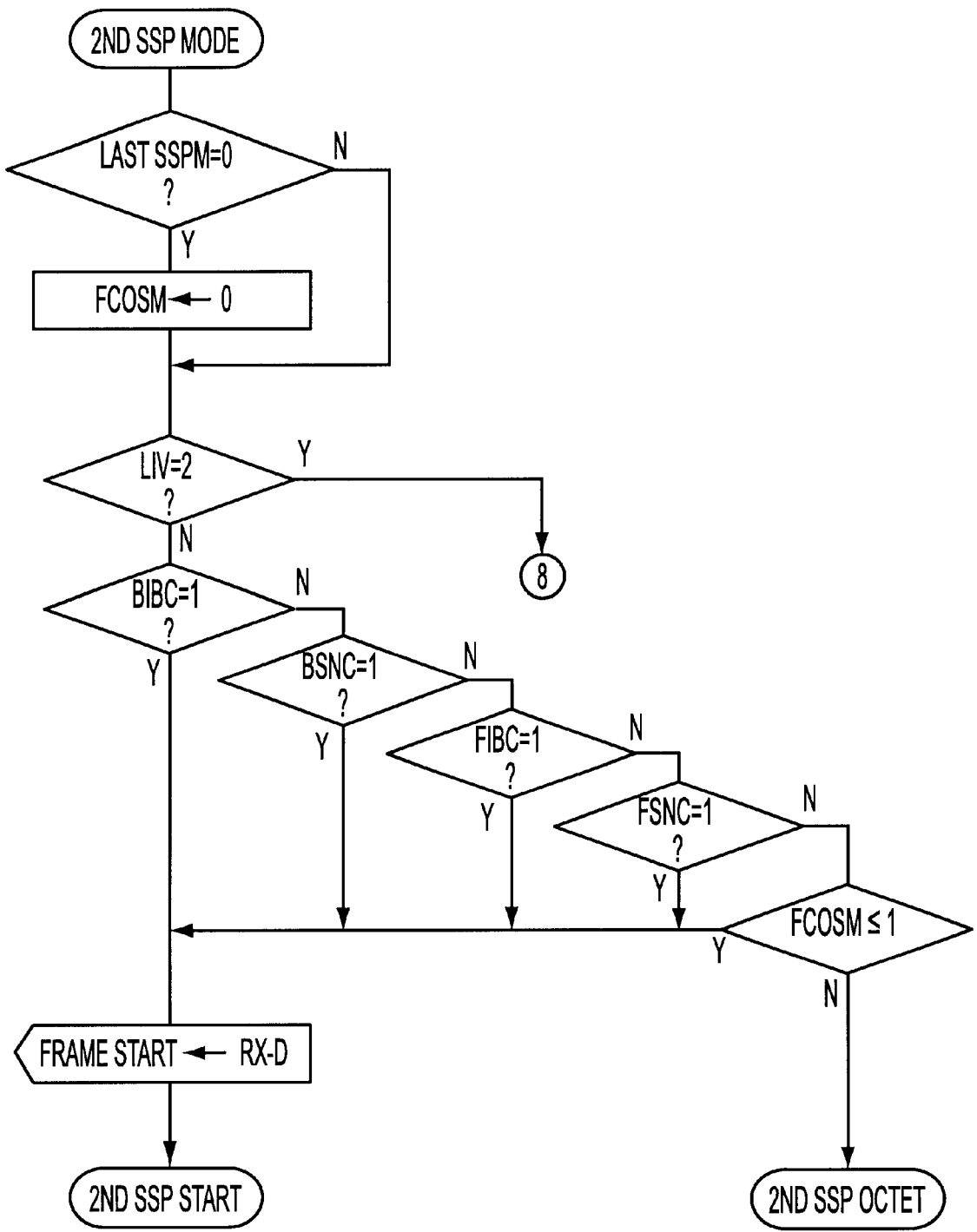
FIG. 38 is a flow chart for further describing a sequential operation of an RX-C employed in the reception signal processing circuit shown in FIG. 17.

As illustrated in FIG. 38, similar to the "1ST SSP MODE" process operation, when the "2ND SSP MODE" process operation is carried out, the circuit RX-C first checks whether or not LAST SSPM value is equal to "0". Then, when LAST SSPM value is equal to "0", the circuit RX-C sets "0" to FCOSM value.

Next, the circuit RX-C judges whether or not LIV value is equal to "2". If this LIV value is equal to "2", then the subject frame corresponds to LSSU which is not discarded in the super suppress mode. As a consequence, in this case, the circuit RX-C interrupts the "2ND SSP MODE" process operation, and then commences the second same frame discarding process (namely, process operation subsequent to branch point by IFST value in flow chart of FIG. 22).

In the case that LIV value is not equal to "2", the circuit RX-C sequentially compares the values of BIBC, BSNC, FIBC, and FSNC (see FIG. 20, FIG. 23, FIG. 25 and FIG. 26) with "1" in a similar manner to that of the "1ST SSP MODE" process operation. When any one of these values is equal to "1", after the circuit RX-C outputs "Frame Start" to the circuit RX-D, this circuit RX-C starts the "SSP START" process operation. In such a case that all of the values of BIBC, BSNC, FIBC, and FSNC are equal to "0", the circuit RX-C judges whether or not the value of FCOSM is smaller than or equal to "1". Then, when the value of FCOSM is smaller than or equal to "1", after the circuit RX-C outputs "Frame Start" in a similar manner to that of the above respective cases, this circuit RX-C commences the "2ND SSP START" process operation. On the other hand, when the value of FCOSM is larger than or equal to "2", the circuit RX-C commences the "2ND SSP OCTET" process operation.

Figure 39:
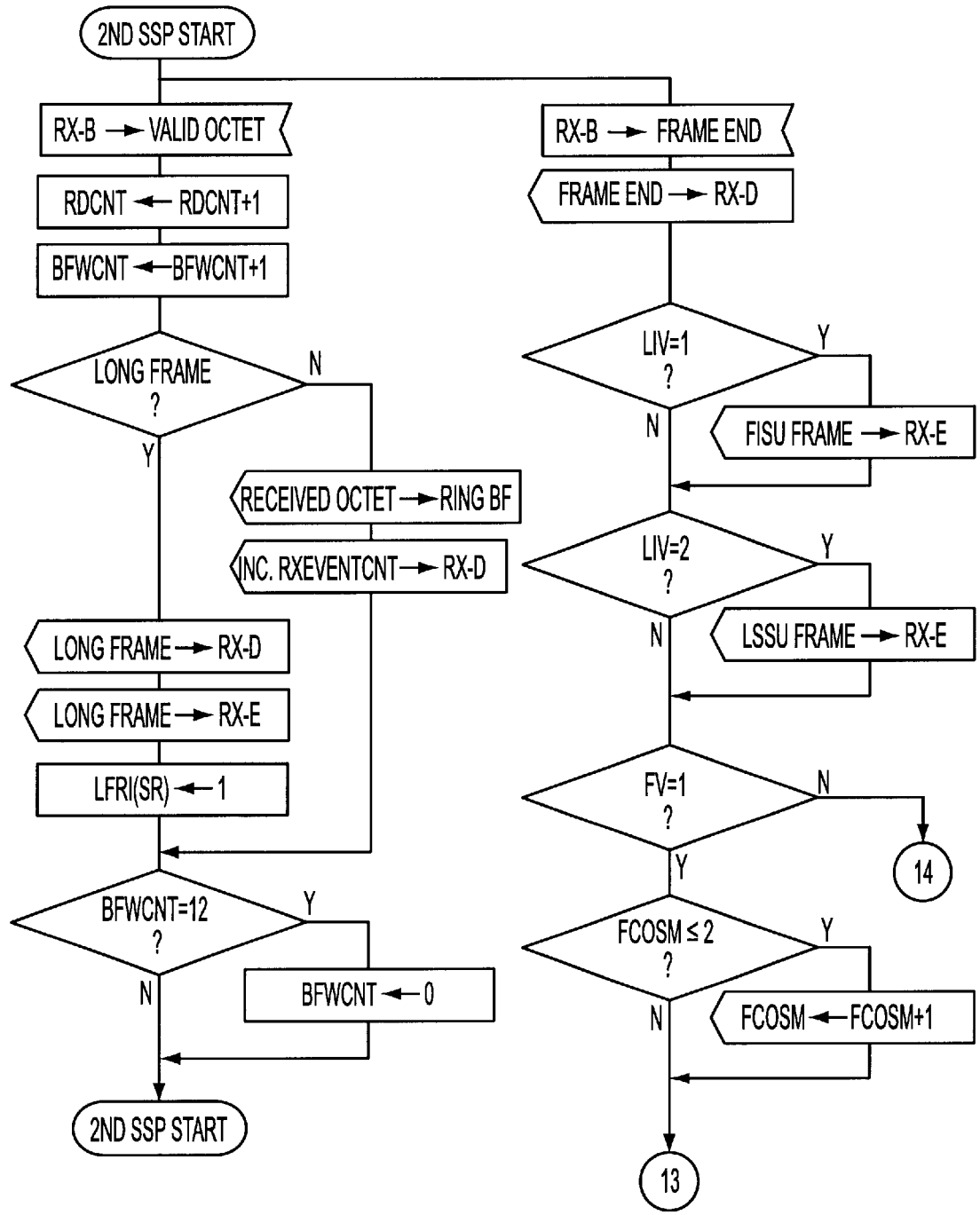
FIG. 39 is a flow chart for further describing a sequential operation of an RX-C employed in the reception signal processing circuit shown in FIG. 17.

As shown in FIG. 39, when the "2ND SSP START" process operation is commenced, the circuit RX-C waits for an input of either "Valid OCTET" or "Frame End" from the circuit RX-B. Then, when "Valid OCTET" is entered, the circuit RX-C increments RDCNT value and BFWCNT value by "1", respectively. Subsequently, when a subject frame (namely, frame under reception) corresponds to a long frame, the circuit RX-C outputs "Long Frame" to the circuits RX-D and RX-E, and then sets "1" to LFRI (SR#0: D15). On the other hand, if the subject frame is not equal to the long frame, the circuit RX-C stores Received OCTET into the ring buffer, and outputs "INC. RXEVENTCNT" to the circuit RX-D.

Thereafter, in such a case that BFWCNT value becomes "12" (namely, maximum address value of ring buffer), the circuit RX-C rewrites BFWCNT value by "0" and restarts the "2ND SSP START" process operation.

When "Frame End" is entered, the circuit RX-C first outputs "Frame End" to the circuit RX-D (it should be noted that "Frame Start" was already outputted in process operation shown in FIG. 34). Next, when LIV value is equal to "1", the circuit RX-C outputs to "FISU Frame", whereas when LIV value is equal to "2", the circuit RX-C outputs to "LSSU Frame".

Thereafter, the circuit RX-C judges whether or not FV=1 (namely, whether or not "FV Complete" is inputted). If FV=1, then the circuit RX-C checks whether or not the value of FCOSM is smaller than or equal to "2". Then, in such a case that the value of FCOSM is smaller than or equal to "2", the circuit RX-C increments the value of FCOSM by "1".

Figure 40:
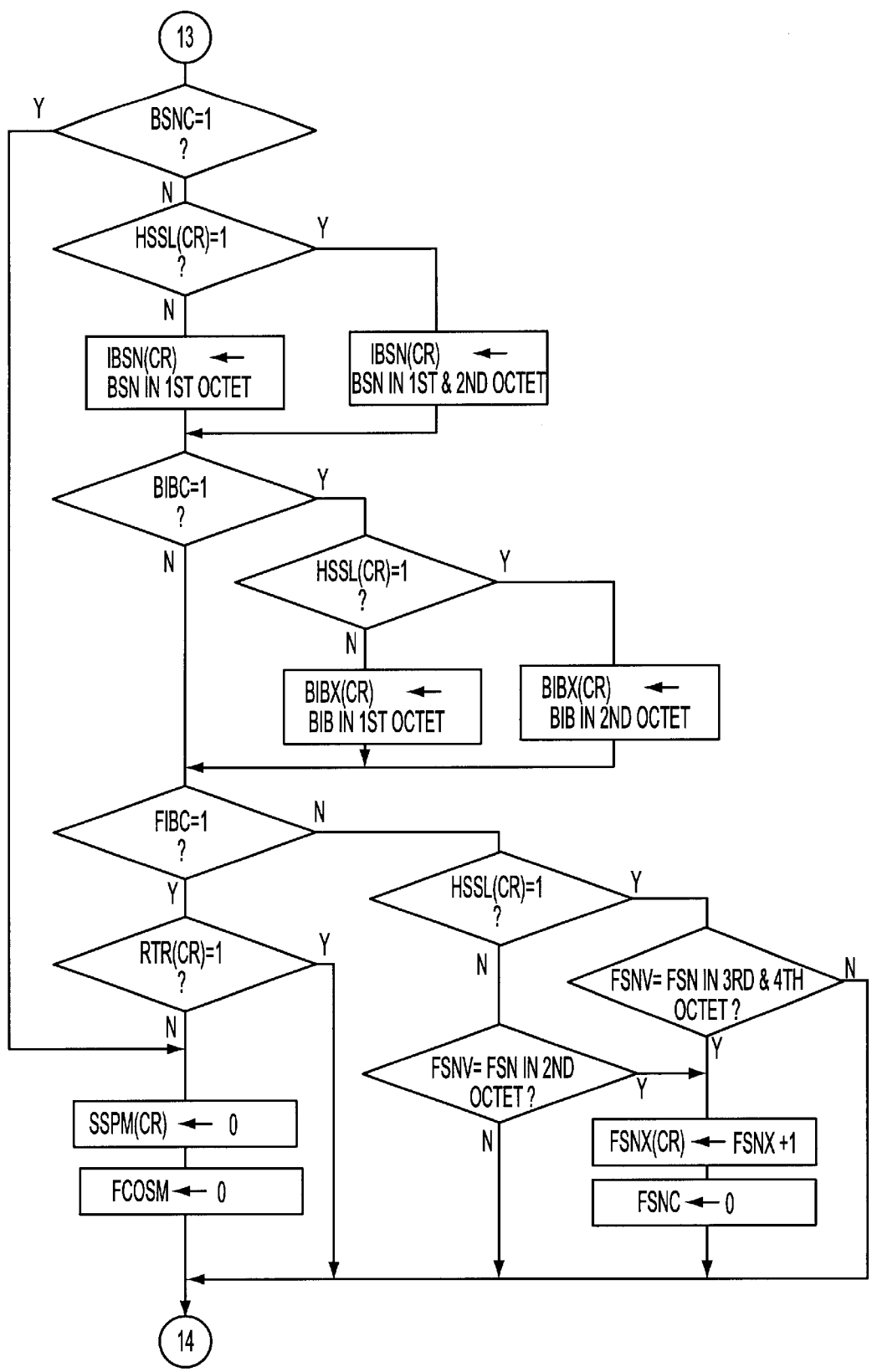
FIG. 40 is a flow chart for further describing a sequential operation of an RX-C employed in the reception signal processing circuit shown in FIG. 17.
Figure 41:
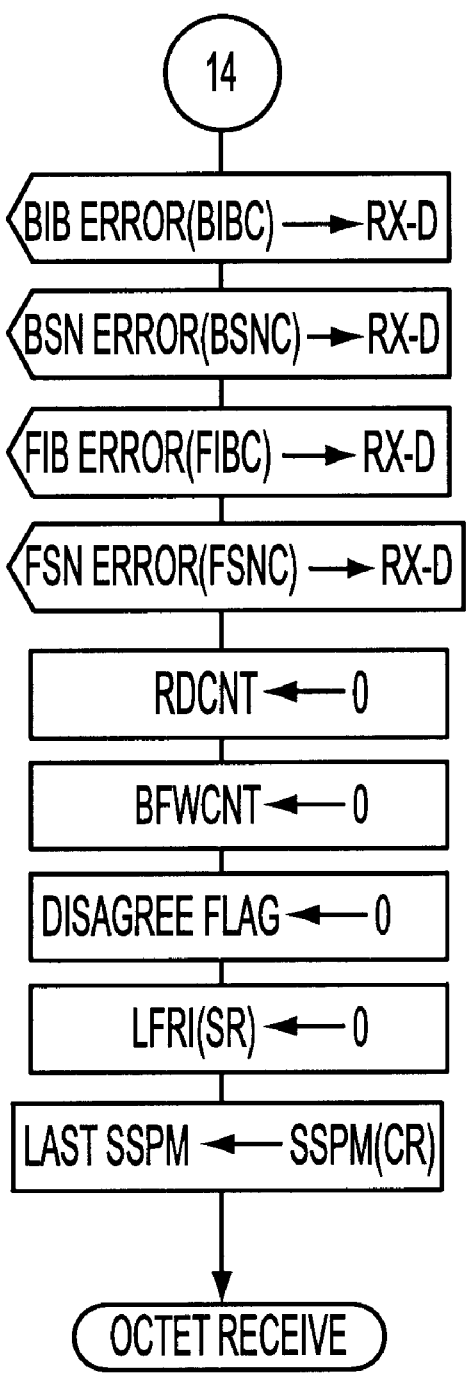
FIG. 41 is a flow chart for further describing a sequential operation of an RX-C employed in the reception signal processing circuit shown in FIG. 17.

Subsequently, as shown in FIG. 40, the circuit RX-C checks whether or not BSNC value is equal to "1". In such a case that BSNC value is equal to "1" (namely, when a check result of BSN value is "NG"), the circuit RX-C clears SSPM value within the control register and also clears FCOSM value in order to release the super suppress mode. Then, as illustrated in FIG. 41, when there is such a value having "1" among the values of BIBC, BSNC, FIBC, and FSNC, the circuit RX-C outputs an error signal corresponding to this value to the circuit RX-D. Thereafter, the circuit RX-C executes the post process operation, and restarts the "OCTET RECEIVE" process operation.

On the other hand, in such a case that BSNC value is not equal to "1" (see FIG. 40), the circuit RX-C sets BSN value within the present frame to IBSN. That is to say, when HSSL value is equal to "0", BSN value contained in 1ST OCTET is set to IBSN, whereas when HSSL value is equal to "1", the values of BSN contained in 1ST OCTET and 2ND OCTET are set to IBSN.

Next, the circuit RX-C judges whether or not BIBC value is equal to "1". Then, if BIBC value is equal to "1", then this circuit RX-C sets BIB value of the present frame to BIBX within the control register. In other words, when HSSL value is equal to "0", BIB value contained in 1ST OCTET is set to BIBX, whereas when HSSL value is equal to "1", BIB value contained in 2ND OCTET is set to BIBX.

Thereafter, the circuit RX-C judges whether or not FIBC value is equal to "1". When FIBC value is equal to "0", the circuit RX-C judges whether or not FSNV value is made coincident with FSN value of the subject frame. In other words, when HSSL value is equal to "1", the circuit RX-C compares FSNV value with the values of FSN contained in 3RD OCTET and 4TH OCTET. When HSSL value is equal to "0", this circuit RX-C compares FSNV value with FSN value contained in 2ND OCTET. Then, in the case that FSNV value is made coincident with FSN value of the present frame, the circuit RX-C increments FSNX value within the control register by "1", and also clears FSNC value. Then, after the circuit RX-C executes a process operation shown in FIG. 41, the process operation is returned to the "OCTET RECEIVE" process operation in which the circuit RX-C commences the process operation for the next frame.

On the other hand, in the case that FSNV value is not made coincident with FSN value of the subject frame, the circuit RX-C executes the process operation shown in FIG. 41 without updating FSNX value, or the like.

Also, when FIBC value is equal to "1", the circuit RX-C judges whether or not RTR value is equal to "1". When RTR value is not equal to "1", the circuit RX-C clears both SSPM value and FCOSM value in a similar manner in such a case that BSNC value is equal to "1". Thereafter, the circuit RX-C performs the process operation shown in FIG. 40 and starts the process operation for the next frame.

Figure 42:
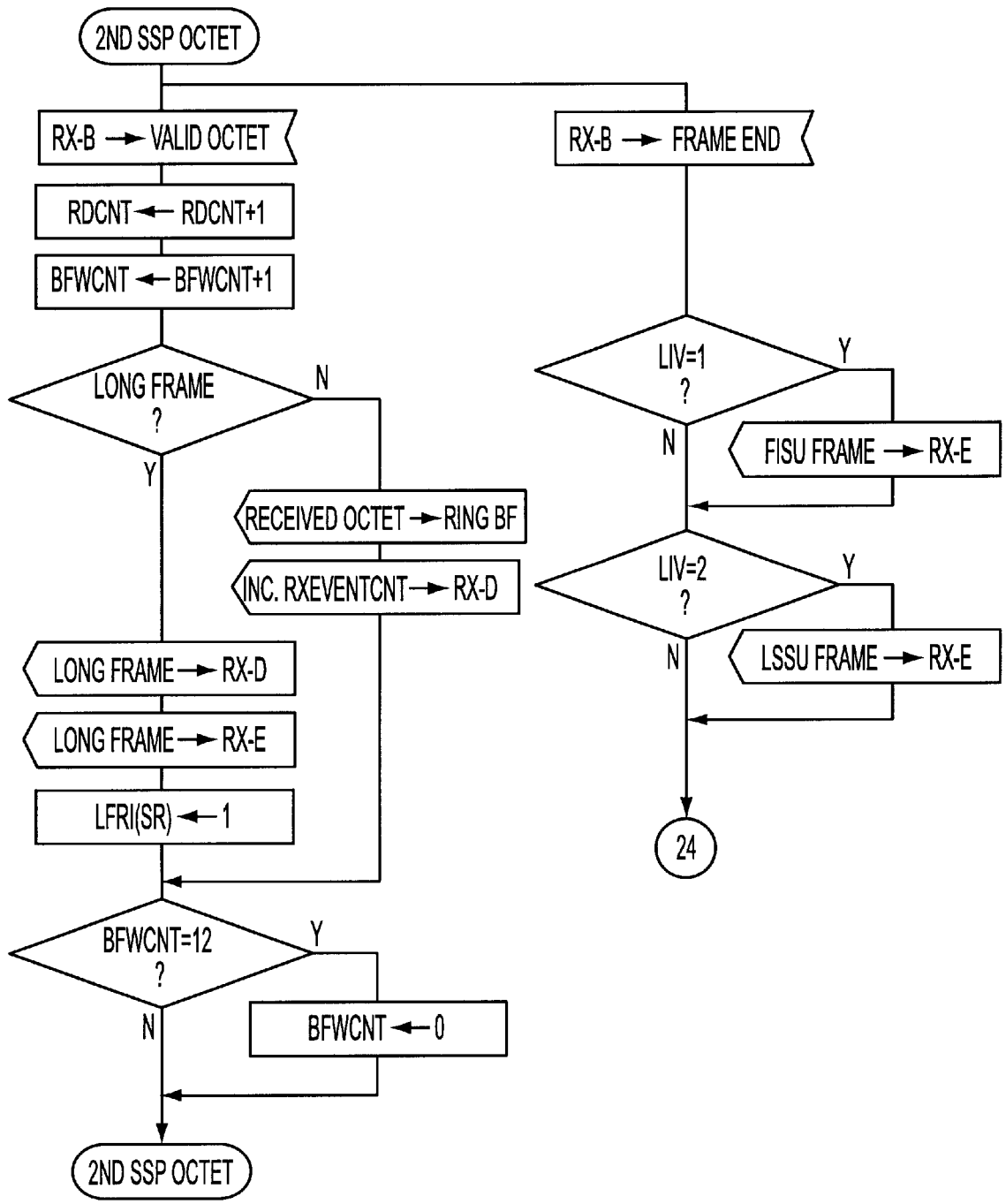
FIG. 42 is a flow chart for further describing a sequential operation of an RX-C employed in the reception signal processing circuit shown in FIG. 17.

Also, as shown in FIG. 42, when the "2ND SSP OCTET" process operation is commenced, the circuit RX-C is brought into such a condition that both "Valid OCTET" and "Frame End" are waiting to be entered from the circuit RX-B.

When "Valid OCTET" is entered from the circuit RX-B, the circuit RX-C is operated in a similar manner to that executed when the "2ND SSP START" process operation is carried out. In other words, the circuit RX-C increments RDCNT value and BFWCNT value by "1", respectively. Then, in the case that a frame under reception is the long frame, the circuit RX-C outputs "Long Frame" to both the circuit RX-D and the circuit RX-E, and sets "1" to LFRI value. To the contrary, when the frame to be processed is not equal to the long frame, the circuit RX-C stores Received OCTET into the ring buffer, and then outputs "INC. RXEVENTCNT" to the circuit RX-D.

Thereafter, in such a case that BFWCNT value becomes "12" (namely, maximum address value of ring buffer), the circuit RX-C rewrites BFWCNT value by "0" and restarts the "2ND SSP OCTET" process operation.

On the other hand, when "Frame End" is entered, the circuit RX-C outputs a signal corresponding to the LIV value to the circuit RX-E without outputting "Frame End" to the circuit RX-D. In other case that "Frame End" is processed in the "2ND SSP OCTET" process operation, it should be noted that "Frame Start" is not outputted.

Figure 43:
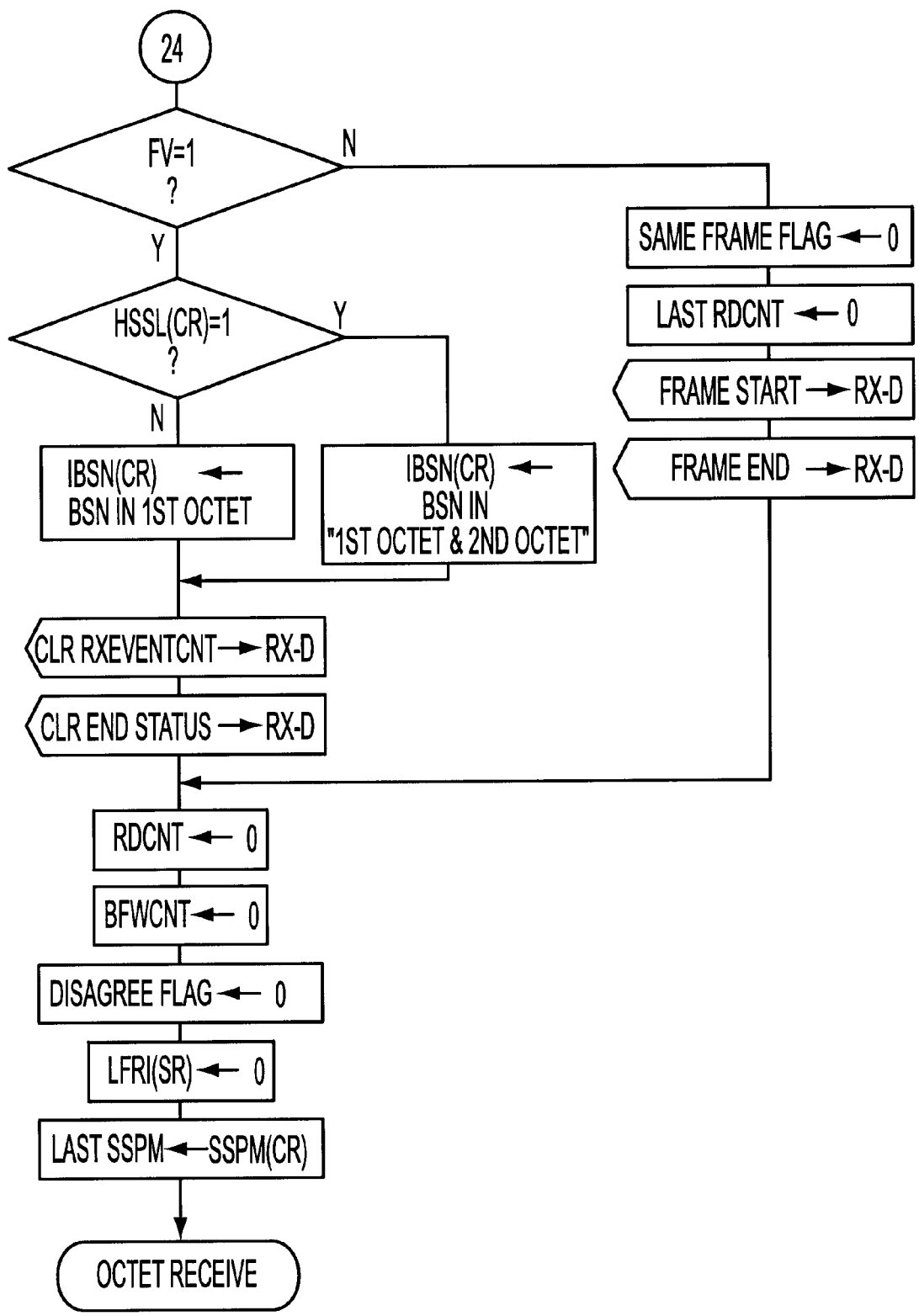
FIG. 43 is a flow chart for further describing a sequential operation of an RX-C employed in the reception signal processing circuit shown in FIG. 17.

Subsequently, as illustrated in FIG. 43, the circuit RX-C judges whether or not FV=1. When FV is not equal to "1", the circuit RX-C clears the values of both SAME FRAME FLAG and LAST RDCNT, and also outputs both "FRM START" and "Frame End" to the circuit RX-D. On the other hand, when FV=1, the circuit RX-C sets BSN value contained in the subject frame to IBSN. Next, the circuit RX-C outputs "CLR RXEVENTCNT" and "CLR END STATUS" to the circuit RX-D.

After either "Frame End" or "CLR END STATUS" has been outputted, the circuit RX-C executes the post process operation, and restarts the "OCTET RECEIVE" process operation in order to commence the process operation for a next frame.

In the case that the value of BSNC is equal to "1", as illustrated in FIG. 36, the circuit RX-C clears both SSPM value and FCOSM value so as to release the super suppress mode. Next, since the circuit RX-C outputs "Frame Start" and "Frame End", thereby to RX-C causes the circuit RX-D to transfer the data saved in the ring buffer in order that to FIFO. Subsequently, in such a case that there is such a value having "1" among the values of BIBC, BSNC, FIBC, and FSNC, the circuit RX-C outputs error signals corresponding thereto ("BIB/BSN/FIB/FSN ERROR") to the circuit RX-D. Thereafter, after RDCNT value is set to LAST RDCNT value, the circuit RX-C executes the post process operation, and commences the "OCTET RECEIVE" process operation in order to process a next frame.

To the contrary, when the value of BSNC is not equal to "1" (FIG. 35), the circuit RX-C sets BSN value contained in the subject frame to IBSN. In other words, in the case that HSSL value is equal to "0", the value of BSN contained in 1ST OCTET is set to IBSN, whereas in such a case that HSSL value is equal to "1", the values of BSN contained in both 1ST OCTET and 2ND OCTET are set to IBSN.

Next, the circuit RX-C judges whether or not BIBC value is equal to "1". Then, in the case that BIBC value is equal to "1", the circuit RX-C sets BIB value of the subject frame to BIBX within the control register. That is, in the case that HSSL value is equal to "0", the value of BIB contained in 1ST OCTET is set to BIBX, whereas in such a case that HSSL value is equal to "1", the value of BIB contained in 2ND OCTET is set to BIBX.

Next, the circuit RX-C judges whether or not FIBC value is equal to "1".

In such a case that FIBC value is equal to "1", the circuit RX-C judges whether or not RTR value is equal to "1". Then, if RTR value is equal to "1", as previously explained, then the circuit RX-C executes the process operation for discarding the data saved in the ring buffer. To the contrary, when RTR value is not equal to "1", the circuit RX-C performs a process operation similar to that executed when the value of BSNC is equal to "1" so as to release the super suppress mode and to cause the circuit RX-D to acquire the data saved in the ring buffer.

In such a case that FIBC value is not equal to "1", the circuit RX-C judges whether or not FSNC value is equal to "1". Then, if FSNC value is equal to "1", then the circuit RX-C performs a process operation similar to that executed when the value of BSNC is equal to "1" so as to release the super suppress mode and to cause the circuit RX-D to acquire the data saved in the ring buffer. On the other hand, when FSNC value is equal to "0" (namely, when all of the values of BIBC, BSNC, FIBC, and FSNC are equal to "0"), as illustrated in FIG. 36, the circuit RX-C performs such a process operation for causing the circuit RX-D to acquire the data saved in the ring buffer without updating the values of SSPM and FCOSM (namely, without releasing super suppress mode).

Referring now to FIG. 37, operations when the "2ND SSP OCTET" process operation is executed will be explained.

As illustrated in the flow chart of FIG. 37, when the "2ND SSP OCTET" process operation is carried out, the circuit RX-C first checks whether or not the subject frame corresponds to the short frame. Then, when the subject frame corresponds to the short frame, the circuit RX-C outputs "Short Frame", "CLR RXEVENTCNT", and "CLR END STATUS" to the circuit RX-D, and clears SAME FRAME FLAG value and LAST RDCNT value. Then, this circuit RX-C executes the post process operation and starts the process operation for a next frame.

To the contrary, when the subject frame is not equal to the short frame, the circuit RX-C sets BSN value contained in the subject frame to IBSN value. In other words, when HSSL value is equal to "0", the BSN value contained in 1ST OCTET is set to IBSN value, whereas when HSSL value is equal to "1", the values of BSN contained is 1ST OCTET and 2ND OCTET are set to IBSN value. Subsequently, the circuit RX-C outputs both "CLR RXEVENTCNT" and "CLR END STATUS" to the circuit RX-D so as to discard the data contained in the ring buffer. Then, after RDCNT value is set to LAST RDCNT value, the circuit RX-C executes the post process operation and commences the process operation for the next frame.

Finally, operations of the circuit RX-E will now be simply explained.

As previously described, various sorts of signals derived from the circuits RX-A to RX-C are entered to this circuit RX-E (see FIG. 17).

When "FV Complete" is entered to the circuit RX-E, this circuit RX-E increments the value of RCFC by "1".

Also, when "Short Frame END", "CRC Error End", and "Byte Error End" are inputted from the circuit RX-B to the circuit RX-E, this circuit RX-E increments the value of REFC by "1". Similarly, when "Short Frame" is entered from the circuit RX-C to the circuit RX-E, this circuit RX-E increments the value of REFC by "1".

Furthermore, the circuit RX-E sets "1" to OCMS (SR#0: D12) when "Abort Error END" is entered from the circuit RX-B to this circuit RX-E under such a condition that "1" is set to OCME (CR#0: D6), or when "Long Frame" is entered from the circuit RX-C to this circuit RX-E under such a condition that "1" is set to OCME (CR#0: D6). Then, the operation mode of this circuit RX-E is transferred to the octet number counting mode. That is, the circuit RX-E commences a process operation in such a manner that the number of "OCTET RECEIVE" entered from the circuit RX-A is counted, and the value of REFC is incremented by "1" every time 16 sets of "OCTET RECEIVE" are entered to this circuit RX-E.

Then, in such a case that "FV Complete" is inputted in the octet number counting mode, the circuit RX-E sets "0" to OCMS (SR#0: D12). The octet umber counting mode is transferred to the normal counting mode during which the circuit RX-E adds "1" to the value of REFC every time a signal for notifying a reception of an abnormal frame is received from either the circuit RX-B or the circuit RX-C. It should also be noted that the octet number counting mode for the circuit RX-E is similarly transferred to the normal counting mode when "0" is set to OCME.

On the other hand, when "LSSU Frame" is entered from the circuit RX-C to the circuit RX-E, this circuit RX-E increments the counter for LSSU by "1", whereas when "FISU Frame" is inputted to the circuit RX-E from the circuit RX-C, this circuit RX-E increments the counter for FISU by "1".

As previously described in detail, the common line signal apparatus according to this embodiment is equipped with the reception signal processing circuit capable of suppressing such a frame having no meaning except for the confirmation response, and also capable of extracting the reverse-direction sequence number thereof. As a consequence, the amount of data which are required to be processed by the CPU employed in this common line signal apparatus can be reduced, as compared with the data processing amount by the CPU employed in the normal common line signal apparatus. Under such circumstances, the firmware can be designed with sufficient capacities. Also, the CPU employed in the common line signal apparatus of this embodiment can execute other process operations than the above-described process operation.

MODIFICATIONS

Figure 44:
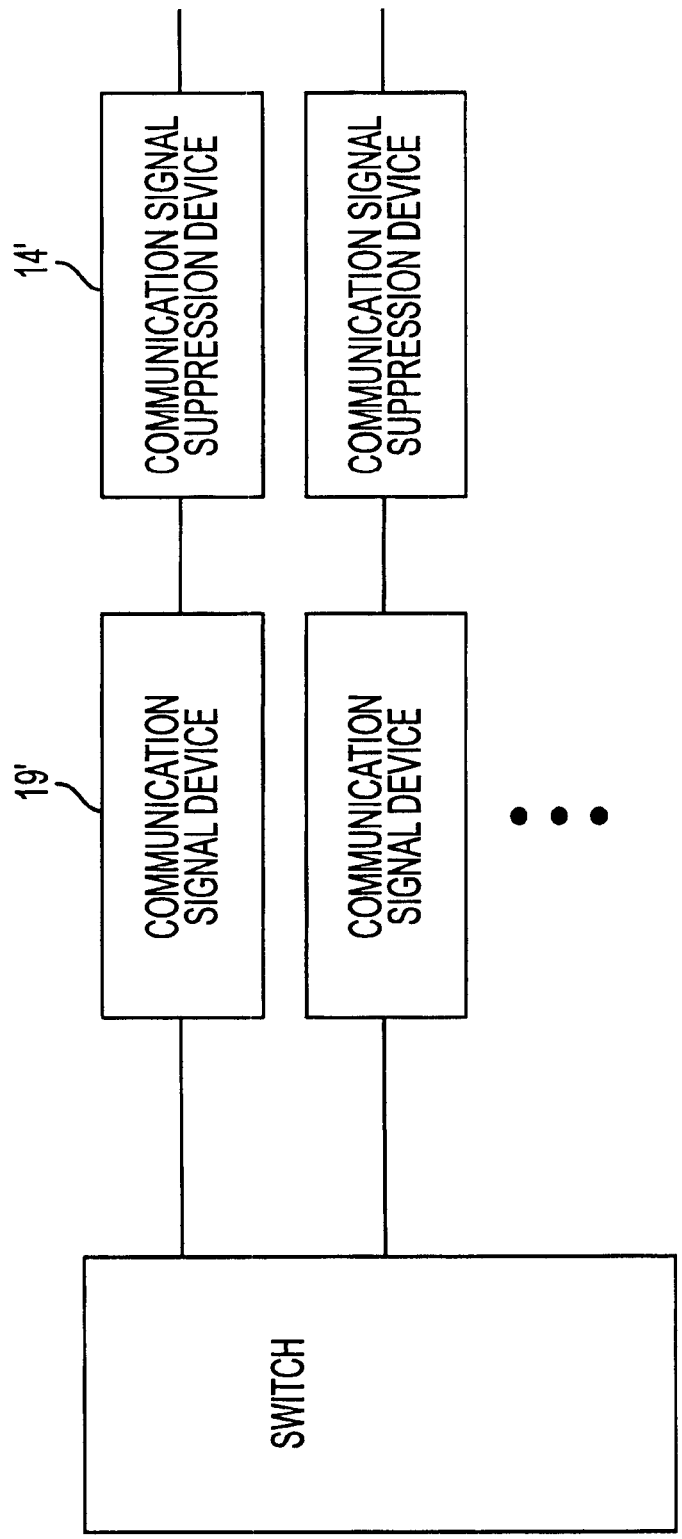
FIG. 44 is an explanatory diagram for explaining a modification according to the present invention.

The above-explained common line signal apparatus according to this embodiment is directed to such an apparatus capable of employing the No. 7 common line signal system. The present inventive technical idea may be similarly applied to any types of apparatuses if these apparatuses correspond to communication signal apparatuses (communication protocol apparatuses) with employment of a so-called "basic error correction system". Alternatively, it is possible to arrange such an apparatus having the function equal to the above-described reception signal processing circuit according to this embodiment (namely, the function capable of suppressing the frame having no meaning other than the confirmation response), and furthermore to use this modified apparatus as an externally equipped circuit with respect to the existing communication signal apparatus. That is, as illustratively shown in FIG. 44, the reception signal processing apparatus according to the above-described embodiment is modified to manufacture a communication signal suppressing apparatus 14' which can be operatively inserted into the existing system where a communication signal apparatus (communication protocol apparatus) 19' is employed so that a frame having no meaning except for the confirmation response may not be entered to the communication signal apparatus 19'. As a result of this modification, the data processing amount of a CPU employed in the communication signal apparatus 19' may be reduced, so that other process operations may be performed by this CPU.

What is claimed is:

1. A communication signal processing apparatus comprising:
   storage means for storing thereinto both a minimum value of an expected value of a reverse-direction sequence number and a maximum value thereof,
   rewriting means for rewriting the minimum value stored in said storage means based upon a reverse-direction sequence number of a received frame; and
   frame output means for discarding the frame which has been used to rewrite the minimum value stored in said storage means by said rewriting means, and for outputting a content of a frame which has not been used to rewrite the minimum value to said processing apparatus.

2. A communication signal processing apparatus as claimed in claim 1, further comprising:
   counting means for counting a total number of said received frames in accordance with a sort of said received frames.

3. A communication signal processing apparatus as claimed in claim 1, wherein:
   said processing apparatus is a communication signal suppressing apparatus.

4. A communication signal processing apparatus as claimed in claim 1, wherein said rewriting means for rewriting in such a case that said reverse-direction sequence number of the received frame is present within a range defined by said minimum value and said maximum value stored in said storage means.

5. A communication signal processing apparatus as claimed in claim 1, wherein said rewriting means for rewriting in such a reverse-direction state indication bit of said received frame, a forward-direction state indication bit thereof, and a forward-direction sequence number thereof are made coincident with a reverse-direction state indication bit of a previously received frame, a forward-direction state indication bit thereof, and a forward-direction sequence number thereof, respectively.

6. A common line signal apparatus comprising:
   a processing apparatus whose operation sequence is determined by firmware; and
   a signal processing circuit electrically connected to said processing apparatus and including:
      storage means for storing thereinto both a minimum value of an expected value of a reverse-direction sequence number and a maximum value thereof, said processing apparatus being capable of accessing said storage means;
      rewriting means for rewriting the minimum value stored in said storage means based upon a reverse-direction sequence number of a received frame and
      frame output means for discarding the frame which has been used to rewrite the minimum value stored in said storage means by said rewriting means.

7. A common line signal apparatus as claimed in claim 6 wherein:
   said signal processing circuit is further comprised of counting means for counting a total number of said received frames in accordance with a sort of said received frames.

* * * * *